United States Patent
Forutanpour et al.

(10) Patent No.: US 11,146,619 B2
(45) Date of Patent: *Oct. 12, 2021

(54) SYSTEMS AND METHODS FOR SELECTING MEDIA ITEMS

(71) Applicant: QUALCOMM Incorporated, San Diego, CA (US)

(72) Inventors: Babak Forutanpour, Carlsbad, CA (US); Deepthi Pavagada, San Diego, CA (US); Roman Tivyan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 331 days.

This patent is subject to a terminal disclaimer.

(21) Appl. No.: 15/807,393

(22) Filed: Nov. 8, 2017

(65) Prior Publication Data

US 2018/0069918 A1  Mar. 8, 2018

Related U.S. Application Data

(63) Continuation of application No. 14/288,250, filed on May 27, 2014, now Pat. No. 9,843,623.

(Continued)

(51) Int. Cl.
*H04L 29/08* (2006.01)
*G06F 3/0482* (2013.01)
(Continued)

(52) U.S. Cl.
CPC ............ *H04L 67/10* (2013.01); *G06F 3/0482* (2013.01); *G06F 16/58* (2019.01); *G06F 16/583* (2019.01);
(Continued)

(58) Field of Classification Search
CPC ....... H04L 67/10; G06F 16/583; G06F 16/58; G06F 3/0482; G06F 16/50; H04M 1/72547; H04M 2250/64
(Continued)

(56) References Cited

U.S. PATENT DOCUMENTS 8,001,192 B1  8/2011  Papineau et al.
8,213,776 B2  7/2012  Funaki et al.
(Continued)

FOREIGN PATENT DOCUMENTS

EP  1550968 A1  7/2005
EP  2313847 A1  4/2011
(Continued)

OTHER PUBLICATIONS

Gao Y., et al., "Shot-Based Similarity Measure for Content-Based Video Summarization," 15th IEEE International Conference on Image Processing, 2008, pp. 2512-2515.
(Continued)

*Primary Examiner* — Evan Aspinwall
(74) *Attorney, Agent, or Firm* — Qualcomm Incorporated

(57) ABSTRACT

A device includes an image capture device configured to capture a first video. The device includes a memory configured to store one or more videos. The device further includes a processor coupled to the memory. The processor is configured to concatenate the first video and a second video to generate a combined video. The second video is included in the one or more videos or is accessible via a network. The second video is selected by the processor based on a similarity of a first set of characteristics with a second set of characteristics. The first set of characteristics corresponds to the first video. The second set of characteristics corresponds to the second video.

42 Claims, 21 Drawing Sheets

Related U.S. Application Data

(60) Provisional application No. 61/828,104, filed on May 28, 2013.

(51) Int. Cl.
  *G06F 16/58* (2019.01)
  *G06F 16/583* (2019.01)
  *H04M 1/7243* (2021.01)
  *G06F 16/50* (2019.01)

(52) U.S. Cl.
  CPC ........... *H04M 1/7243* (2021.01); *G06F 16/50* (2019.01); *H04M 2250/64* (2013.01)

(58) Field of Classification Search
  USPC ........................................................ 707/749
  See application file for complete search history.

(56) References Cited

U.S. PATENT DOCUMENTS

| | | | |
|---|---|---|---|
| 8,311,100 B2 | 11/2012 | Thorpe et al. | |
| 8,363,888 B2 | 1/2013 | Chen et al. | |
| 8,380,005 B1 | 2/2013 | Jonsson | |
| 8,515,254 B2 | 8/2013 | Kikuchi et al. | |
| 8,605,221 B2 | 12/2013 | Deever et al. | |
| 8,626,762 B2 | 1/2014 | Seung et al. | |
| 8,628,453 B2 | 1/2014 | Balakrishnan et al. | |
| 8,854,457 B2 | 10/2014 | De et al. | |
| 2003/0161396 A1* | 8/2003 | Foote | G11B 27/031 375/240.01 |
| 2005/0165795 A1 | 7/2005 | Myka et al. | |
| 2008/0159708 A1 | 7/2008 | Kazama et al. | |
| 2009/0110366 A1 | 4/2009 | Ogikubo et al. | |
| 2009/0319618 A1 | 12/2009 | Affronti et al. | |
| 2010/0048242 A1 | 2/2010 | Rhoads et al. | |
| 2010/0235746 A1 | 9/2010 | Anzures | |
| 2011/0065376 A1* | 3/2011 | Forutanpour | H04W 4/029 455/3.01 |
| 2011/0218997 A1* | 9/2011 | Boiman | G06F 16/783 707/737 |
| 2011/0249144 A1 | 10/2011 | Chang | |
| 2012/0011474 A1 | 1/2012 | Kashik et al. | |
| 2012/0059826 A1* | 3/2012 | Mate | G06F 16/739 707/737 |
| 2012/0102120 A1 | 4/2012 | Canoy et al. | |
| 2012/0204107 A1* | 8/2012 | Salinas | G06F 16/70 715/716 |
| 2012/0290980 A1 | 11/2012 | Sirot et al. | |
| 2012/0314917 A1 | 12/2012 | Kiyohara et al. | |
| 2013/0071031 A1* | 3/2013 | Huang | G06K 9/46 382/190 |
| 2013/0089243 A1* | 4/2013 | Sauve | G06T 11/00 382/118 |
| 2013/0117365 A1* | 5/2013 | Padmanabhan | H04W 4/21 709/204 |
| 2013/0254666 A1 | 9/2013 | Snavely et al. | |
| 2013/0346750 A1 | 12/2013 | Marlow et al. | |
| 2014/0080428 A1 | 3/2014 | Rhoads et al. | |
| 2014/0289290 A1* | 9/2014 | von Elgg | H04L 65/4084 707/827 |
| 2014/0337729 A1 | 11/2014 | Jang et al. | |
| 2014/0359483 A1 | 12/2014 | Forutanpour et al. | |
| 2015/0213001 A1 | 7/2015 | Levy | |

FOREIGN PATENT DOCUMENTS

| | | |
|---|---|---|
| EP | 2549438 A1 | 1/2013 |
| JP | 2000285242 A | 10/2000 |
| JP | 2004179920 A | 6/2004 |
| JP | 2008017377 | 1/2008 |
| JP | 2008311749 A | 12/2008 |
| JP | 2010283879 A | 12/2010 |

OTHER PUBLICATIONS

International Search Report and Written Opinion—PCT/US2014/039744—ISA/EPO—dated Aug. 26, 2014.

* cited by examiner

SYSTEMS AND METHODS FOR SELECTING MEDIA ITEMS

I. CROSS REFERENCE TO RELATED APPLICATIONS

The present application claims priority from and is a continuation application of U.S. Non-Provisional patent application Ser. No. 14/288,250, entitled "SYSTEMS AND METHODS FOR SELECTING MEDIA ITEMS," filed May 27, 2014, which claims priority from U.S. Provisional Patent Application No. 61/828,104 entitled "SYSTEMS AND METHODS FOR SELECTING MEDIA ITEMS," filed May 28, 2013, the contents of which are incorporated by reference in their entireties.

II. FIELD

The present disclosure is generally related to image processing.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application that can be used to access the Internet. As such, these wireless telephones can include significant computing capabilities.

Sharing media items (e.g., images and videos) with friends and family via electronic mail and social media networks has become increasingly popular. However, sharing media items from a wireless telephone may be time consuming. For example, it may take a user of the wireless telephone an extended amount of time to select multiple media items to upload. For example, if the user wants to upload media items, the user may have to search through a database and individually select media items, which may be time consuming if many media items are to be selected. In addition, if media items correspond to videos files, it may take a viewer an extended amount of time to view each video to determine whether the video is to be uploaded. For example, the viewer may have to select and play each video separately, which may be a time consuming process.

IV. SUMMARY

When a user captures a media item (e.g., an image or video) using a mobile device, the mobile device may process the media item and store the media item into a memory. For example, processing the media items may include generating a feature vector for each media item to identify metrics associated with each media item, and the mobile device may store each feature vector in the memory. Each metric may correspond to a particular characteristic, such as a time the media item was captured, colors in the media item, a geographic location corresponding to the media item, etc. When the user elects to transfer a particular media item from the mobile device, the mobile device may automatically determine other stored media items with similar characteristics to the particular media item based on the identified metrics associated with the particular media item. For example, if the user elects to transfer a first image from a vacation (e.g., a first vacation photograph) from the mobile device, the mobile device may automatically search a database to locate additional images from the vacation (e.g., additional photographs or videos from the vacation) based on metrics (e.g., a geographic location, a time, facial features, etc.) associated with the first image.

In a particular embodiment, a method includes receiving, at a processor of an electronic device, a user selection of a media item to be transferred from the electronic device to a remote device. The method also includes selecting another media item based on a similarity (e.g., a similar geographic location, a similar time of capture, etc.) of the other media item to the selected media item prior to transferring the media item and the other media item to the remote device.

In another particular embodiment, an apparatus includes a memory and a processor coupled to the memory. The processor is configured to receive a user selection of a media item to be transferred to a remote device. The processor is further configured to select another media item based on a similarity of the other media item to the selected media item prior to transferring the media item and the other media item to the remote device.

In another particular embodiment, a method includes generating, at a processor of an electronic device, a first feature vector of a first image in response to capturing the first image. The first feature vector includes values of metrics associated with the first image. The method also includes determining at least one other image that is similar to the first image based on the first feature vector prior to transferring the first image to a remote device.

In another particular embodiment, an apparatus includes a memory and a processor coupled to the memory. The processor is configured to generate a first feature vector of a first image. The first feature vector includes values of metrics associated with the first image (e.g., data values that identify characteristics of the first image). The processor is further configured to determine at least one other image that is similar to the first image based on the first feature vector prior to transferring the first image to a remote device.

In another particular embodiment, a method includes generating, at a processor of an electronic device, a first feature vector of a first video in response to capturing the first video. The first feature vector includes values of metrics associated with the first video. The method further includes determining at least one other video that is similar to the first video based on the first feature vector prior to transferring the first video to a remote device.

In another particular embodiment, an apparatus includes a memory and a processor coupled to the memory. The processor is configured to generate a first feature vector of a first video. The first feature vector includes values of metrics associated with the first video. The processor is further configured to determine at least one other video that is similar to the first video based on the first feature vector prior to transferring the first video to a remote device.

In another particular embodiment, a mobile device includes a memory and a processor coupled to the memory. The processor is configured to determine values of metrics corresponding to media items stored in the memory. The mobile device also includes a user interface device coupled to the processor. The user interface device is configured to display an emulated three-dimensional representation of at least a portion of the media items. The three-dimensional representation includes a first axis associated with a first metric of the media items in the portion, a second axis associated with a second metric of the media items in the portion, and a third axis associated with a third metric of the media items in the portion. A representation of each particular media item of the portion is positioned relative to the first axis, the second axis, and the third axis based on the values of the metrics associated with the particular media item.

In another particular embodiment, a mobile device includes a memory and a processor coupled to the memory. The processor is configured to determine values of metrics corresponding to media times stored in the memory. The mobile device also includes a user interface device coupled to the processor. The user interface device is configured to display a two-dimensional representation of at least a portion of the media items. The two-dimensional representation includes a first axis associated with a first metric of the media items in the portion and a second axis associated with a second metric of the media items in the portion. A representation of each particular media item of the portion is positioned relative to the first axis and the second axis based on the values of the metrics associated with the particular media item.

In another particular embodiment, a method includes generating, at a mobile device that includes an image sensor, metrics associated with a first image in response to an image capture of the first image via the image sensor. Each metric of the first image corresponds to a particular characteristic of the first image. The method also includes determining a weight of a particular metric. The weight is based on a historical frequency of categorizing images having similar values of the particular metric as similar images. For example, the historical frequency of categorizing images may be based on previous user selections of images. The method also includes determining at least one other image that is similar to the first image based on the particular metric in response to a determination that the weight satisfies a threshold.

In another particular embodiment, an apparatus includes a memory and a processor coupled to the memory. The processor is configured to generate metrics associated with a first image. Each metric of the first image corresponds to a particular characteristic of the first image. The processor is further configured to determine a weight of a particular metric. The weight is based on a historical frequency of categorizing images having similar values of the particular metric as similar images. The processor is further configured to determine at least one other image that is similar to the first image based on the particular metric in response to a determination that the weight satisfies a threshold.

In another particular embodiment, a method includes receiving, at a processor of an electronic device, a first user selection of a media item. The method also includes comparing metrics associated with the media item to corresponding metrics associated with other media items in a collection of media items accessible to the processor. The method also includes applying a weighting to one or more of the metrics based on a set of stored weights to generate weighted comparison results. The method also includes selecting one or more of the other media items based on the weighted comparison results.

In another particular embodiment, an apparatus includes a memory and a processor coupled to the memory. The processor is configured to receive a first user selection of a media item. The processor is further configured to compare metrics associated with the media item to corresponding metrics associated with other media items in a collection of media items accessible to the processor. The processor is further configured to apply a weighting to one or more of the metrics based on a set of stored weights to generate weighted comparison results. The processor is further configured to select one or more of the other media items based on the weighted comparison results.

In another particular embodiment, a method includes receiving a first user selection of a media item having a first media type. The method also includes selection of another media item having another media type based on at least one of a time stamp of the other media item, a geographic location associated with the other media item, or textual information associated with the other media item. The method also includes generating a logical group of media items that includes the media item and the other media item to enable file transfer instructions received from a user interface to be applied to all media items in the logical group.

In another particular embodiment, an apparatus includes a memory and a processor coupled to the memory. The processor is configured to receive a first user selection of a media item having a first media type. In response to receiving the first user selection, the processor is further configured to select another media item having another media type based on at least one of a time stamp of the other media item, a geographic location associated with the other media item, or textual information associated with the other media item. The processor is further configured to generate a logical group of media items that includes the media item and the other media item to enable file transfer instructions received from a user interface to be applied to all media items in the logical group.

In another particular embodiment, a method includes receiving, at a computer, data from a mobile device via a communication link connecting the computer to the mobile device. The data includes a user selection of a media item to be transferred from the mobile device to the computer. The method also includes receiving another media item from the mobile device based on a similarity of the other media item to the selected media item.

In another particular embodiment, a computer includes a memory and a processor coupled to the memory. The processor is configured to receive data from a mobile device via a communication link connecting the computer to the mobile device. The data includes a user selection of a media item to be transferred from the mobile device to the computer. The processor is further configured to receive another media item from the mobile device based on a similarity of the other media item to the selected media item.

In another particular embodiment, a processor is configured to receive data from a mobile device in response to a communication link connecting the computer to the mobile device. The information includes values of metrics corresponding to media items stored in the mobile device. The computer also includes a user interface device coupled to the processor. The user interface device is configured to display an emulated three-dimensional representation of at least a subset of the media items. The three-dimensional representation includes a first axis associated with a first metric of the media items in the subset, a second axis associated with a second metric of the media items in the subset, and a third axis associated with a third metric of the media items in the subset. A representation of each particular media item of the subset is positioned relative to the first axis, the second axis, and the third axis based on the values of the metrics associated with the particular media item.

In another particular embodiment, a user interface device is configured to display a two-dimensional representation of at least a subset of the media items. The two-dimensional representation includes a first axis associated with a first metric of the media items in the subset and a second axis associated with a second metric of the media items in the subset. A representation of each particular media item of the subset is positioned relative to the first axis and the second axis based on the values of the metrics associated with the particular media item.

In a particular embodiment, a method includes generating, at a mobile device, a collection of media items based on a group of metrics in response to capturing a first media item. The group of metrics includes particular metrics that are used to determine whether media items are similar to one another. The method also includes receiving an indication of user-selected media items of the collection of media items. The method also includes modifying a weight for one or more metrics in the group of metrics based on the user-selected media items.

In a particular embodiment, an apparatus includes a memory and a processor coupled to the memory. The processor is configured to generate a collection of media items based on a group of metrics in response to capturing a first media item. The group of metrics includes particular metrics that are used to determine whether media items are similar to one another. The processor is further configured to receive an indication of user-selected media items of the collection of media items. The processor is further configured to modify a weight for one or more metrics in the group of metrics based on the user-selected media items.

In another particular embodiment, a method includes receiving, at a mobile device, a selection of a first media item transferred from the mobile device to a remote device. The method includes selecting, by the mobile device, a second media item to transfer to the remote device based on a similarity of the second media item to the first media item. The method further includes generating, by the mobile device, packaged moment data to transfer to the remote device. The packaged moment data may include media data associated with multiple media items including the first media item and the second media item.

In another particular embodiment, a mobile device includes a memory and a processor coupled to the memory. The processor may be configured to receive user input selecting a first media item. The processor may be configured to perform a comparison of information descriptive of the first media item to information descriptive of one or more additional media items. The processor may be configured to select, based on the comparison, a second media item. The processor may be further configured to generate packaged moment data including media data associated with the first media item and the second media item.

In another particular embodiment, a non-transitory computer-readable medium includes instructions that, when executed by a processor within a mobile device, cause the processor to receive a selection of a first media item transferred from the mobile device to a remote device. The non-transitory computer-readable medium includes instructions that, when executed by the processor, cause the processor to select a second media item to transfer to the remote device based on a similarity of the second media item to the first media item. The non-transitory computer-readable medium further includes instructions that, when executed by the processor, cause the processor to generate packaged moment data to transfer to the remote device. The packaged moment data may include media data associated with multiple media items including the first media item and the second media item.

In another particular embodiment, a mobile device includes means for receiving a selection of a first media item transferred from the mobile device to a remote device. The mobile device further includes means for selecting a second media item to transfer to the remote device based on a similarity of the second media item to the first media item. Packaged moment data may include media data associated with multiple media items including the first media item and the second media item.

One particular advantage provided by at least one of the disclosed embodiments is a reduced amount of time with respect to selecting and transferring media items having similar characteristics from a mobile device. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
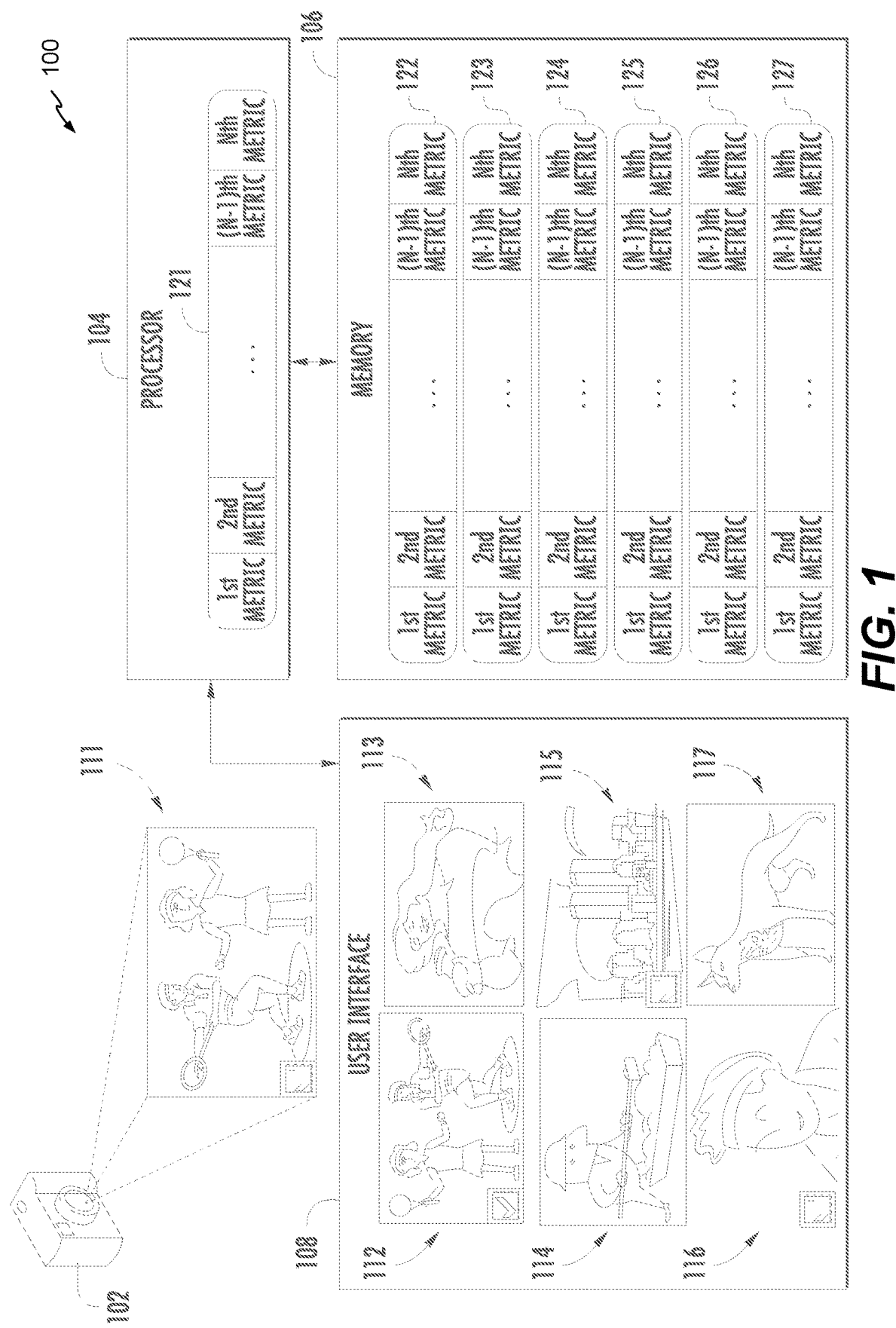
FIG. 1 is a diagram of a particular illustrative embodiment of a system that is operable to select images having similar characteristics to a captured image.

Referring to FIG. 1, a particular illustrative embodiment of a system 100 operable to select images having similar characteristics to a captured image is shown. The system 100 may include an electronic device 102. The electronic device 102 may include a processor 104, a memory 106, and a user interface device 108. In a particular embodiment, the electronic device 102 may be a mobile device that includes an image sensor that is configured to capture images. For example, the electronic device 102 may capture a first image 111 via the image sensor.

The processor 104 is configured to generate metrics of the first image 111 in response to the image sensor of the electronic device 102 capturing the first image 111. For example, the processor 104 may generate a first feature vector 121 of the first image 111 in response to the image sensor capturing the first image 111. The first feature vector 121 may identify metrics of the first image 111. The first feature vector 121 may identify N metrics, where N is any integer greater than zero. For example, in a particular embodiment, N may be equal to nine and the first feature vector 121 may identify nine metrics of the first image 111.

Each metric may correspond to different characteristics of the first image 111. For example, a metric may correspond to a geographic location of the first image 111, a time the first image 111 was captured, color components of the first image 111, edge components in the first image 111, faces in the first image 111, objects in the first image 111, a wireless network (e.g., Wifi) signal strength detected at the electronic device 102 when the first image 111 was captured, a direction the electronic device 102 was pointing when the first image 111 was captured, audio qualities before and/or after the first image 111 was captured, etc. In a particular embodiment, the wireless network signal strength may be used to detect whether the first image 111 is captured indoors or outdoors. For example, a strong signal strength may correspond to the first image 111 corresponding to being captured indoors and a weak signal strength may correspond to the first image 111 being captured outdoors.

As illustrative non-limiting examples, the first metric of the first feature vector 121 may correspond to a geographic location of the first image 111 and the processor 104 may use a global positioning system (GPS) to determine GPS coordinates that correspond to the geographic location of the first image 111. In the illustrated embodiment, the first metric may identify GPS coordinates that correspond to New York City, N.Y. The second metric of the first feature vector 121 may correspond to a time the first image 111 was captured by the electronic device 102. In the illustrated embodiment, the time corresponding to the second metric may be 3:00 pm on Aug. 31, 2002. The third metric of the first feature vector 121 may correspond to faces in the first image 111. In the illustrated embodiment, the processor 104 may recognize first facial features of a first face in the first image 111 as similar to facial features in one or more other images in the memory 106 and second facial features of a second face in the first image 111 as similar to facial features in one or more other images in the memory 106.

The memory 106 may include feature vectors 122-127 that identify metrics of images 112-117 stored in the electronic device 102. For example, the memory 106 may include a second feature vector 122 of a second image 112, a third feature vector 123 of a third image 113, a fourth feature vector 124 of a fourth image 114, a fifth feature vector 125 of a fifth image 115, a sixth feature vector 126 of a sixth image 116, and a seventh feature vector 127 of a seventh image 117. Each metric in the feature vectors 122-127 may correspond to the same metric in the first feature vector 121. For example, if the first metric of the first feature vector 121 corresponds to a geographic location of the first image 111, then the first metric of the second feature vector 122 corresponds to a geographic location of the second image 112, the first metric of the third feature vector 123 corresponds to a geographic location of the third image 113, etc. The images 112-117 stored in the electronic device 102 may be viewable by a user via the user interface device 108.

The processor 104 is further configured to determine at least one other image that is similar to the first image 111 based on the first feature vector 121. In a particular embodiment, the processor 104 may determine at least one other image that is similar to the first image 111 in response to capturing the first image 111. In another embodiment, the processor 104 may determine at least one other image that is similar to the first image 111 in response to a user request to transfer the first image 111 or a user selection of the first image 111, as explained in further detail with respect to FIG. 6. For example, the processor 104 may compare the first feature vector 121 to the second feature vector 122 stored in the memory 106. In a particular embodiment, the processor 104 may use an algorithm such as $F_{12}=w_1*Norm_1[g(IMG_1)-g(IMG_2)]+w_2*Norm_2[t(IMG_1)-t(IMG_2)]+w_3*Norm_3[f(IMG_1)-f(IMG_2)]$ to compare the first feature vector 121 to the second feature vector 122, where $F_{12}$ is a level of similarity between metrics of the first image 111 and metrics of the second image 112, $w_1$ is a first weight of a metric corresponding to geographic location, $w_2$ is a second weight of a metric corresponding to time, and $w_3$ is a third weight of a metric corresponding to detected facial features.

The difference between the GPS coordinates of the first image 111 and the GPS coordinates of the second image 112 (e.g., $g(IMG_1)-g(IMG_2)$) may be normalized based on a first normalization factor ($Norm_1$) and multiplied by the first weight. The difference between the time of capture of the first image 111 and the time of capture of the second image 112 (e.g., $t(IMG_1)-t(IMG_2)$) may be normalized based on a second normalization factor ($Norm_2$) and multiplied by the second weight. The difference between the data corresponding to the facial features in the first image 111 and data corresponding to the facial features in the second image 112

(e.g., f(IMG$_1$)−f(IMG$_2$)) may be normalized based on a third normalization factor (Norm$_3$) and multiplied by the third weight.

Each normalization factor may be computed based on a similarity function of a particular metric that approaches zero as the similarity value of data decreases and approaches one as the similarity value of data increases. For example, each normalization factor may be expressed as a Gaussian function (e.g., a Gaussian curve) having a peak value equal to one and a standard deviation based on characteristics of the particular metric, where the peak is present when the similarity value of data being compared reaches a maximum value. As another example, each normalization factor may be expressed as an absolute value of an arc cotangent function (or a Spline function) having a peak value equal to one, where the peak is present when the similarity value of data being compared reaches a maximum value.

In a particular embodiment, similarity ranges for each metric are used as reference points for the corresponding normalization factor. For example, if a difference in location of two media items being compared (e.g., images, videos, etc.) is within a particular range (e.g., 100 feet), the first normalization factor may correspond to a peak value. As another example, if a time difference between the capture time of two media items being compared is within a particular range (e.g., less than five seconds), the second normalization factor may correspond to a peak value.

The values of the weights may be adjusted based on a priority or relevance of a particular metric. For example, in a particular embodiment, a user may input a value for each particular weight based on a priority or relevance of a corresponding metric. If geographic location has a higher priority to the user than facial feature recognition, the user may input a large value for the first weight and a smaller value for the third weight. In another embodiment, a machine (e.g., the processor 104) may automatically apply values for each particular weight based on historical data corresponding to user preferences. For example, the processor 104 may apply a greater value for the first weight and a smaller value for the third weight if the user has historically modified images selected by the processor 104 or otherwise selected images to include images having similar geographic locations.

The processor 104 may determine that the second image 112 is similar to the first image 111 when the level of similarity (e.g., F$_{12}$) between the metrics of the first image 111 and the metrics of the second image 112 satisfies a threshold. For example, the second image 112 and the first image 111 may have similar GPS coordinates, similar data corresponding to facial features (e.g., similar faces), and may have been captured at a similar time. In a particular embodiment, the processor 104 may determine that the fifth image 115 is similar to the first image 111 predominately based on a metric corresponding to location. In the illustrative embodiment, the first image 111 and the fifth image 115 may be captured in a similar location (e.g., New York City, N.Y.). If the first weight (e.g., the weight corresponding to the geographic location) has a high value, the level of similarity between the first image 111 and the fifth image 115 may satisfy the threshold. In a particular embodiment, the processor 104 may determine that the sixth image 116 is similar to the first image 111 based primarily on a metric corresponding to detected facial features. In the illustrative embodiment, the first image 111 and the sixth image 116 may have data corresponding to similar facial features (e.g., the facial features of Male Player). If the third weight (e.g., the weight corresponding to detected facial features) has a high value, the level of similarity between the first image 111 and the sixth image 116 may satisfy the threshold.

The processor 104 may cluster the first image 111 with at least one other similar image to generate a collection of images. For example, the processor 104 may cluster the first image 111 with the second image 112, the fifth image 115, the sixth image 116, or a combination thereof, to generate a collection of images depending on similarities of the metrics and the values of each weight. In a particular embodiment, the processor 104 is configured to generate a request to cluster the first image 111 with similar images, and the collection of images is generated based on the response to the request. In another particular embodiment, the processor 104 is configured to generate the collection of images in response to a user selection of the first image 111 for transfer (e.g., automatically, independent of user action requesting for a collection of images to be generated). The processor 104 may upload the collection of images to a social media website or send the collection of images to an electronic mail address, as illustrative, non-limiting examples.

Figure 2:
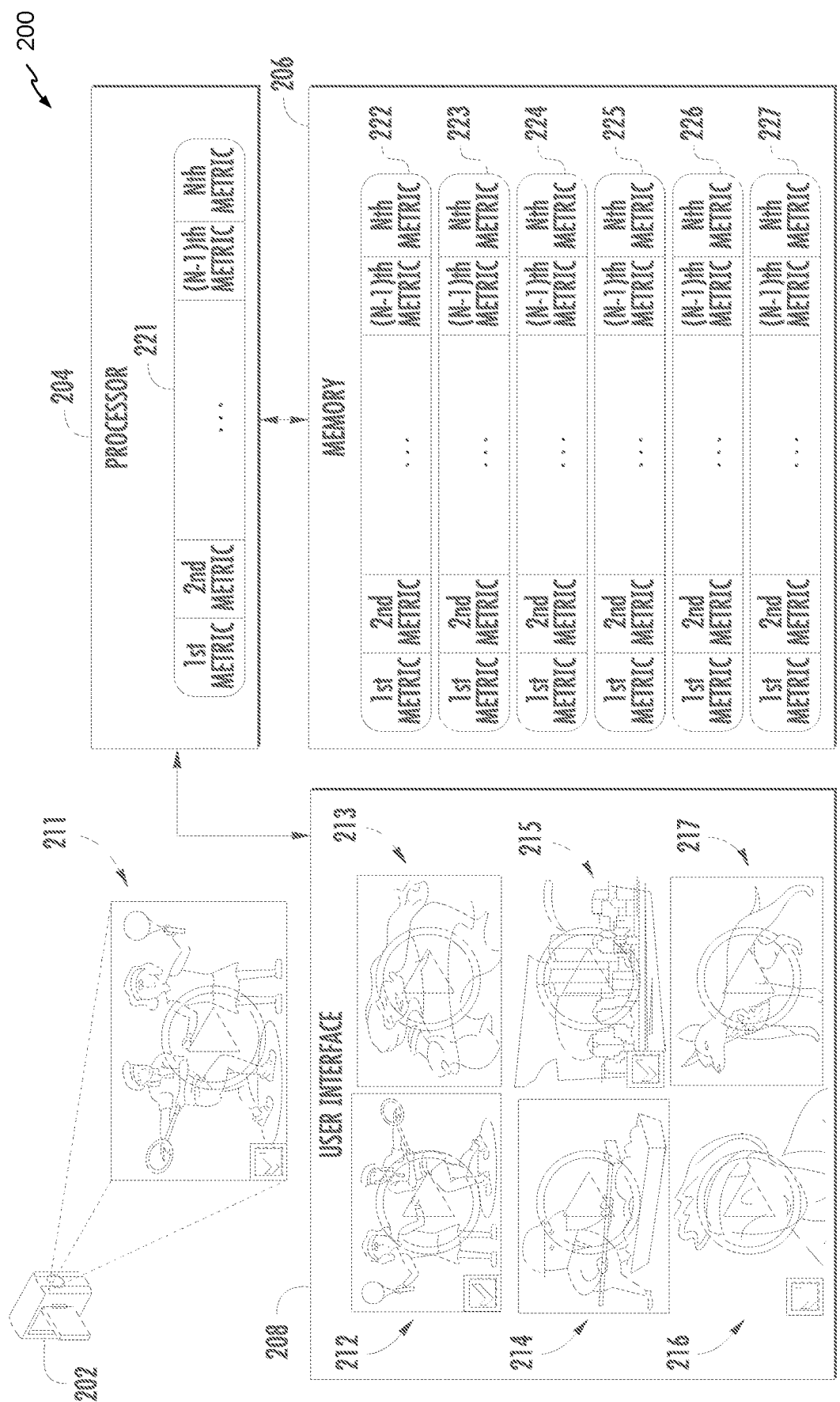
FIG. 2 is a diagram of a particular illustrative embodiment of a system that is operable to select videos having similar characteristics to a captured video.

Referring to FIG. 2, a particular illustrative embodiment of a system 200 operable to select videos having similar characteristics to a captured video is shown. The system 200 may include an electronic device 202. The electronic device 202 may include a processor 204, a memory 206, and a user interface device 208. In a particular embodiment, the electronic device 202 may be a mobile device that includes a motion image sensor that is configured to capture videos. For example, the electronic device 202 may capture a first video 211 via the motion image sensor. In a particular embodiment, the electronic device 202 may correspond to the electronic device 102 of FIG. 1 and operate in a substantially similar manner. The processor 204 may correspond to the processor 104 of FIG. 1 and operate in a substantially similar manner. The memory 206 may correspond to the memory 106 of FIG. 1 and operate in a substantially similar manner. The user interface device 208 may correspond to the user interface device 108 of FIG. 1 and operate in a substantially similar manner.

The processor 204 is configured to generate metrics of the first video 211 in response to the motion image sensor of the electronic device 202 capturing the first video 211. For example, the processor 204 may generate a first feature vector 221 of the first video 211 in response to the motion image sensor capturing the first video 211. The first feature vector 221 may identify metrics of the first video 211. The first feature vector 221 may identify N metrics, where N is any integer greater than zero. For example, in a particular embodiment, N may be equal to twelve and the first feature vector 221 may identify twelve metrics of the first video 211.

Each metric may correspond to different characteristics of the first video 211. For example, a metric may correspond to a geographic location of the first video 211, a time (e.g., a start time) the first video 211 was captured, color components of the first video 211, edge components in the first video 211, faces in the first video 211, objects in the first video 211, a wireless network (e.g., Wifi) signal strength detected at the electronic device 202 when the first video 211 was captured, a direction the electronic device 202 was pointing when the first video 211 was captured, audio qualities of the first video 211, etc.

As illustrative non-limiting examples, the first metric of the first feature vector 221 may correspond to a geographic location of the first video 211 and the processor 204 may use a global positioning system (GPS) to determine GPS coordinates that correspond to the geographic location of the first video 211. In the illustrated embodiment, the first metric may identify GPS coordinates that correspond to New York City, N.Y. The second metric of the first feature vector 221 may correspond to a time the first video 211 was captured by the electronic device 202. In the illustrated embodiment, the time corresponding to the second metric may be 3:00 pm on Aug. 31, 2002. The third metric of the first feature vector 221 may correspond to faces in the first video 211. In the illustrated embodiment, the processor 204 may recognize first facial features of a first face in the first video 211 as similar to facial features in one or more other images in the memory 206 and second facial features of a second face in the first video 211 as similar to facial features in one or more other images in the memory 206.

The memory 206 may include feature vectors 222-127 that identify metrics of videos 212-117 stored in the electronic device 202. For example, the memory 206 may include a second feature vector 222 of a second video 212, a third feature vector 223 of a third video 213, a fourth feature vector 224 of a fourth video 214, a fifth feature vector 225 of a fifth video 215, a sixth feature vector 226 of a sixth video 216, and a seventh feature vector 227 of a seventh video 217. Each metric in the feature vectors 222-127 may correspond to the same metric in the first feature vector 221. For example, if the first metric of the first feature vector 221 corresponds to a geographic location of the first video 211, then the first metric of the second feature vector 222 corresponds to a geographic location of the second video 212, the first metric of the third feature vector 223 corresponds to a geographic location of the third video 213, etc. The videos 212-217 stored in the electronic device 202 may be viewable by a user via the user interface device 208.

The processor 204 is further configured to determine at least one other video that is similar to the first video 211 based on the first feature vector 221. In a particular embodiment, the processor 204 may determine at least one other video that is similar to the first video 211 in response to capturing the first video 211. In another embodiment, the processor 204 may determine at least one other video that is similar to the first video 211 in response to a user request to transfer the first video 211. For example, the processor 204 may compare the first feature vector 221 to the second feature vector 222 stored in the memory 206. In a particular embodiment, the processor 204 may use an algorithm such as $F_{12}=w_1*Norm_1[g(IMG_1)-g(IMG_2)]+w_2*Norm_2[t(IMG_1)-t(IMG_2)]+w_3*Norm_3[f(IMG_1)-f(IMG_2)]$ to compare the first feature vector 221 to the second feature vector 222, where $F_{12}$ is a level of similarity between metrics of the first video 211 and metrics of the second video 212, $w_1$ is a first weight of a metric corresponding to geographic location, $w_2$ is a second weight of a metric corresponding to time, and $w_3$ is a third weight of a metric corresponding to detected facial features.

The difference between the GPS coordinates of the first video 211 and the GPS coordinates of the second video 212 (e.g., $g(IMG_1)-g(IMG_2)$) may be normalized based on a first normalization factor ($Norm_1$) and multiplied by the first weight. The difference between the time of capture of the first video 211 and the time of capture of the second video 212 (e.g., $t(IMG_1)-t(IMG_2)$) may be normalized based on a second normalization factor ($Norm_2$) and multiplied by the second weight. The difference between the data corresponding to the facial features in the first video 211 and data corresponding to the facial features in the second video 212 (e.g., $f(IMG_1)-f(IMG_2)$) may normalized based on a third normalization factor ($Norm_3$) and multiplied by the third weight.

The values of the weights may be adjusted based on an importance of a particular metric. For example, in a particular embodiment, a user may input a value for each particular weight based on an importance of a corresponding metric. If geographic location is more important to the user than facial feature recognition, the user may input a large value for the first weight and a smaller value for the third weight. In another embodiment, a machine (e.g., the processor 204) may automatically apply values for each particular weight based on historical data corresponding to user preferences.

The processor 204 may determine that the second video 212 is similar to the first video 211 when the level of similarity (e.g., $F_{12}$) between the metrics of the first video 211 and metrics of the second video 212 satisfies a threshold. For example, the second video 212 and the first video 211 may have similar GPS coordinates, similar data corresponding to facial features (e.g., similar faces), and may have been captured at a similar time.

The processor 204 may concatenate the first video 211 with at least one other similar video to generate a concatenated video. For example, the processor 204 may concatenate the first video 211 with the second video 212 to generate one video file that includes the first video 211 and the second video 212. In a particular embodiment, the processor 204 is configured to generate a request to concatenate the first video 211 with similar videos, and the concatenated video is generated based on the response to the request. In another particular embodiment, the processor 204 is configured to generate the concatenated video in response to selecting the first video 211 for transfer (e.g., independent of user action requesting to generate the concatenated video). The processor 204 may upload the concatenated video to a social media website or send the concatenated video to an electronic mail address.

Figure 3:
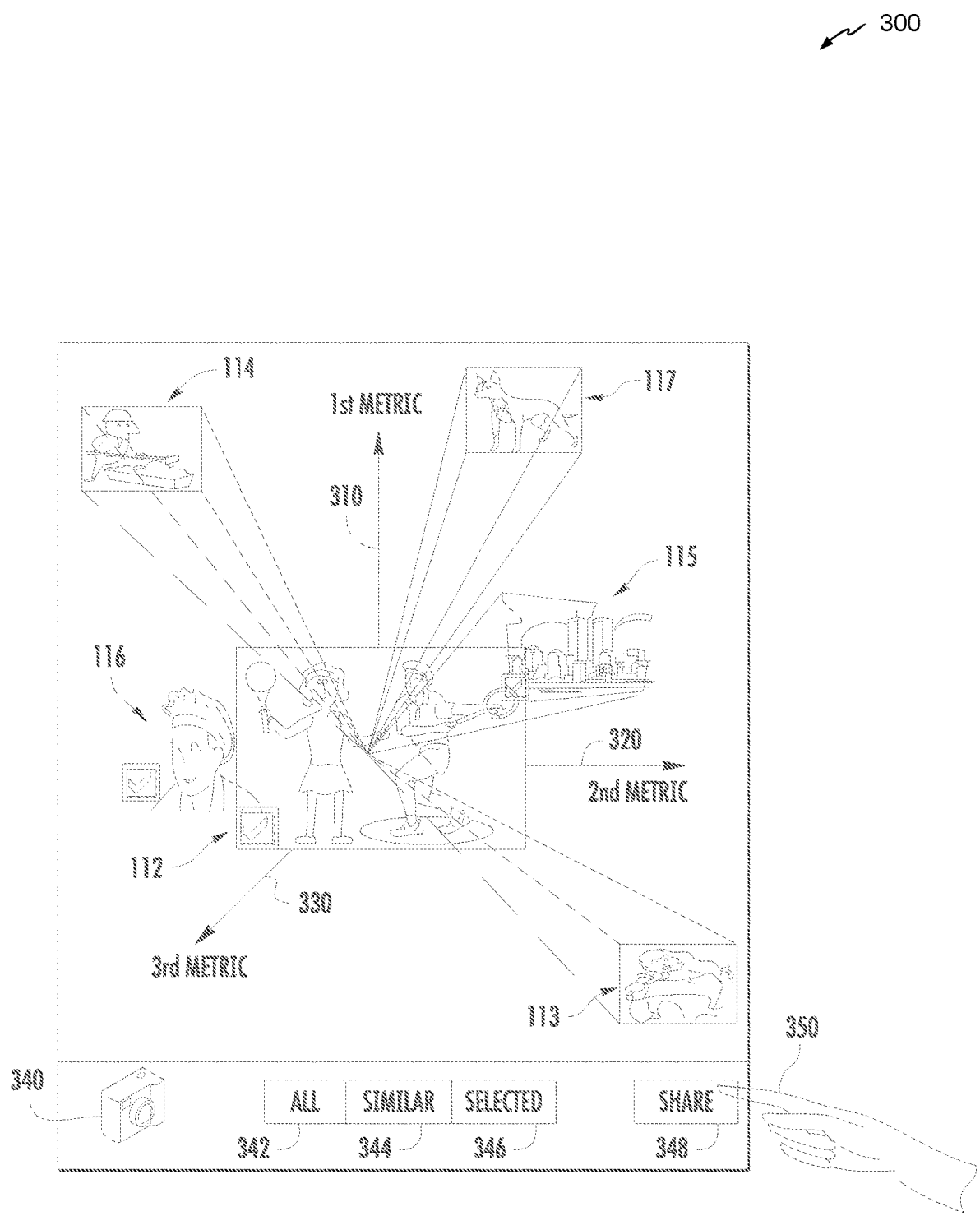
FIG. 3 is a diagram of a particular illustrative embodiment of a user interface device that is operable to display an emulated three-dimensional representation of media items.

Referring to FIG. 3, a particular embodiment of a user interface device 300 that is operable to display an emulated three-dimensional representation of media items is shown. In a particular embodiment, the user interface device 300 may correspond to the user interface device 108 of FIG. 1 or the user interface device 208 of FIG. 2. The user interface device 300 may include a touch screen display responsive to finger contact 350.

The three-dimensional representation of media items in the user interface device 300 may include a first axis 310 associated with a first metric of media items, a second axis 320 associated with a second metric of the media items, and a third axis 330 associated with a third metric of the media items. The media items may correspond to images, videos, text documents, or any combination thereof. For example, in the particular illustrated embodiment, the media items may correspond to the images 112-117 of FIG. 1. In another particular embodiment, the media items may correspond to the videos 212-217 of FIG. 2, or to a combination of the images 112-117 and the videos 212-217.

Each media item is positioned relative to the first axis 310, the second axis 320, and the third axis 330 based on values of the metrics. For example, the first axis 310 may be associated with the geographic location metric (e.g., the first metric) of the first image 111, the second axis 320 may be associated with the time metric (e.g., the second metric) of the first image 111, and the third axis 330 may be associated with the detected facial feature metric (e.g., the third metric) of the first image 111. The second image 112 may be positioned relatively close to the origin (e.g., touching each axis 310-330) because the second image 112 has a similar geographic location (e.g., New York City, N.Y.) of the first image 111, was captured at a similar time (e.g., around 3:00 pm on Aug. 31, 2002) in relation to the first image 111, and has similar detected facial features (e.g., Male Player and Female Player) as the first image 111. The fifth image 115 may be positioned relatively close to the zero crossing of the first axis 310 and to the zero crossing of the second axis 320 because the fifth image 115 has a similar geographic location of the first image 111 and may have been captured at a similar time in relation to the first image 111. In a particular embodiment, the fifth image 115 may be positioned relatively far from the zero crossing of the third axis 330 because the fifth image 115 may not have similar detected facial features in relation to the first image 111. The sixth image 116 may be positioned relatively close to the zero crossing of the third axis 330 because the sixth image 115 and the first image 111 have similar detected facial features (e.g., Male Player).

Images that are not determined to be similar to the first image 111 may appear smaller than the images determined to be similar to the first image 111. For example, the third, fourth, and seventh images 113, 114, 117, respectively, may appear smaller than the second, fifth, and sixth images 112, 115, 116, respectively.

A processor (e.g., the processor 104 of FIG. 1 and/or the processor 204 of FIG. 2) may be configured to select the first metric, the second metric, and the third metric from among a group of metrics at least partially based on historical user selection of media items to be grouped. For example, the processor may determine that the user has typically grouped media items that are similar according to geographic location, time, and/or facial features as compared to similarities according to other aspects (e.g., color content or environmental audio characteristics at the time of capture). As a result, the processor may determine to consider geographic location, time, and detected facial features metrics when determining whether media items (e.g., images) are similar. Thus, the relevance of each particular metric of the group of metrics may be determined at least partially based on a frequency that the particular metric is used in categorizing media items. Alternatively, the metrics may be user-selectable. For example, the user may select and/or adjust weight values assigned to different metrics, and the metrics with the greatest weight values may correspond to the first, second, and third axis 310-330.

The user interface device 300 may also include a capture selector 340, a first selector 342, a second selector 344, a third selector 346, and a share selector 348. Each selector 340-348 may be responsive to finger contact 350. The capture selector 340 may navigate a user to a screen that permits the user to capture another image. Upon capturing the other image, a feature vector for the other image may be generated by a processor and compared to other feature vectors in the memory (e.g., the memory 106 of FIG. 1 and/or the memory 206 of FIG. 2). The first selector 342 may select all of the images 112-117 displayed via the user interface device 300. The second selector 344 may select the images 112, 115, 116 that the processor has determined are similar to the captured image (e.g., the first image 111) based on the weighted metrics. The third selector 346 may permit the user to randomly select images 112-117 displayed via the user interface device 300, such as by activating or deactivating a check box associated with each image.

The share selector 348 may permit the user to share the selected images. For example, in response to detecting user activation of the share selector 348, the processor may transfer the selected images to another device, upload the selected images to a social media website, send the selected images to an electronic mail address, share the images via short message service (SMS) message, or any combination thereof.

Figure 4:
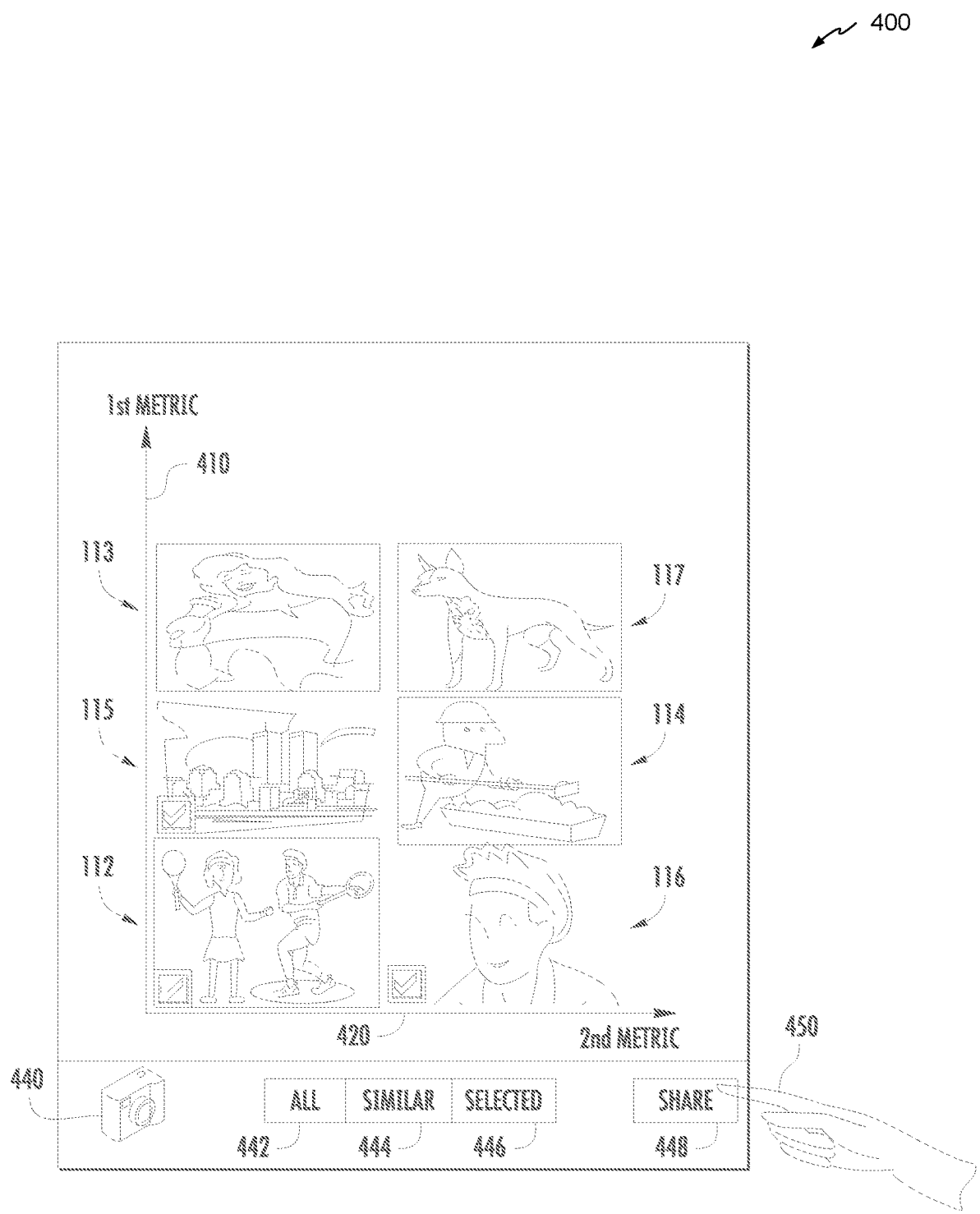
FIG. 4 is a diagram of a particular illustrative embodiment of a user interface device that is operable to display a two-dimensional representation of media items.

Referring to FIG. 4, a particular embodiment of a user interface device 400 that is operable to display a two-dimensional representation of media items is shown. In a particular embodiment, the user interface device 400 may correspond to the user interface device 108 of FIG. 1 or the user interface device 208 of FIG. 2. The user interface device 400 may include a touch screen display responsive to finger contact 450.

The two-dimensional representation of media items in the user interface device 400 may include a first axis 410 associated with a first metric of media items and a second axis 420 associated with a second metric of the media items. The media items may correspond to images, videos, text documents, or any combination thereof. For example, in the particular illustrated embodiment, the media items may correspond to the images 112-117 of FIG. 1. In another particular embodiment, the media items may correspond to the videos 212-217 of FIG. 2, or to a combination of the images 112-117 and the videos 212-217.

Each media item is positioned relative to the first axis 410 and the second axis 420 based on values of the metrics. For example, the first axis 410 may be associated with the geographic location metric (e.g., the first metric) of the first image 111 and the second axis 420 may be associated with the detected facial feature metric (e.g., the third metric) of the first image 111. The second image 112 may be positioned relatively close to the origin (e.g., touching each axis 410, 420) because the second image 112 has a similar geographic location (e.g., New York City, N.Y.) of the first image 111 and has similar detected facial features (e.g., Male Player and Female Player) as the first image 111. The fifth image 115 may be positioned relatively close to the first axis 410 because the fifth image 115 has a similar geographic location of the first image 111. The sixth image 116 may be positioned relatively close to the second axis 420 because the sixth image 115 and the first image 111 have similar detected facial features (e.g., Male Player).

A processor (e.g., the processor 104 of FIG. 1 and/or the processor 204 of FIG. 2) may be configured to select the first metric and the second metric from among a group of metrics at least partially based on historical user selection of media items to be grouped. For example, the processor may determine that the user has typically grouped media items that are similar according to geographic location and facial features as compared to similarities according to other aspects (e.g., time, color content, or environmental audio characteristics at the time of capture). As a result, the processor may determine to consider geographic location and detected facial features metrics when determining whether media items (e.g., images) are similar. Thus, the relevance or priority of each particular metric of the group of metrics may be determined at least partially based on a frequency that the particular metric is used in categorizing media items. Alternatively, the metrics may be user-selectable. For example, the user may select and/or adjust weight values assigned to different metrics and the metrics with the greatest weight values may correspond to the first and second axis 410, 420.

The user interface device 400 may also include a capture selector 440, a first selector 442, a second selector 444, a third selector 446, and a share selector 448. Each selector 440-348 may be responsive to finger contact 450. The capture selector 440, the first selector 442, the second selector 444, the third selector 446, and the share selector 448 may correspond to the capture selector 340 of FIG. 3, the first selector 342 of FIG. 3, the second selector 344 of FIG. 3, the third selector 346 of FIG. 3, and the share selector 348 of FIG. 3, respectively, and may operate in a substantially similar manner.

Figure 5:
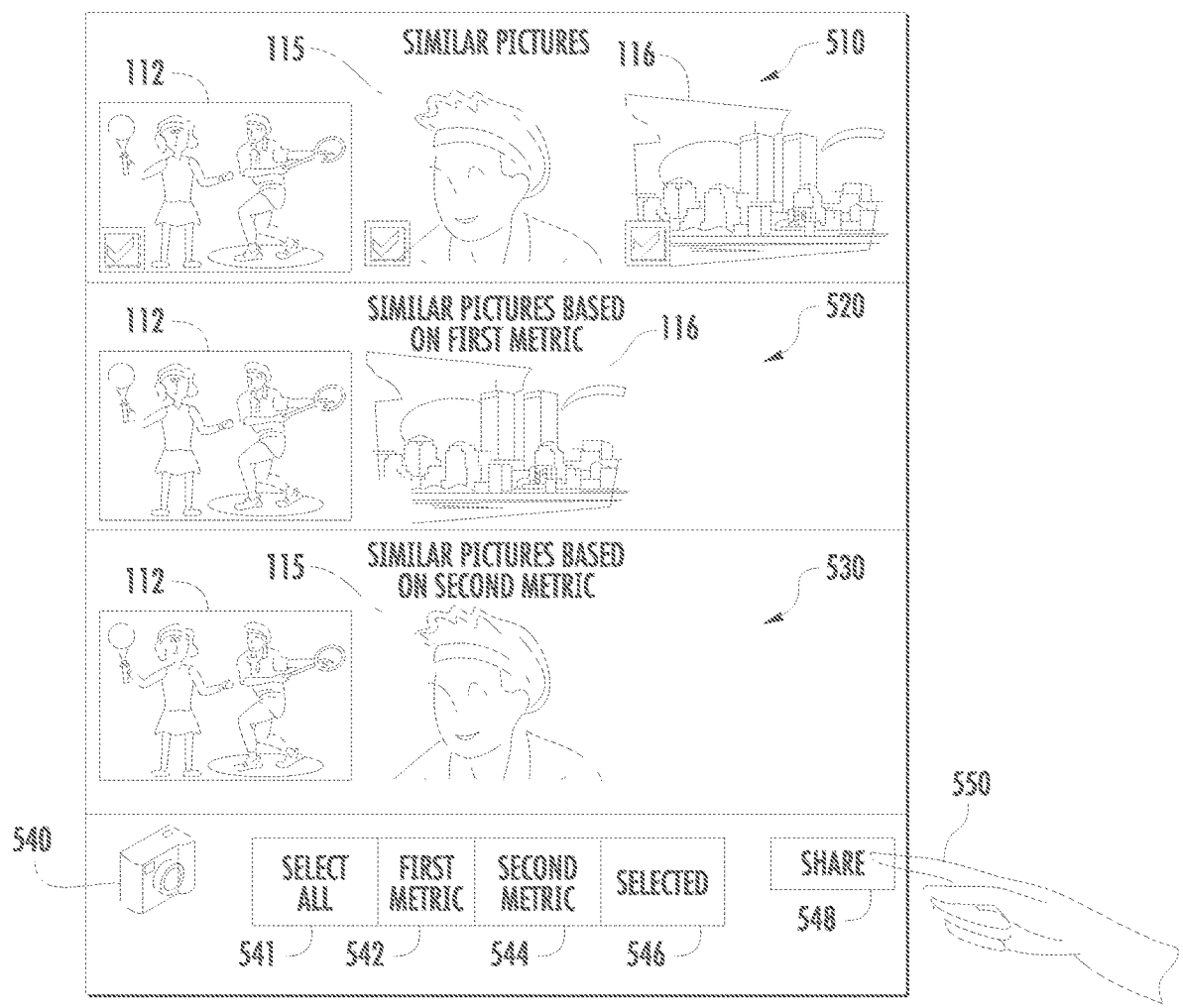
FIG. 5 is a diagram of another particular illustrative embodiment of a user interface device that is operable to display a two-dimensional representation of media items.

Referring to FIG. 5, a particular embodiment of a user interface device 500 that is operable to display a two-dimensional representation of media items is shown. In a particular embodiment, the user interface device 500 may correspond to the user interface device 108 of FIG. 1 or the user interface device 208 of FIG. 2. The user interface device 500 may include a touch screen display responsive to finger contact 550.

The two-dimensional representation of media items in the user interface device 500 may include a first row 510, a second row 520, and a third row 530. The first row 510 may be associated with multiple metrics of the media items. The second row 520 may be associated with a first metric of the media items and the third row 530 may be associated with a second metric of the media items. Borders of each row 510-530 may have colors based on the associated metric. For example, a border of the second row 520 may be a particular color (e.g., red) based on the second metric (e.g., time), and a border of the third row 530 may be another color (e.g., blue) based on the third metric (e.g., facial features). Thus, each metric presented via the user interface device 500 may include a border having a distinct color. The media items may correspond to images, videos, text documents, or any combination thereof. For example, in the particular illustrated embodiment, the media items may correspond to the images 112-117 of FIG. 1. In another particular embodiment, the media items may correspond to the videos 212-217 of FIG. 2, or to a combination of the images 112-117 and the videos 212-217.

Media items are positioned in the rows 510-530 based on values of the metrics. For example, the first row 510 may be associated with an overall similarity (e.g., $F_{12}$ of FIG. 1 based on metrics corresponding to a geographic location of the first image 111, time of capture of the first image 111, and detected facial features in the first image 111). The second image 112, the fifth image 115, and the sixth image 116 may be positioned in the first row 510 in order of similarity (e.g., by value of $F_{12}$) due to each image 112, 115, 116 having at least one metric (or a combination of metrics) having similar values with respect to the first image 111. For example, values of the geographic location metric, the time metric, and the detected facial feature metric of the first and second images 111, 112 may be similar. The detected facial feature metric of the first and fifth images 111, 115 may be similar, and the time metric of the first and sixth image 116 may be similar. The second row 520 may be associated with a metric solely corresponding to a geographic location of the first image 111. Thus, the second and sixth images 112, 116 may be positioned in the second row 520 in response to having similar geographic locations with respect to the first image 111. The third row 530 may be associated with a metric solely corresponding to detected facial features in the first image. Thus, the second and fifth images 112, 115 may be positioned in the third row 530 in response to having similar facial features with respect to the first image 111.

A processor (e.g., the processor 104 of FIG. 1 and/or the processor 204 of FIG. 2) may be configured to select the first metric of the second row 520 and the second metric of the third row 530 from among a group of metrics at least partially based on historical user selection of media items to be grouped. For example, the processor may determine that the user has typically grouped media items that are similar according to geographic location and facial features as compared to similarities according to other aspects (e.g., color content or environmental audio characteristics at the time of capture). As a result, the processor may determine to consider geographic location and detected facial features as metrics when determining whether media items (e.g., images) are similar. Thus, the relevance of each particular metric of the group of metrics may be determined at least partially based on a frequency that the particular metric is used in categorizing media items. Alternatively, the metrics, and thus the characteristics indicated in the second and third rows 520, 530, may be user-selectable. For example, the user may select and/or adjust weight values to different metrics and the metrics with the greatest weight values may correspond to the second and third rows 520, 530.

The user interface device 500 may also include a capture selector 540, a "select all" selector 541, a first metric selector 542, a second metric selector 544, a fourth selector 546, and a share selector 548. Each selector 540-548 may be responsive to finger contact 550. The capture selector 540 may correspond to the capture selectors 340, 440 of FIGS. 3-4 and may operate in a substantially similar manner. The share selector 548 may correspond to the share selectors 348, 448 of FIGS. 3-4 and may operate in a substantially similar manner. The "select all" selector 541 may select all of the images in the first row 510, the first metric selector 542 may select all of the images in the second row 520, and the second metric selector 544 may select all of the images in the third row 530. The fourth selector 546 may permit the user to randomly select images displayed via the user interface device 500, such as by activating or deactivating a check box associated with each image.

Figure 6:
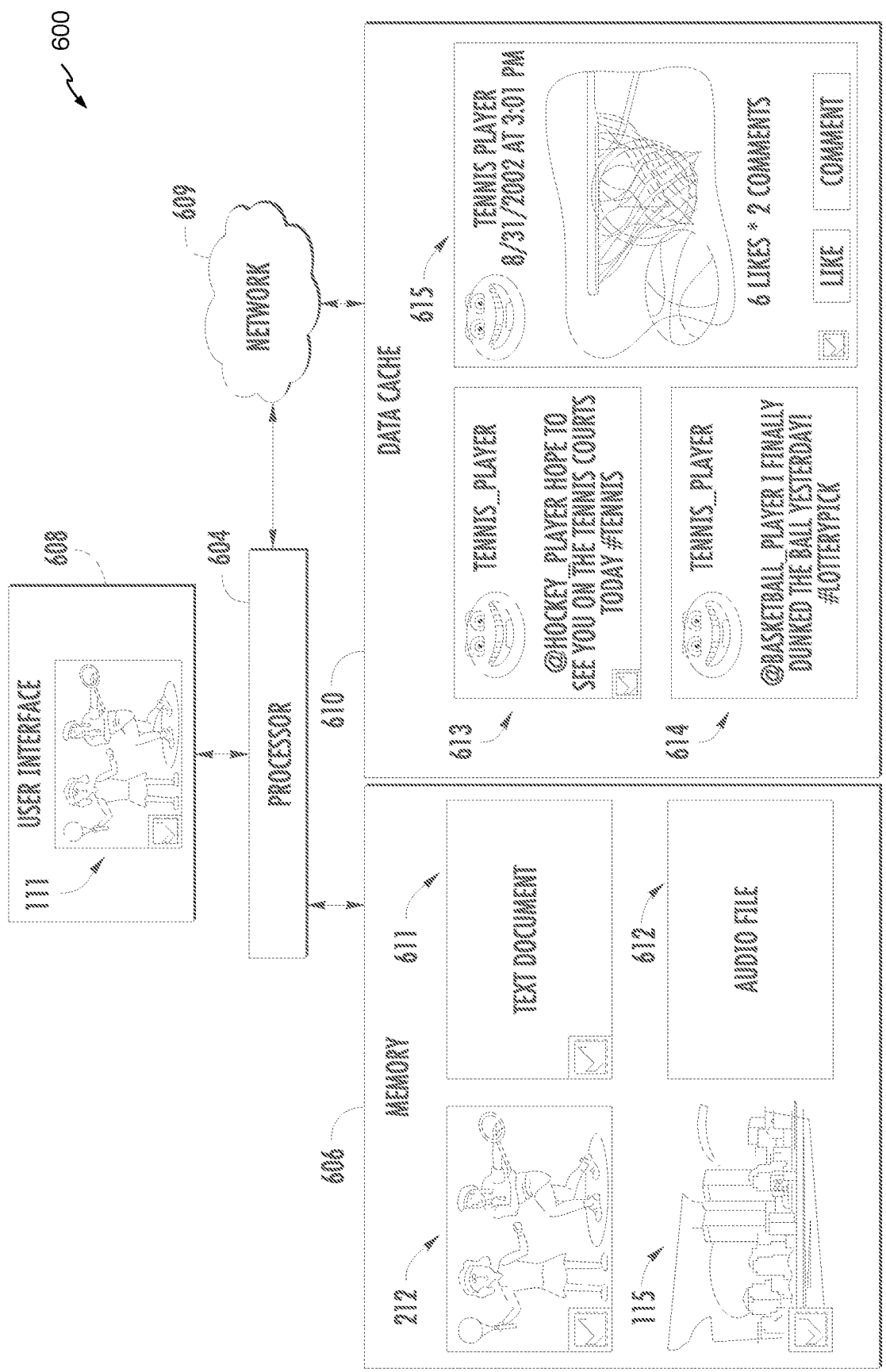
FIG. 6 is a diagram of a particular illustrative embodiment of a system that is operable to select other media items having similar characteristics to a selected media item.

Referring to FIG. 6, a particular illustrative embodiment of a system 600 operable to select other media items having similar characteristics to selected media item is shown. The system 600 may include a processor 604, a memory 606, a user interface device 608, and a data cache 610. In a particular embodiment, the processor 604 may correspond to the processors 104-204 of FIGS. 1-2 and operate in a substantially similar manner, the memory 606 may correspond to the memories 106-206 of FIGS. 1-2 and operate in a substantially similar manner, and the user interface device 608 may correspond to the user interface devices 108-208 of FIGS. 1-2 or the user interface devices 300-500 of FIGS. 3-5 and operate in a substantially similar manner.

The memory 606 may store files corresponding to different media types. For example, the memory 606 may store files corresponding to images (e.g., JPEG, GIF, TIFF, PNG, BITMAP), files corresponding to audio and/or video (e.g., WMV, MP3, MP4), or files corresponding to text documents, etc. The memory 606 may store the feature vectors 121-127 of FIG. 1, the feature vectors 221-227 of FIG. 2, or any combination thereof. For ease of illustration, in the illustrated embodiment, the memory 606 includes the second video 212 and the fifth image 115. However, the memory 606 may also store the second feature vector 222 corresponding to the second video 212 and the fifth feature vector 125 corresponding to the fifth image 115. The memory 606 may also store text documents (e.g., a first text document 611) and corresponding feature vectors, and the memory 606 may store audio files (e.g., a first audio file 612) and corresponding feature vectors. In a particular embodiment, the first text document 611 may correspond to a word processing document, a spreadsheet document, etc. The memory 606 may also store short message service (SMS) text messages. In a particular embodiment, the first text document 611 may correspond to a SMS text message.

The data cache 610 may be accessible to the processor 604 via a network 609 and the data cache 610 may cache information from one or more different sources. For example, the data cache 610 may be accessible to the processor 604 via an internet connection and the processor 604 may search and retrieve content from the data cache 610 via the internet connection. The data cache 610 may cache an archive of social media postings and/or e-mails. In a particular embodiment, the data cache 610 (or multiple data caches) includes at least a first archive of a first social media service that is restricted to text messages, a second archive of a second social medial service that is restricted to images, or a third archive of a third social media service that is not restricted to text messages or to images. For example, the data cache 610 may include postings from social media websites including www.facebook.com, www.twitter.com, www.instagram.com, etc.

The data cache 610 may cache a first message 613 and a second message 614 stored in a social media service that is restricted to text messages. The data cache 610 may also cache a third message 615 stored in a social media service that is not restricted to text messages, videos, or images. In a particular embodiment, the data cache 610 may cache messages restricted to a least one of text messages, images, or videos. Although illustrated as a single data cache 610, multiple data caches may be accessible to the processor 604 via the network 609 (e.g., one data cache per social media service).

The processor 604 may be configured to receive a first user selection of a media item having a first media type. For example, a user may select the first image 111 via the user interface device 608. In a particular embodiment, the user interface device 608 is a touch-screen and the user may select the first image 111 via finger contact with the user interface device 608.

The processor 604 may receive the selection of the first image 111 and select another media item having another media type based on characteristics of the other media item. The processor 604 may select other media items from the memory 606 or from the data cache 610 that have similar metrics to the metrics of the first feature vector 121. For example, as explained with respect to FIG. 1, the first feature vector 121 (corresponding to the first image 111) may have metrics that identify GPS coordinates that correspond to New York City, N.Y., metrics that correspond to a time of 3:00 pm, and metrics that recognize first facial features of the first face (e.g., Male Player) in the first image 111 and second facial features of the second face (e.g., Female Player) in the first image 111. The processor 604 may select other media items based on a time stamp of the other media items, a geographic location associated with the other media items, or textual information associated with the other media items.

For example, the processor 604 may select the second video 212 from the memory 606 based primarily on a metric identifying the geographical location (e.g., New York City, N.Y.) of the second video 212 and a metric identifying the time (e.g., around 3:00 pm) the second video 212 was captured. The processor 604 may select the fifth image 115 from the memory 606 based primarily on a metric identifying the geographical location (e.g., New York City, N.Y.) of the fifth image 115. The processor 604 may select the first text document 611 based on textual information within the first text document 611. For example, the processor 604 may perform optical character recognition on the first image 111 to determine textual characters in the first image 111. The first text document 611 may include textual information that corresponds to the textual characters in the first image 111.

The processor 604 may also select the first message 613 (e.g., a social media posting) from the data cache 610. For example, the processor 604 may search for similarities between the first image 111 and textual information and/or hash-tags in the first message 613. In the particular embodiment, the first message 613 includes a hashtag (e.g., #Tennis) that corresponds to data in the first image 111. The processor 604 may also select the third message 615 (e.g., a social media posting) from the data cache 610. For example, the processor 604 may determine that the third message 615 was posted around a similar time (e.g. 3:01 pm on Aug. 31, 2002) as the time the first image 111 was captured.

In a particular embodiment, the processor 604 may select the third message 615 by comparing a count of social media sharing events (e.g., likes, comments, shares, re-tweets, etc.) of the third message 615 to a threshold. For example, a threshold of social media sharing events may be set by a user. The processor 604 may select a media item if the number of social media sharing events satisfies the threshold. In a particular embodiment, the threshold may be equal to three sharing events. The processor 604 may select the third message 615 in response to the third message 615 satisfying the threshold (e.g., the third message 615 satisfies the threshold with six likes). In a particular embodiment, the threshold is determined based on how many users (e.g., friends, followers, etc.) are associated with a social media account (e.g., as a percentage of total users, such as 10% of other users registered to received updates from the social media account).

The processor 604 may be configured to generate a logical group of media items (corresponding to media data included in "packaged moment" data) that includes the first image 111, the second video 212, the fifth image 115, the first text document 611, the first message 613, the third message 615, or any combination thereof. For example, if the user elects to transfer the first image 111, the processor 604 may enable file transfer instructions to transfer each media item in the logical group (e.g., the media data of the packaged moment data) as well. In a particular embodiment, the logical group (e.g., the media data of the packaged moment data) may include a single file (e.g., a compressed file, a zip file, etc.) that includes the first image 111, the second video 212, the fifth image 115, the first text document 611, the first message 613, the third message 615, or any combination thereof.

In a particular embodiment, a user may select to share a file and the processor 604 may generate a compressed file (e.g., a "zip" file) of the packaged moment data that includes SMS text messages, e-mails, social media posts, or any combination thereof, based on characteristics of the selected file. As a non-limiting example, the user may select to share an image (e.g., a conference image) from a business conference that was captured at 9:43 am on Apr. 23, 2008 in Boston, Mass. The processor 604 may determine metrics for the conference image and search the memory 606 and the data cache 610 for other files, messages, emails, and/or posts that have similar characteristics to the metrics of the conference image. The processor 604 may "bundle" the other files, messages, emails, and/or posts in a compressed file (e.g., a "zip" file) of the packaged moment data along with the conference image and initiate a transmission of the compressed file to a remote user (e.g., a remote device).

For example, the memory 606 may store SMS text messages that were sent or received at, or around, 9:43 am Apr. 23, 2008. Using the techniques described above, the processor 604 may select the SMS text messages based on metric values and add the SMS text messages to the compressed file. As another example, the processor 604 may access social media posts stored in the data cache 610 via the network 609. In a particular embodiment, the processor 604 may search a first database of posts that correspond to www.facebook.com to determine whether any posts have metrics that are similar to the conference image. For example, the processor 604 may identify a time and/or location of the posts and compare the time and/or location to metrics of the conference image. If a particular post is an image file or a video file, the processor 604 may determine facial feature metrics of the particular post, as described above, and compare the facial feature metrics to the conference image. In a particular embodiment, a number of "likes," "comments," and/or "shares" associated with the posts may be used by the processor 604 in determining whether to add the posts to the compressed file. For example, if the processor 604 determines that the posts are similar the conference image, the processor 604 may add the posts to the compressed file of the packaged moment data conditioned on the number of "likes," "comments," and/or "shares" satisfying a threshold.

As another example, the processor 604 may access the data cache 610 via the network 609 to search a second database of posts (e.g., social media data) that correspond to www.twitter.com and/or a third database of posts that correspond to www.instagram.com. The processor 604 may operate in a substantially similar manner when searching the second database and/or the third database as when searching the first database. In addition, the processor 604 may identify hashtags (#) that are included in each post (e.g., social media data) and determine whether the hashtag is associated with the conference. For example, a particular post may include the hashtag "#BostonConference." As a result, the processor 604 may determine to include the particular post in the compressed file.

As another example, the processor 604 may access the data cache 610 via the network 609 to search for emails that have been sent and/or received that are associated with the conference (e.g., associated with the conference image). The processor 604 may identify a time and/or location associated with when the emails were transmitted and compare the time and/or location to metrics of the conference image. The processor 604 may also perform a text search of the emails to determine whether the emails are associated with the conference. In response to determining that a particular email is associated with the conference, the processor 604 may include the particular email in the compressed file of the packaged moment data. In a particular embodiment, recipients and/or senders of the emails may be used to identify whether the particular email is associated with the conference. For example, the processor 604 may determine whether the recipients' email addresses and/or the senders' email addresses are associated with accounts corresponding to the social media posts, phone numbers corresponding to the SMS text messages, or any combination thereof.

Figure 7:
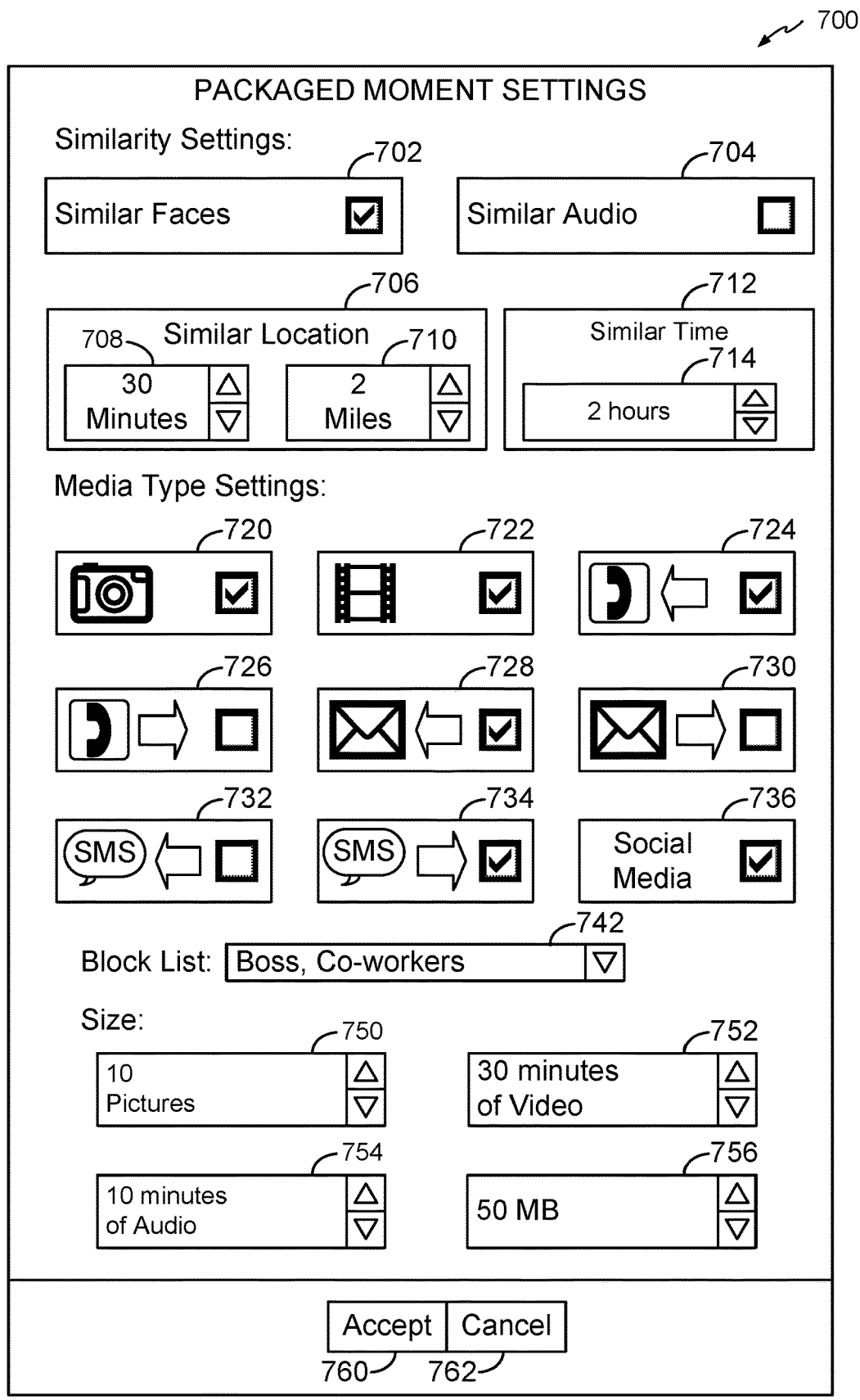
FIG. 7 is a diagram of a first particular embodiment of a user interface device that is operable to display user configurable packaged moment settings.

Referring to FIG. 7, a first particular embodiment of a user interface device 700 that is operable to display user configurable packaged moment settings is shown. The user interface device 700 may display the packaged moment settings via a graphical user interface (GUI). In a particular embodiment, the user interface device 700 may correspond to the user interface device 108 of FIG. 1 or the user interface device 208 of FIG. 2. A processor (e.g., the processor 104 of FIG. 1, the processor 204 of FIG. 2, and/or the processor 604 of FIG. 6) may be configured to store the packaged moment settings in a memory, such as the memory 106 of FIG. 1, the memory 206 of FIG. 2, or the memory 606 of FIG. 6. The user interface device 700 may include a touch screen display responsive to contact. In a particular embodiment, the processor may be configured to generate the GUI for presentation at a display (e.g., a display device of the user interface device 700) and to modify the packaged moment settings based on user input received via the GUI.

The packaged moment data may include media data associated with (e.g., representing) one or more media items that are related to a common event. For example, the one or more media items may include images (e.g., pictures), video, and other media items related to a wedding. The packaged moment settings may enable a user to configure one or more criteria for selection of media items by the processor. After selection of the media items, media data corresponding to the media items may be included in the packaged moment data. By selecting media items using the processor, time and effort of the user may be reduces in selecting multiple media items related to the common event. In addition, by transmitting the packaged moment data to other users as a single file (e.g., a file containing the packaged moment data), interruption to the other users may be reduced as compared to transmitting each media item individually.

The packaged moment settings displayed via the user interface device 700 may include similarity settings, media type settings, a block list, and size settings. For example, the packaged moment settings may include a user configurable designation of similarity settings. The processor may select media items based on comparisons between the media items and a selected media item (e.g., the first image 111 of FIG. 1) satisfying one or more of the similarity settings, and the media data corresponding to the selected media items may be included in the packaged moment data. For example, a second media item may be selected based on a comparison (between the second media item and the first media item) satisfying one or more of the similarity settings. Similarities between the media items and the selected media item may be determined as described with reference to FIGS. 1 and 2 (e.g., based on the metrics).

The similarity settings include at least one of facial features, audio characteristics, geographic location, and time. In a particular embodiment, the similarity settings may be configured via a similar faces selector 702, a similar audio selector 704, a similar location selector 706, and a similar time selector 712. The similar location selector 706 may include a location time selector 708 and a distance selector 710, and the similar time selector 712 may include a time period selector 714. In other embodiments, the similarity settings may be configured via additional or other settings selectors based on other metrics.

The processor may select media items based on similarities corresponding to one or more of the selectors 702-714 that are selected by the user. In a particular embodiment, the similar faces selector 702 and the similar audio selector 704 may each be associated with a check box that indicates selection (or de-selection). Selection of the similar faces selector 702 may cause media items having similar detected facial features as the selected media item to be selected by the processor. Selection of the similar audio selector 704 may cause audio characteristics associated with media items to be compared to audio characteristics associated with the selected media item, as described with reference to FIG. 1 or as described with reference to FIG. 2. The processor may select one or more media items based on the comparisons.

To configure settings for similar locations, the user may select values using the location time selector 708 and the distance selector 710 of the similar location selector 706. To configure settings for similar times, the user may select values using the time period selector 714 of the similar time selector 712. The location time selector 708, the distance selector 710, and the time period selector 714 may each include a selection mechanism. In a particular embodiment, the selection mechanism includes an up arrow and a down arrow. In other embodiments, the selection mechanism may include a knob, a dial, a drop-down menu, or another mechanism of changing a selected value. The user may select values using the selection mechanisms. For example, the user may set a distance (e.g., a range) from a location of the selected media item via the selection mechanism of the distance selector 710. The user may also set a location-related time period via the selection mechanism of the location time selector 708. In a particular example illustrated in FIG. 7, the location time selector 708 is set to 30 minutes and the distance selector 710 is set to 2 miles. In this particular example, the processor may select a media item that corresponds to a location that is within 2 miles of a location of the selected media item for at least 30 minutes. As another example, the user may set a time period via the selection mechanism of the time period selector 714. In a particular example illustrated in FIG. 7, the time period selector 714 is set to two hours. In this particular example, the processor may select media items that correspond to times (e.g., capture times) within two hours of a particular time corresponding to the selected media item.

The similar location selector 706 and the similar time selector 712 may each be de-selected to prevent (e.g., prohibit) the processor from selecting media items corresponding to similar locations or similar times. In a particular embodiment, the user may de-select the similar location selector 706 and/or the similar time selector 712 by setting values of the location time selector 708, the distance selector 710, and the time period selector 714 to zero (e.g., a de-selection value). In another embodiment, the similar location selector 706 and the similar time selector 712 may each be associated with a check box, and selection and de-selection may occur in response to user input, in a similar manner to the similar faces selector 702 or the similar audio selector 704.

The media type settings may include user configurable designations (e.g., selections) of one or more media types. Each media item corresponding to the media data of the packaged moment data may have a media type associated with one or more media types. For example, the processor may select media items of the one or more media types in accordance with the media type settings, and the media data may be associated with the selected media items. The media types may include pictures (e.g., images), videos, audio recordings of voice calls, e-mail messages, SMS messages, and social media posts (e.g., text and/or images), as non-limiting examples. In a particular embodiment, the media type settings may be configured via a picture (e.g., image) selector 720, a video selector 722, an incoming call selector 724, an outgoing call selector 726, an incoming e-mail selector 728, an outgoing e-mail selector 730, an incoming SMS selector 732, an outgoing SMS selector 734, and a social media selector 736. In another embodiment, the social media selector 736 may include multiple selectors each corresponding to a different social media source (e.g., social media associated with the websites www.twitter.com, www.facebook.com, www.instagram.com, and/or www.pinterest.com, as non-limiting examples). In other embodiments, the media type settings may be configured via additional or other selectors corresponding to other media types.

Each of the selectors 720-736 may be selected (or de-selected) via user input. The media data of the packaged moment data is associated with media types based on selection of the selectors 720-736. In a particular example illustrated in FIG. 7, the picture selector 720, the video selector 722, the incoming call selector 724, the incoming e-mail selector 728, the outgoing SMS selector 734, and the social media selector 736 are selected, and the other selectors are de-selected. In this particular example, the media data of the packaged moment data is selected from pictures, videos, incoming voice calls (e.g., recorded audio of incoming voice calls), incoming e-mails (e.g., text of incoming e-mails), outgoing SMS messages (e.g., text of outgoing SMS messages), and social media posts and is not selected from outgoing voice calls, outgoing e-mails, and incoming SMS messages. In a particular embodiment, the media data of the packaged moment data is also selected based on the similarity settings, as described above. In another embodiment, each of the selectors 720-736 may include a corresponding time selector (similar to the time period selector 714), such that the user is able to designate a time period associated with each media content type. For example, the user may select to include pictures captured within a first time period (e.g., 1 hour) of a particular capture time of the selected media item and to include video captures within a second time period (e.g., 3 hours) of the particular capture time of the selected media item.

The block list enables the user to adjust (e.g., configure) recipients of the packaged moment data. For example, the block list may enable the user to select one or more targets (e.g., users) to receive only the selected media item instead of the packaged moment data. The block list may be configured via a recipient selector 742. The recipient selector 742 may include a selection mechanism. In a particular embodiment, the selection mechanism may be an arrow or other button. The recipient selector 742, in response to user selection, may provide a drop-down list of parties and/or groups that are eligible to receive the packaged moment data. For example, the parties or groups may be displayed from an address book associated with the user. The user may select one or more of the parties or groups for addition to the block list. In a particular example illustrated in FIG. 7, the user may select a boss (e.g., a particular party) and co-workers (e.g., a particular group) for addition to the block list. In this particular example, when the packaged moment data is sent to other parties or groups, the selected media item is sent to the boss and to the co-workers instead of the packaged moment data. In another embodiment, the user interface device 700 may include an approved recipient list that enables the user to select parties and/or groups to receive the packaged moment data.

The size settings enable the user to designate (e.g., configure) an upper limit of a size of the packaged moment data. In a particular embodiment, the size settings may be configurable via a picture number selector 750, a video length selector 752, an audio length selector 754, and a file size selector 756. In other embodiments, the size settings may be associated with additional selectors, such as an e-mail length selector, an SMS length selector, one or more social media length selectors, or other selectors based on other media types. The selectors 750-754 may correspond to user designation of an upper limit of the size of the corresponding media type. For example, the picture number selector 750 may indicate a maximum number of pictures (e.g., images) corresponding to the media data of the packaged moment data, the video length selector 752 may indicate a maximum aggregated length of video corresponding to the media data of the packaged moment data, and the audio length selector 754 may indicate a maximum aggregated length of audio (e.g., audio recordings of voice calls) corresponding to the media data of the packaged moment data. The file size selector 756 may indicate a user configurable designation of a maximum aggregated file size of a file containing the packaged moment data. Each of the selectors 750-756 may include a selection mechanism and may operate in a similar manner to the similar faces selector 702 or the similar audio selector 704.

The processor may be configured to select media items in accordance with the size settings. For example, the processor may select a particular number of images based on the picture number selector 750. As another example, the processor may select one or more videos such that an aggregated length of selected video does not exceed a length corresponding to the video length selector 752. As another example, the processor may select one or more audio recordings (e.g., recordings of voice calls) such that an aggregated length of selected audio recordings does not exceed a length corresponding to the audio length selector 754. The processor may also select media items such that an aggregated file size of the media data associated with the selected media items does not exceed a file size associated with the file size selector 756.

In a particular embodiment, the processor may assign a confidence level to each media item based on similarities to the selected media item, and the processor may select media items associated with the highest confidence levels until the size settings are satisfied. The confidence levels may be assigned based on a degree of similarity between the media items and the selected media item, and may be determined based on the metrics, as described with reference to FIGS. 1 and 2. For example, the processor may select 10 pictures associated with the 10 highest confidence levels when the number of pictures selector 750 indicates 10 pictures. In an alternative embodiment, the processor may select the first 10 pictures that are determined to be similar to the selected media item without prioritization based on confidence levels.

The user interface device 700 may also include an accept button 760 and a cancel button 762. Each of the buttons 760 and 762 may be responsive to user input to indicate selection. The accept button 760 may cause acceptance of the packaged moment settings displayed via the user interface device 700. Selection of the accept button 760 may navigate to additional settings screens, or may cause packaged moment data to be generated in accordance with the packaged moment settings. The cancel button 762 may cancel generation of the packaged moment data.

Figure 8:
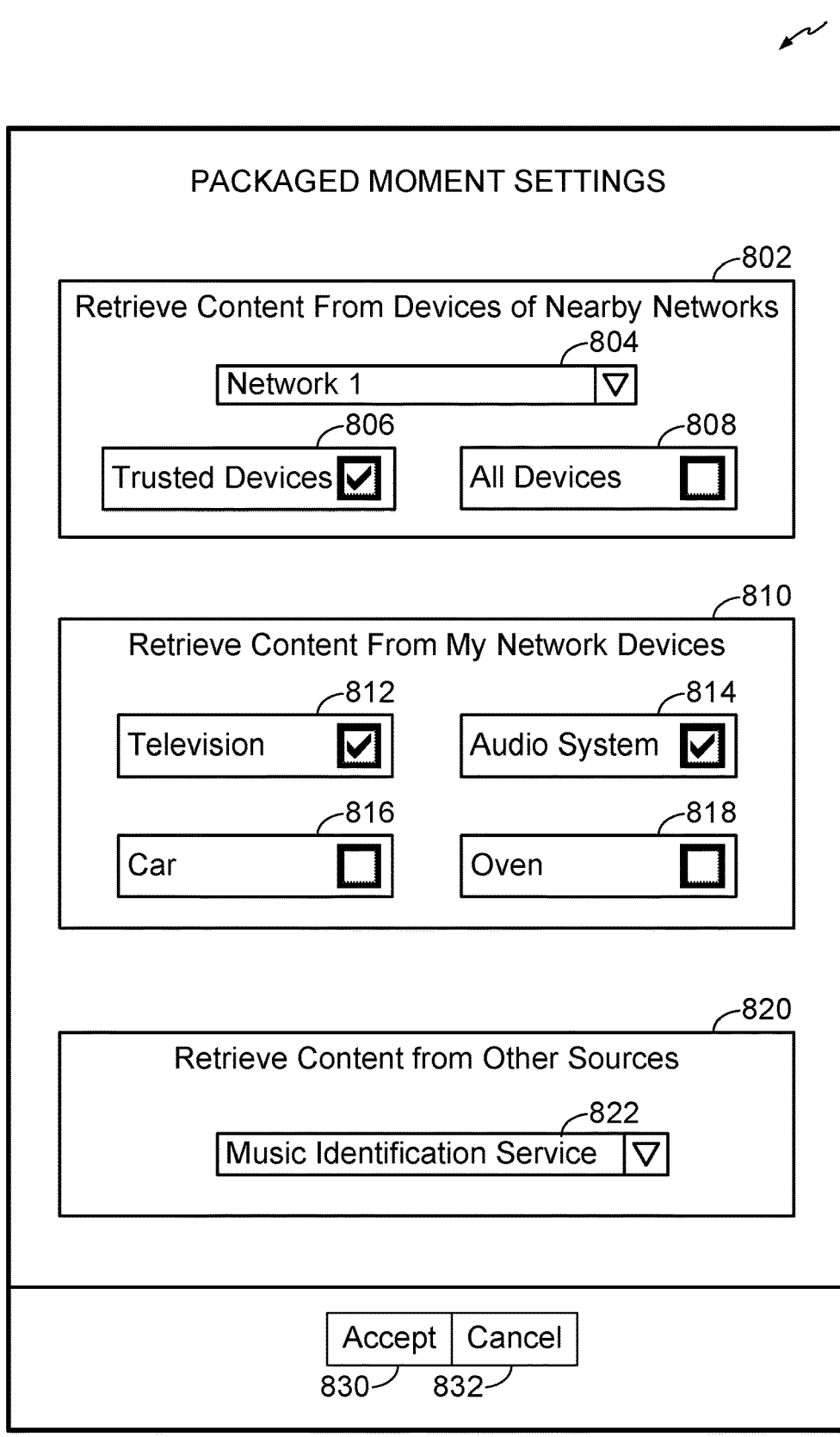
FIG. 8 is a diagram of a second particular embodiment of a user interface device that is operable to display user configurable packaged moment settings.

Referring to FIG. 8, a second particular embodiment of a user interface device 800 that is operable to display user configurable packaged moment settings is shown. The user interface device 800 may display the packaged moment settings via a graphical user interface (GUI). In a particular embodiment, the user interface device 800 may correspond to the user interface device 108 of FIG. 1 or the user interface device 208 of FIG. 2. A processor (e.g., the processor 104 of FIG. 1, the processor 204 of FIG. 2, and/or the processor 604 of FIG. 6) may be configured to store the packaged moment settings in a memory, such as the memory 106 of FIG. 1, the memory 206 of FIG. 2, or the memory 606 of FIG. 6. The user interface device 800 may include a touch screen display. The packaged moment settings may be modified based on user input.

The packaged moment settings displayed via the user interface device 800 may include data source settings identifying external sources for retrieving media items corresponding to the media data of the packaged moment data. The user interface device 800 enables a user to designate one or more devices or other sources from which to retrieve media items similar to a selected media item (e.g., the first image 111 of FIG. 1). For example, the processor may be configured to retrieve a particular media item determined to be similar to the selected media item from the one or more devices or other sources in accordance with the data source settings. In a particular embodiment, the data source settings may be associated with a nearby networks window 802, a network devices window 810, and other sources window 820, each of which may be displayed via the user interface device 800. In other embodiments, fewer or more windows may be displayed via the user interface device 800.

In a particular embodiment, the nearby networks window 802 may include a network selector 804, a trusted devices selector 806, and an all devices selector 808. In other embodiments, the nearby networks window 802 may include fewer or more selectors. The network selector 804 enables the user to select one or more networks to be queried for media items to be retrieved. The network selector 804 may include a selection mechanism. In a particular embodiment, the selection mechanism may be an arrow or other button, and may operate in a similar manner to the recipient selector 742 of FIG. 7. The network selector 804, in response to user selection, may provide a drop-down list of networks that are proximate to and accessible to a mobile device that includes the processor and the user interface device 800. For example, the one or more networks may be identified using a network interface of the mobile device. The one or more networks may include wireless communication (e.g., "wi-fi") networks, cellular communication networks, Bluetooth communication networks, RF communication networks, or combinations thereof, as non-limiting examples.

The user may select one or more of the networks to query for additional content. In a particular example illustrated in FIG. 8, the user may select "Network 1" (e.g., a particular wireless network accessible to the processor) via the network selector 804. In this particular example, an additional media item that is similar to the selected media item may be automatically retrieved from a particular mobile device of "Network 1." To illustrate, the mobile device (e.g., the processor) may send a query indicating packaged moment criteria (e.g., settings) to the particular mobile device and may request media items that satisfy the packaged moment criteria. In response to receiving the query, the particular mobile device may provide media items that satisfy the packaged moment criteria via the selected network (e.g., "Network 1") to the mobile device.

Additional settings may be adjusted via the trusted devices selector 806 and the all devices selector 808. The trusted devices selector 806 and the all devices selector 808 may include a selection mechanism and may operate in a similar manner to the similar faces selector 702 or the similar audio selector 704 of FIG. 7. Selection of the trusted devices selector 806 may cause the mobile device to send the query to trusted devices in one or more networks corresponding to the network selector 804 instead of to each device associated with the one or more networks. For example, the mobile device may send the query to one or more devices which are part of a trusted network with the mobile device, or one or more devices which have previously communicated with or authenticated with the mobile device. Alternatively, selection of the all devices selector 808 may cause the mobile device to send the query to each device associated with the one or more networks corresponding to the network selector 804.

The network devices window 810 may indicate a user configurable designation of one or more devices, and the processor may be configured to query the one or more devices for media items and to receive the media items from the one or more devices. To enable querying of devices, the network devices window 810 may include selectors associated with one or more network devices that are configured to communicate with the mobile device. The network devices may include one or more appliances or other devices that are configured to communicate with or to be controlled by the mobile device. In a particular embodiment, the network devices window 810 is associated with a first device (e.g., a television) selector 812, a second device (e.g., an audio system) selector 814, a third device (e.g., a car) selector 816, and a fourth device (e.g., an oven) selector 818. In other embodiments, the network devices window 810 may include fewer or more selectors associated with other network devices. The selectors 812-818 may include a selection mechanism (e.g., a check box) and may operate in a similar manner to the similar faces selector 702 or the similar audio selector 704 of FIG. 7. Selection of the selectors 812-818 may cause the mobile device to search for and retrieve media items from the corresponding network devices. For example, when the first device selector 812 and the second device selector 814 are selected and the third device selector 816 and the fourth device selector 818 are de-selected, as illustrated in FIG. 8, the mobile device may retrieve media items that are similar to the selected media item from the first device (e.g., the television) and the second device (e.g., the audio system).

The other sources window 820 may include other sources selector 822. In other embodiments, the other sources window 820 may include fewer or more selectors. The other sources selector 822 enables the user to select one or more other sources as content sources for the media items corresponding to the media data of the packaged moment data. The other sources selector 822 may include a selection mechanism. In a particular embodiment, the selection mechanism may be an arrow or other button, and may operate in a similar manner to the recipient selector 742 of FIG. 7. The other sources selector 822, in response to user selection, may provide a drop-down list of other content sources. The user may select one or more other sources via the drop-down list. For example, as illustrated in FIG. 8, the user may select a music identification source. When the music identification source is selected, the mobile device may query the music identification source to determine one or more songs associated with the selected media item. In response to an identification of one or more songs, data representing a link to purchase the one or more identified songs may be included in the packaged moment data. Other sources may be similarly queried to provide media items or data when the other sources are selected via the other sources selector 822.

The user interface device 800 may also include an accept button 830 and a cancel button 832. Each of the buttons 830 and 832 may be responsive to user input to indicate selection. The accept button 830 and the cancel button 832 may correspond to the accept button 760 of FIG. 7 and the cancel button 762 of FIG. 7, respectively, and may operate in a substantially similar manner.

Figure 9:
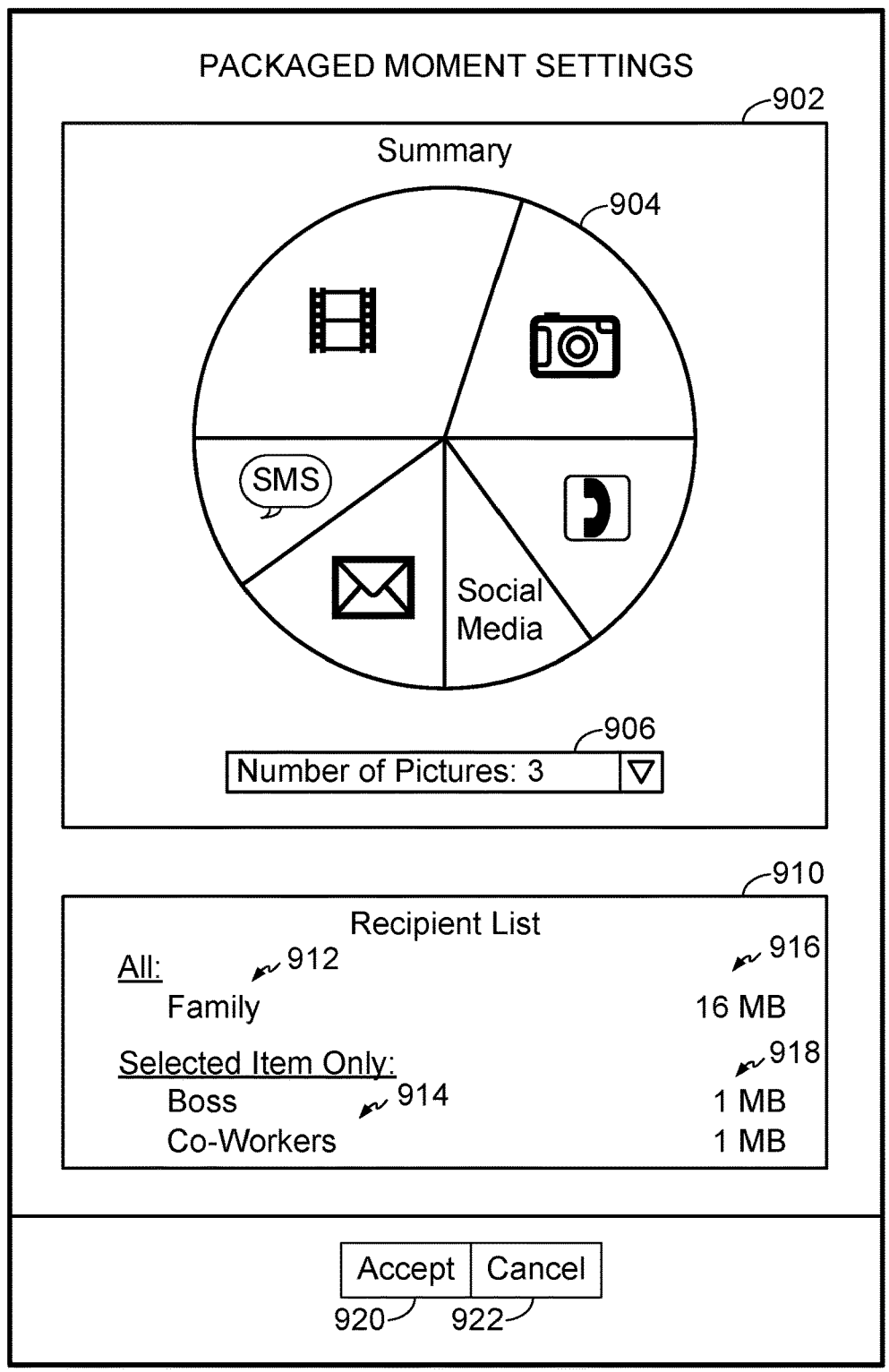
FIG. 9 is a diagram of a particular embodiment of a user interface device that is operable to display packaged moment data information.

Referring to FIG. 9, a particular embodiment of a user interface device 900 that is operable to display packaged moment data information is shown. The user interface device 900 may display the packaged moment data information via a graphical user interface (GUI). In a particular embodiment, the user interface device 900 may correspond to the user interface device 108 of FIG. 1 or the user interface device 208 of FIG. 2. The packaged moment data information may be generated based on the packaged moment data. For example, after the packaged moment data is generated, the packaged moment data information may be generated and displayed via the user interface device 900. A processor (e.g., the processor 104 of FIG. 1, the processor 204 of FIG. 2, and/or the processor 604 of FIG. 6) may be configured to store the packaged moment data information in a memory, such as the memory 106 of FIG. 1, the memory 206 of FIG. 2, or the memory 606 of FIG. 6. The user interface device 900 may include a touch screen display. Display of the packaged moment data information may be modified based on user input.

The packaged moment data information displayed via the user interface device 900 may include summary data and recipient list data. In a particular embodiment, the summary data may be displayed via a summary window 902 and the recipient list data may be displayed via a recipient list window 910. In other embodiments, fewer or more windows may be displayed via the user interface device 900.

The summary window 902 may include a packaged moment data indicator 904 and a size indicator 906. The packaged moment data indicator 904 may indicate types of media items corresponding to the media data of the packaged moment data, and a percentage of a total size of the media data corresponding to each type of media item. In a particular embodiment, the packaged moment data indicator 904 may include a pie chart. In this embodiment, each portion (e.g., piece) of the pie chart corresponds to a media type indicated by an icon or other identifier. A size of each portion of the pie chart may be based on and may indicate a percentage of the total size of the media data corresponding to the identified media type. For example, the packaged moment data indicator 904 (e.g., the pie chart) illustrated in FIG. 9 may display a breakdown of the media data into media types of images, videos, audio recordings of voice calls, e-mails, SMS messages, and social media posts, and sizes of the portions indicate a percentage of the size of the media data corresponding to each of the media types. In other examples, the packaged moment data indicator 904 may have a different appearance based on different media types, or different amounts of media types, being included in the media data of the packaged moment data.

The size indicator 906 may enable the user to view size information associated with the packaged moment data. The size indicator 906 may include a selection mechanism. In a particular embodiment, the selection mechanism may be an arrow or other button, and may operate in a similar manner to the recipient selector 742 of FIG. 7. The size indicator 906 may provide a drop-down list of size information. The user may select one a particular element of the size information for viewing via the selection mechanism. As illustrated in FIG. 9, the size indicator 906 may display a number of pictures (e.g., images) corresponding to the media data of the packaged moment data. Other size information associated with the packaged moment data, such as an aggregated length of video, an aggregated length of audio, a number of words of e-mails, a number of words of SMS messages, a number of words of social media posts, a number of images of social media posts, and an aggregated file size of a file containing the packaged moment data, may be selected for viewing via the size indicator 906.

The recipient list window 910 may identify one or more recipients or groups (e.g., groups of users) configured to receive corresponding data. The recipient list window 910 may also indicated media items corresponding to the media data of the packaged moment data that are designated to be sent to the one or more recipients or groups. For example, a first designation 912 in the recipient list window 910 may indicate that all media items corresponding to the media data are to be sent to a first recipient group "Family." As another example, a second designation 914 in the recipient list window 910 may indicate that only the selected media item (e.g., a subset of media items corresponding to the media data of the packaged moment data) is to be sent to a second recipient group including "Boss" and "Co-Workers." In a particular embodiment, the recipients or groups may correspond to one or more users (e.g., parties) or groups identified in an address book. The designations (e.g., the first designation 912 and the second designation 914) may be adjustable via a graphical user interface as described with reference to FIG. 7.

The recipient list window 910 may also include a first file size 916 indicating a file size of the packaged moment data to be sent to the first recipient group and a second file size 918 indicating a file size of the packaged moment data (e.g., a subset of the media items) to be sent to the second recipient group. In another embodiment, the recipient list window 910 may include a third recipient list which is configured to receive no media items of the packaged moment data and a third file size indicating no data is to be sent. The processor may be configured to transmit the packaged moment data, or a portion thereof, to the members of the one or more recipients or groups based on the designations in the recipient list window 910.

The user interface device 900 may also include an accept button 920 and a cancel button 922. Each of the buttons 920 and 922 may be responsive to user input to indicate selection. The accept button 920 and the cancel button 922 may correspond to the accept button 760 of FIG. 7 and the cancel button 762 of FIG. 7, or the accept button 830 and the cancel button 832 of FIG. 8, respectively, and may operate in a substantially similar manner.

Figure 10B:
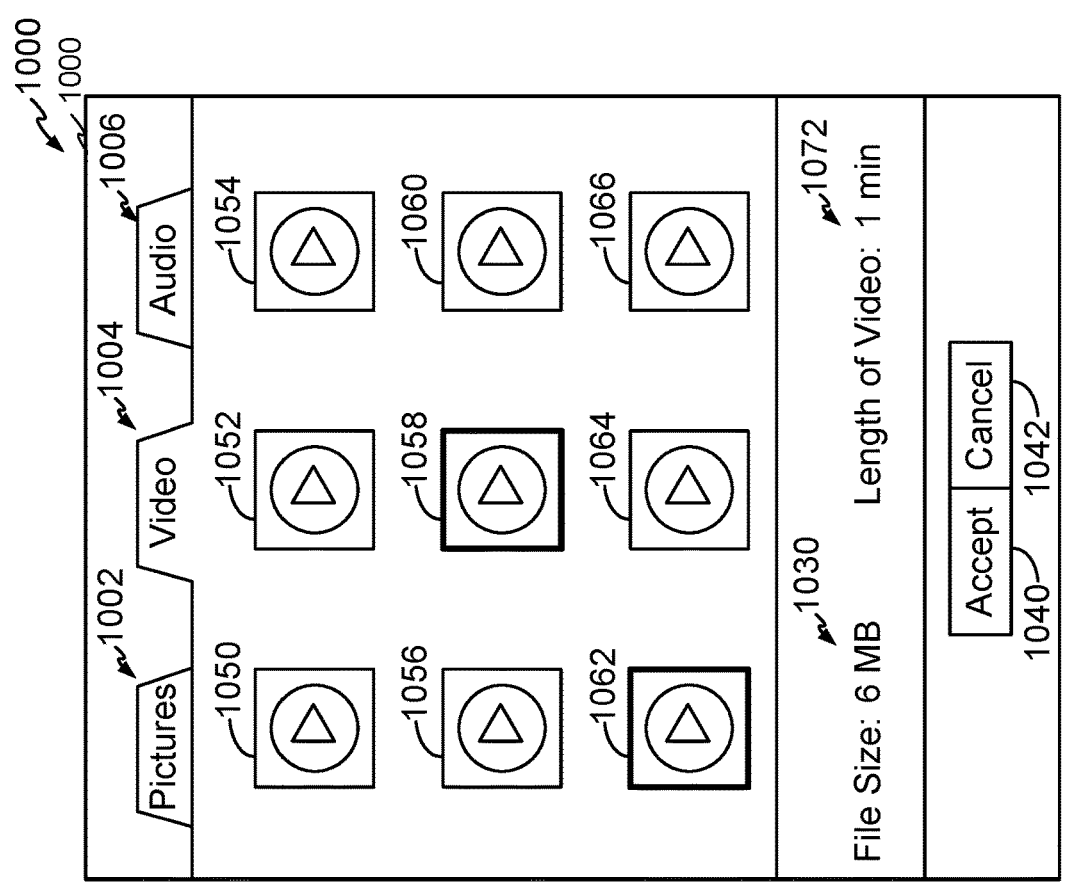
FIGS. 10A and 10B are diagrams of a particular embodiment of a user interface device that is operable to display media items corresponding to media data of packaged moment data.
Figure 10A:
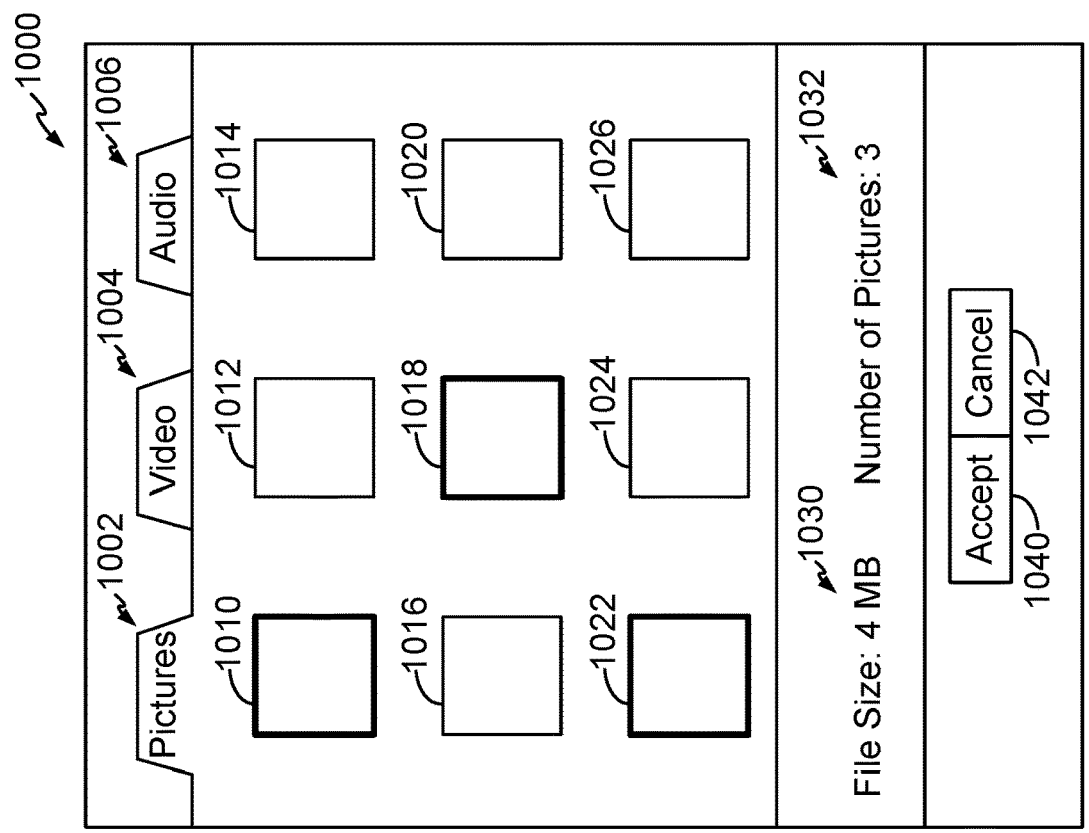

Referring to FIGS. 10A and 10B, a particular embodiment of a user interface device 1000 that is operable to display media items corresponding to media data of packaged moment data is shown. The user interface device 1000 may display the media items via a graphical user interface (GUI). In a particular embodiment, the user interface device 1000 may correspond to the user interface device 108 of FIG. 1 or the user interface device 208 of FIG. 2. The user interface device 1000 may include a touch screen display. The user interface device 1000 may display media items associated with a first media type selected via one of tabs 1002, 1004, and 1006. For example, a first tab 1002 may be associated with pictures (e.g., images), a second tab 1004 may be associated with videos, and a third tab 1006 may be associated with audio, such as audio recordings of voice calls. Additional tabs associated with other media types may be displayed in other embodiments, or may be displayed when the third tab 1006 is selected.

FIG. 10A illustrates the user interface device 1000 when the first tab 1002 (e.g., the pictures tab) is selected. The user interface device 1000 may include a display of multiple image icons 1010-1026, each corresponding to an image that may correspond to the media data of the packaged moment data. Each of the image icons 1010-1026 may be selected or de-selected based on user input.

One or more image icons 1010-1026 may be selected by a processor (e.g., the processor 104 of FIG. 1, the processor 204 of FIG. 2, and/or the processor 604 of FIG. 6) in response to selection of a particular image icon. For example, the first image icon 1010 may correspond to a selected media item (e.g., the first image 111 of FIG. 1). In response to selection of the first image icon 1010 by the user, an indication of selection may be presented. In a particular embodiment, a border of the first image icon 1010 may be highlighted or emphasized (e.g., by a bold line) to indicate selection of the first image icon 1010. In other embodiments, the border of the first image icon 1010 may be changed from a first color (e.g., black) to a second color (e.g., red) to indicate selection of the first image icon 1010.

In response to selection of the first image icon 1010 (e.g., the selected image), the processor may select one or more images based on similarities between the one or more images and the selected image, as described with reference to FIG. 1. For example, the processor may select a second image corresponding to a second image icon 1018 and a third image corresponding to a third image icon 1022 based on similarities between the second image and the selected image and between the third image and the selected image, respectively. A border of the second image icon 1018 and a border of the third image icon 1022 may be highlighted or emphasized to indicate selection of the corresponding images by the processor.

In a particular embodiment, the second image corresponding to the second image icon 1018 and the third image corresponding to the third image icon 1022 may be de-selected by the user. By de-selecting one or more image icons, the user may select a user-designated subset of the selected media items to correspond to the media data of the packaged moment data. In other embodiments, the second image icon 1018 and the third image icon 1022 may be highlighted or emphasized in a different manner than the first image icon 1010, and the second image corresponding to the second image icon 1018 and the third image corresponding to the third image icon 1022 may be added to the packaged moment data if the user selects the second image icon 1018 and the third image icon 1022.

The user interface device 1000 may also include an indication of a file size 1030 and a number of pictures 1032. The file size 1030 may indicate a file size of a file including the packaged moment data based on each of the selected media items (e.g., the first image, the second image, and the third image corresponding to the first image icon 1010, the second image icon 1018, and the third image icon 1022, respectively). As image icons are selected or de-selected, the file size 1030 may be modified accordingly. The number of pictures 1032 may indicate a number of pictures selected. For example, when the first image corresponding to the first image icon 1010, the second image corresponding to the second image icon 1018, and the third image corresponding to the third image icon 1022 are selected, the number of pictures 1032 may indicate that 3 pictures are selected. As image icons are selected or de-selected, the number of pictures 1032 may be modified accordingly.

The user interface device 1000 may also include an accept button 1040 and a cancel button 1042. Each of the buttons 1040 and 1042 may be responsive to user input to indicate selection. Selection of the accept button 1040 may cause the processor to generate the packaged moment data based on the selected image icons (e.g., the first image icon 1010, the second image icon 1018, and the third image icon 1022). Selection of the cancel button 1042 may cause the processor to cancel generation of the packaged moment data.

FIG. 10B illustrates the user interface device 1000 when the second tab 1004 (e.g., the video tab) is selected. For example, after selecting the first image icon 1010, and confirming selection of the second image icon 1018 and the third image icon 1022, the user may select the second tab 1004 to enable selection of videos. After selection of the second tab 1004, the user interface device 1000 may include a display of multiple video icons 1050-1066, each corresponding to a video that may be added to the packaged moment data. Each of the video icons 1010-1026 may be selected or de-selected based on user input.

One or more video icons 1050-1066 may be selected by the processor in response to selection of a particular image icon, in a similar manner as the image icons 1010-1026. In response to selection of the first image icon 1010 (e.g., the selected image), as described with reference to FIG. 10A, the processor may select one or more video icons based on similarities between one or more videos corresponding to the one or more video icons and the selected image, as described with reference to FIG. 2. For example, the processor may select a first video corresponding to a first video icon 1058 and a second video corresponding to a second video icon 1062 based on similarities between the first video and the selected image and between the second video and the selected image, respectively. A border of the first video icon 1058 and a border of the second video icon 1062 may be highlighted or emphasized to indicate selection of the corresponding images by the processor, in a similar manner to the second image icon 1018 and the third image icon 1022.

In response to selection of one or more videos, the file size 1030 may be updated and a length of videos 1072 may be displayed. The file size 1030 may updated based on file sizes of one or more selected videos (e.g., the first video and the second video corresponding to the first video icon 1058 and the second video icon 1062, respectively). As video icons are selected or de-selected, the file size 1030 may be modified accordingly. The length of videos 1072 may indicate an aggregated length of video selected. For example, when the first video corresponding to the first video icon 1058 and the second video corresponding to the second video icon 1062 are selected, the length of video 1072 may indicate that 1 minute of video is selected. Additionally, the file size 1030 may indicate 6 mb, based on a file size of the first image, the second image, the third image, the first video, and the second video. As video icons are selected or de-selected, the length of video 1072 may be modified accordingly.

The user interface device 1000 may also display icons corresponding to other tabs in a similar manner as described with reference to the first tab 1002 and the second tab 1004. For example, the user interface device 1000 may display one or more audio icons corresponding to audio recordings of voice calls in response to selection of the third tab 1006. One or more of the audio icons may be selected by the processor based on similarities between audio recordings corresponding to the one or more audio icons and the selected media item, and the user may confirm or modify selection of the one or more audio recordings via user input. The user interface device 1000 may operate in a similar manner for other media types of other tabs (not shown).

Selection of the accept button 1040 may cause the processor to generate the packaged moment data based on the selected image icons (e.g., the first image icon 1010, the second image icon 1018, and the third image icon 1022) of FIG. 10A and the selected video icons (e.g., the first video icon 1058 and the second video icon 1062) of FIG. 10B. Selection of the cancel button 1042 may cause the processor to cancel generation of the packaged moment data.

Figure 11:
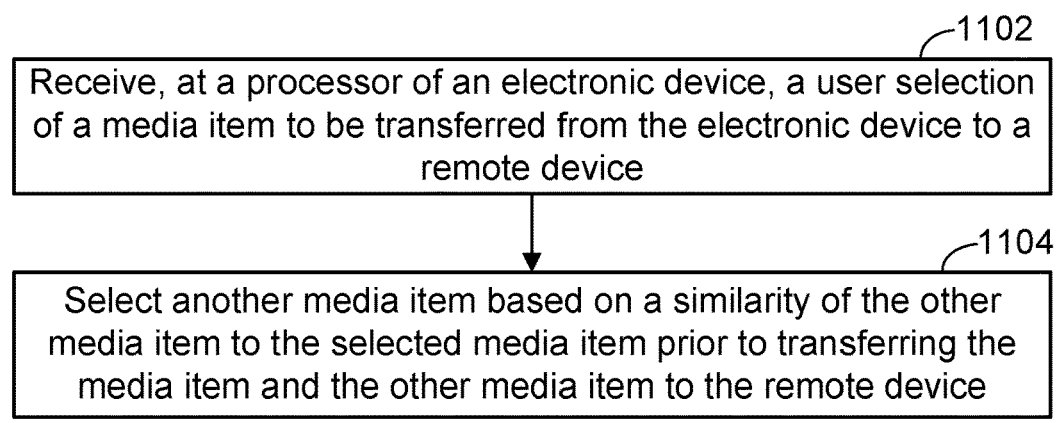
FIG. 11 is a flowchart of a particular embodiment of a method of selecting a media item based on similar feature.

Referring to FIG. 11, a flowchart of a particular embodiment of a method 1100 of selecting a media item based on similar features is shown. In an illustrative embodiment, the method 1100 may be performed by the system 100 of FIG. 1, the system 200 of FIG. 2, the system 600 of FIG. 6, and/or in conjunction with the user interface device 300 of FIG. 3, the user interface device 400 of FIG. 4, the user interface device 500 of FIG. 5, the user interface device 1000 of FIGS. 10A and 10B, or any combination thereof.

The method 1100 includes receiving, at a processor of an electronic device, a user selection of a media item to be transferred from the electronic device to a remote device, at 1102. For example, in FIG. 1, the processor 104 may receive a user selection via a user interface to transfer the first image 111 from the electronic device 102. As another example, the processor 204 of FIG. 2 may receive a user selection to transfer the first video 211 from the electronic device 202. As non-limiting examples, the remote device may include a second electronic device (e.g., a mobile phone, a personal digital assistant, a computer, etc.), a server corresponding to an electronic mail address, a server corresponding to a social media website, etc.

Another media item may be selected based on a similarity of the other media item to the selected media item prior to transferring the media item and the other media item to the remote device, at 1104. For example, in FIG. 1, the processor 104 may determine that the second image 112 is similar to the first image 111 when the level of similarity (e.g., $F_{12}$) between the metrics of the first image 111 and metrics of the second image 112 satisfies the threshold. For example, the second image 112 and the first image 111 may have similar GPS coordinates, similar data corresponding to facial features (e.g., similar faces), and may have been captured at a similar time. Additionally, in FIG. 2, the processor 204 may determine that the second video 212 is similar to the first video 211 when the level of similarity (e.g., $F_{12}$) between the metrics of the first video 211 and metrics of the second video 212 satisfies the threshold.

In a particular embodiment, the method 1100 may include providing a representation of the other media item via a user interface device of the electronic device to enable user selection, or user confirmation, of the other media item to be transferred. For example, in FIG. 3, the second image 112 may be provided to the user via the user interface device 300 in a three-dimensional representation. The user may transfer the second image 112 by activating the share selector 348 using finger contact 350.

In another particular embodiment, the electronic device may transfer the media item and the other media item without receiving a user selection of the other media item. For example, the electronic device 102 of FIG. 1 may transfer the first image 111 and the second image 112 without receiving a user selection of the second image 112.

In a particular embodiment, the similarity is determined via a comparison of first features of the first media item to second features of the second media item. Comparing the first features to the second features may include determining a difference between a first feature vector corresponding to the first media item with a second feature vector corresponding to the second media item. For example, in FIG. 1, the processor 104 may use an algorithm such as $F_{12}=w_1*Norm_1[g(IMG_1)-g(IMG_2)]+w_2*Norm_2[t(IMG_1)-t(IMG_2)]+w_3*Norm_3[f(IMG_1)-f(IMG_2)]$ to compare the first feature vector 121 to the second feature vector 122, where $F_{12}$ is a level of similarity between metrics of the first image 111 and metrics of the second image 112, $w_1$ is a first weight of a metric corresponding to geographic location, $w_2$ is a second weight of a metric corresponding to time, and $w_3$ is a third weight of a metric corresponding to detected facial features.

The processor 104 may determine that the second image 112 is similar to the first image 111 when the level of similarity (e.g., $F_{12}$) between the metrics of the first image 111 and metrics of the second image 112 satisfies a threshold.

In a particular embodiment, the method 1100 includes clustering a first image file with a second image file to generate a collection of images. For example, in FIG. 1, the processor 104 may cluster the first image 111 with the second image 112, the fifth image 115, the sixth image 116, or a combination thereof, to generate a collection of images. In another particular embodiment, the method 1100 includes concatenating a first video file with a second video file to generate a concatenated video. For example, in FIG. 2, the processor 204 may concatenate the first video 211 with the second video 212 to generate one video file that includes the first and second video 211, 212.

Figure 12:
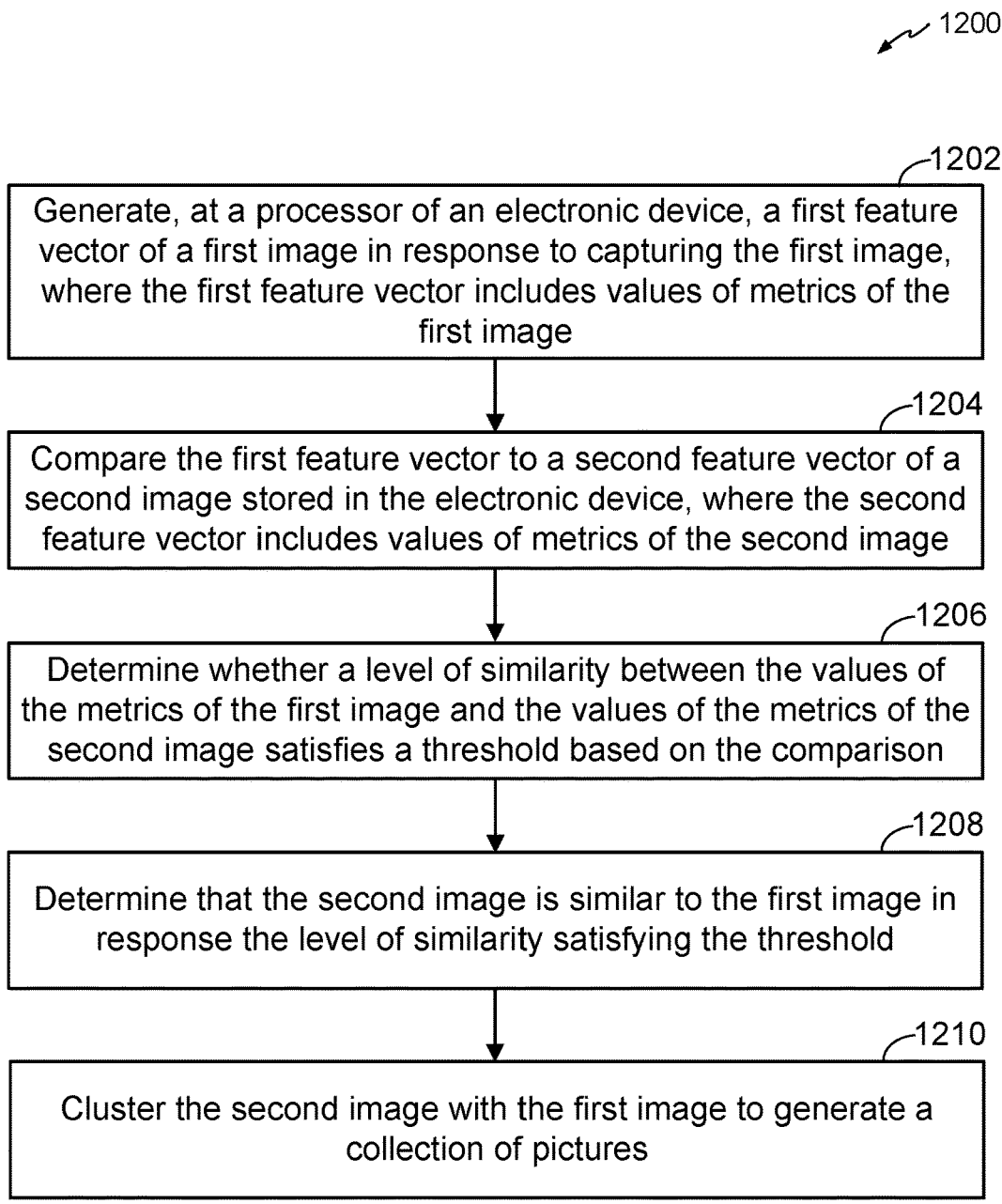
FIG. 12 is a flowchart of a particular embodiment of a method of selecting an image based on similar features.

Referring to FIG. 12, a particular embodiment of a method 1200 of selecting an image based on similar features is shown. In an illustrative embodiment, the method 1200 may be performed by the system 100 of FIG. 1, the system 200 of FIG. 2, the system 600 of FIG. 6, and/or in conjunction with the user interface device 300 of FIG. 3, the user interface device 400 of FIG. 4, the user interface device 500 of FIG. 5, the user interface device 1000 of FIGS. 10A and 10B, or any combination thereof.

The method 1200 includes generating, at a processor of an electronic device, a first feature vector of a first image in response to capturing the first image, at 1202. For example, in FIG. 1, the processor 104 may generate a first feature vector 121 of the first image 111 in response to the image sensor capturing the first image 111. The first feature vector 121 may include values of metrics of the first image 111.

The first feature vector may be compared to a second feature vector of a second image stored in the electronic device, at 1204. For example, in FIG. 1, the processor 104 may compare the first feature vector 121 to the second feature vector 122 stored in the memory 106. The second feature vector 122 may include values of metrics of the second image 112. In a particular embodiment, the processor 104 may use an algorithm such as $F_{12}=w_1 *Norm_1[g(IMG_1)-g(IMG_2)]+w2*Norm_2[t(IMG_1)-t(IMG_2)]+w_3*Norm_3[f(IMG_1)-f(IMG_2)]$ to compare the first feature vector 121 to the second feature vector 122, where $F_{12}$ is a level of similarity between the values of the metrics of the first image 111 and the values of the metrics of the second image 112, $w_1$ is a first weight of a metric corresponding to geographic location, $w_2$ is a second weight of a metric corresponding to time, and $w_3$ is a third weight of a metric corresponding to detected facial features.

A level of similarity between the values of the metrics of the first image and the values of the metrics of the second image may be compared to a threshold, at 1206. For example, in FIG. 1, the processor 104 may determine whether a level of similarity between the values of the metrics of the first image 111 and values of the metrics of the second image 112 satisfies the threshold based on the comparison, at 1204. The second image may be determined to be similar to the first image in response to the level of similarity satisfying the threshold, at 1208. For example, in FIG. 1, the processor 104 may determine that the second image 112 is similar to the first image 111 when the level of similarity (e.g., $F_{12}$) between the metrics of the first image 111 and metrics of the second image 112 satisfies the threshold.

In a particular embodiment, the method 1200 includes clustering the second image with the first image to generate a collection of images, at 1210. For example, the processor 104 may cluster the first image 111 with the second image 112 to generate a collection of images. In a particular embodiment, the method 1200 includes generating a request to cluster the first image with similar images. The collection of images may be generated based on the response to the request.

In a particular embodiment, the method 1200 includes capturing first audio at a first time period prior to capturing the first image and capturing second audio at a second time period after capturing the first image. For example, in FIG. 1, the electronic device 102 may capture first audio for a time period (e.g., five seconds) prior to capturing the first image 111, and the electronic device 102 may capture second audio for a time period (e.g., five seconds) after capturing the first image 111. In a particular embodiment, at least one of the metrics in the first feature vector 121 may correspond to the audio qualities of the first audio and at least one of the metrics in the first feature vector 121 may correspond to the audio qualities of the second audio. Non-limiting examples of audio qualities that may be used as metrics for the first feature vector 121 include a pitch, an audio (e.g., decibel) level, a phase, or timbre of the captured audio.

Figure 13:
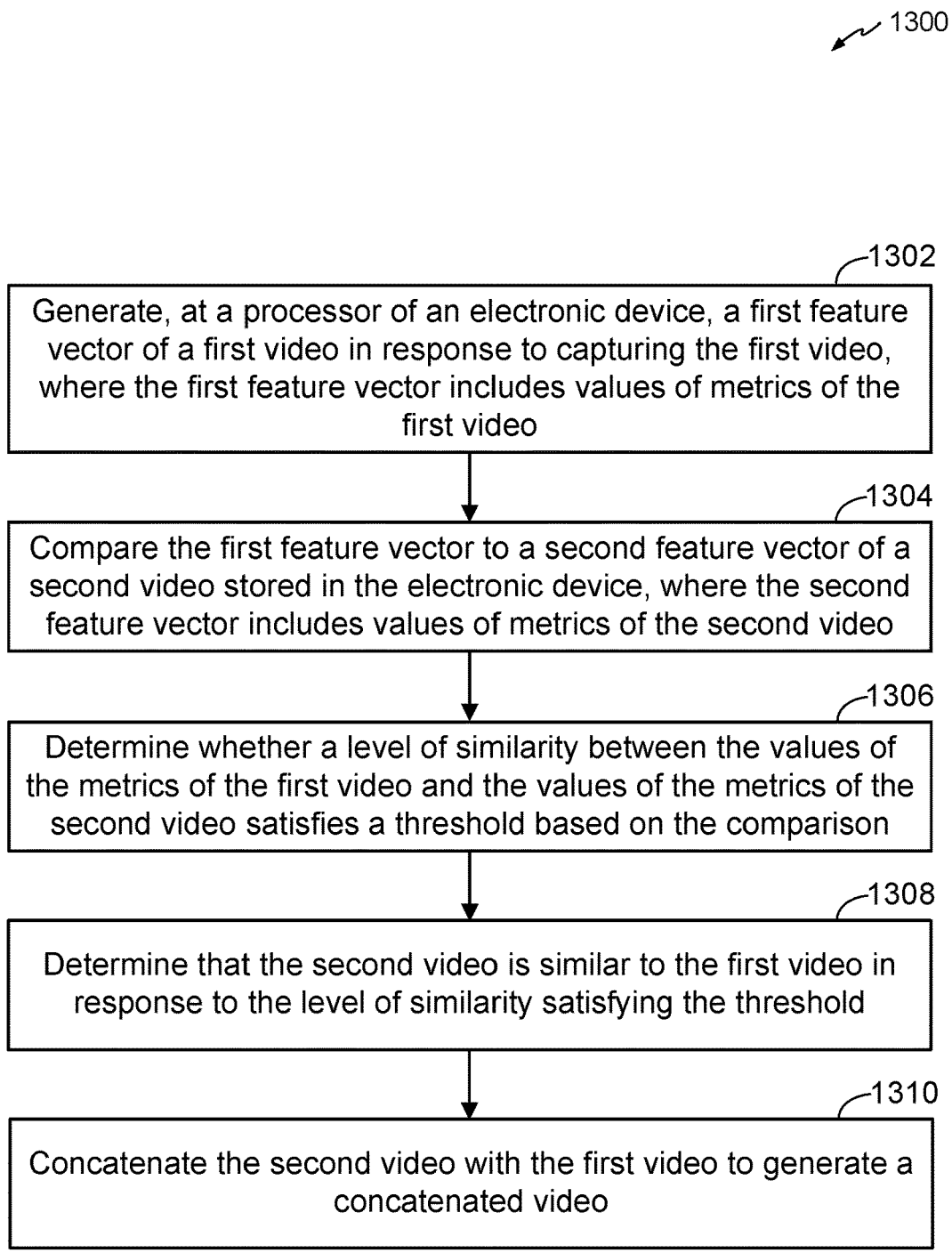
FIG. 13 is a flowchart of a particular embodiment of a method of selecting a video based on similar features.

Referring to FIG. 13, a particular embodiment of a method 1300 of selecting a video based on similar features is shown. In an illustrative embodiment, the method 1300 may be performed by the system 100 of FIG. 1, the system 200 of FIG. 2, the system 600 of FIG. 6, and/or in conjunction with the user interface device 300 of FIG. 3, the user interface device 400 of FIG. 4, the user interface device 500 of FIG. 5, the user interface device 1000 of FIGS. 10A and 10B, or any combination thereof.

The method 1300 includes generating, at a processor of an electronic device, a first feature vector of a first video in response to capturing the first video, at 1302. For example, in FIG. 2, the processor 204 may generate a first feature vector 221 of the first video 211 in response to the motion image sensor capturing the first video 211. The first feature vector 221 may include values of metrics of the first video 211.

The first feature vector may be compared to a second feature vector of a second video stored in the electronic device, at 1304. For example, in FIG. 2, the processor 204 may compare the first feature vector 221 to the second feature vector 222 stored in the memory 206. The second feature vector 222 may include values of metrics of the second video 212. In a particular embodiment, the processor 204 may use an algorithm such as $F_{12}=w_1*Norm_1[g(IMG_1)-g(IMG_2)]+w2*Norm_2[t(IMG_1)-t(IMG_2)]+w_3*Norm_3[f(IMG_1)-f(IMG_2)]$ to compare the first feature vector 221 to the second feature vector 222, where $F_{12}$ is a level of similarity between the values of the metrics of the first video 211 and the values of the metrics of the second video 212, $w_1$ is a first weight of a metric corresponding to geographic location, $w_2$ is a second weight of a metric corresponding to time, and $w_3$ is a third weight of a metric corresponding to detected facial features.

A level of similarity between the values of the metrics of the first video and the values of the metrics of the second video may be compared to a threshold, at 1306. For example, in FIG. 2, the processor 204 may determine whether a level of similarity between the values of the metrics of the first video 211 and values of the metrics of the second video 212 satisfies the threshold based on the comparison, at 1304. The second video may be determined to be similar to the first video in response to the level of similarity satisfying the threshold, at 1308. For example, in FIG. 2, the processor 204 may determine that the second video 212 is similar to the first video 211 when the level of similarity (e.g., $F_{12}$) between the metrics of the first video 211 and metrics of the second video 212 satisfies the threshold.

In a particular embodiment, the method 1300 includes concatenating the second video with the first video to generate a concatenated video, at 1310. For example, the processor 204 may concatenate the first video 211 with the second video 212 to generate a concatenated video. In a particular embodiment, the method 1300 includes generating a request to concatenate the first video 211 with similar videos. The concatenated video may be generated in response to the request.

Figure 14:
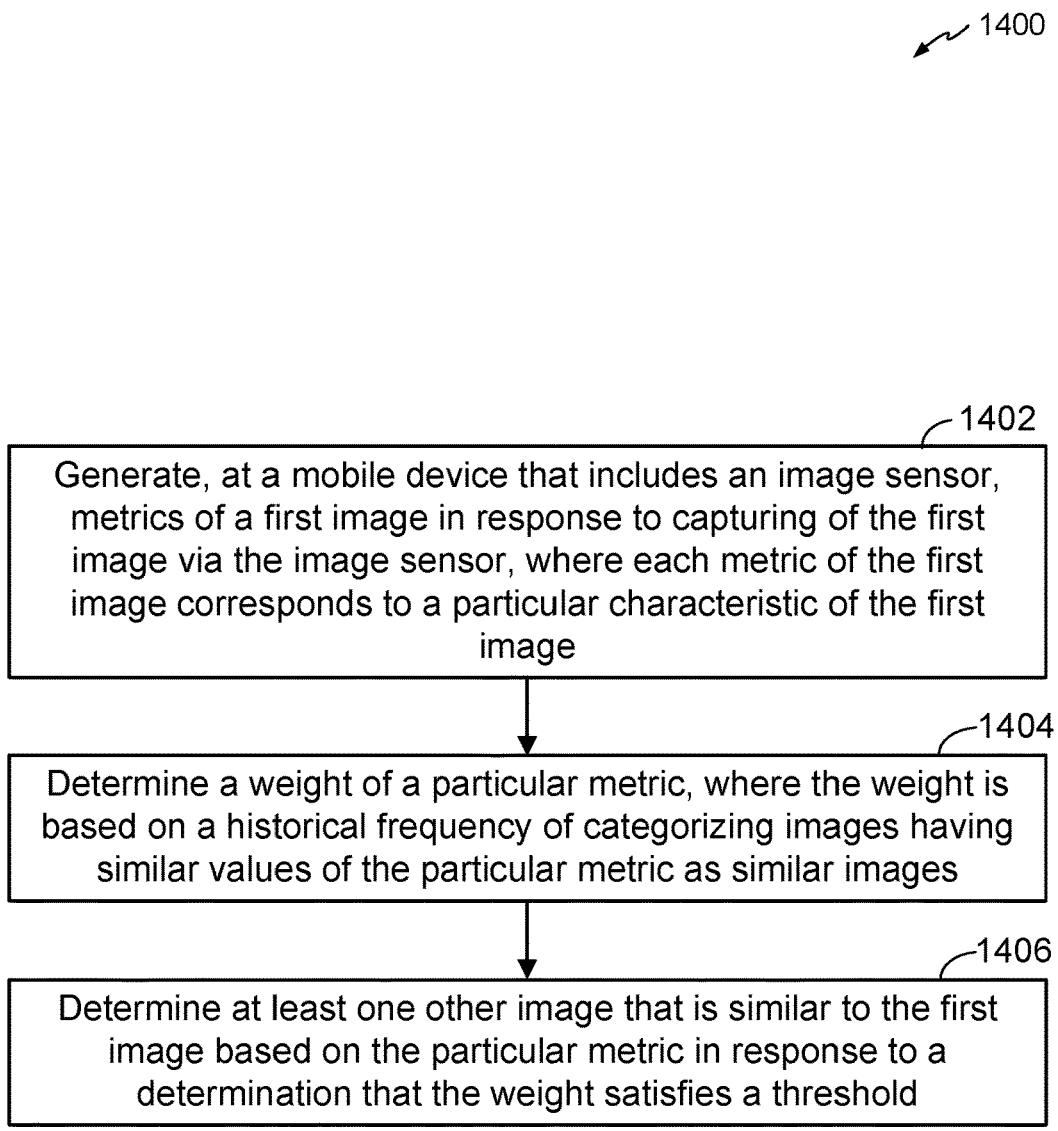
FIG. 14 is a flowchart of a particular embodiment of a method of selecting an image based on frequently used metrics.

Referring to FIG. 14, a particular embodiment of a method 1400 of selecting an image based on frequently used metrics is shown. In an illustrative embodiment, the method 1400 may be performed by the system 100 of FIG. 1, the system 200 of FIG. 2, the system 600 of FIG. 6, and/or in conjunction with the user interface device 300 of FIG. 3, the user interface device 400 of FIG. 4, the user interface device 500 of FIG. 5, the user interface device 1000 of FIGS. 10A 10B, or any combination thereof.

The method 1400 includes generating, at a mobile device that includes an image sensor, metrics of a first image in response to capturing the first image via the image sensor, at 1402. For example, in FIG. 1, the processor 104 may generate a first feature vector 121 of the first image 111 in response to the image sensor capturing the first image 111. The first feature vector 121 may identify metrics of the first image 111. Each metric of the first image 111 may correspond to a particular characteristic of the first image 111. For example, a metric may correspond to a geographic location of the first image 111, a time the first image 111 was captured, color components of the first image 111, edge components in the first image 111, faces in the first image 111, objects in the first image 111, a wireless network strength detected at the electronic device 102 when the first image 111 was captured, a direction the electronic device 102 was pointing when the first image 111 was captured, audio qualities before and/or after the first image 111 was captured, etc.

A weight of a particular metric may be determined, at 1404. For example, in FIG. 1, the processor 104 may determine a weight for a particular metric. The weight may be based on a historical frequency of categorizing images having similar values of the particular metric as similar images (e.g., as a group). For example, if a user frequently groups images based on geographic location, then a metric that corresponds to geographic location may have a relatively heavy weight (e.g., a high value). Alternatively, if the user rarely groups images based on the direction (e.g., north, east, south, or west) the electronic device 102 is pointing when the image is captured, then a metric that corresponds to direction may have a relatively light weight (e.g., a low value). In a particular embodiment, the user may select whether, and to what extent, each metric is used to determine similar images.

At least one other image that is similar to the first image may be determined based on the particular metric in response to a determination that the weight satisfies a threshold, at 1406. For example, in FIG. 1, if the processor 104 determines that the user frequently groups images having a similar geographic location, then the processor 104 may heavily weigh a metric corresponding to geographic location to determine at least one other image.

In a particular embodiment, a collection of media items may be generated based on a group of metrics in response to capturing a first media item. For example, in FIG. 1, the processor 104 may generate a collection of media items (e.g., the second image 112, the fifth image 115, and the sixth image 116) in response to the image sensor capturing the first image 111. The group of metrics may include particular metrics that are used to determine whether media items are similar to one another. For example, the group of metrics may include a metric corresponding to geographic location, a metric corresponding to time of capture, and a metric corresponding to facial feature recognition.

Weights for each metric may be updated based on a history of user selections as the system "learns" user preferences. For example, the processor 104 may receive an indication from the user interface device 108 that the sixth image 116 and the fifth image 115 have been selected via a user. The processor 104 may compare metrics of the selected media items (e.g., the sixth image 116 and fifth image 115) to metrics of the first media item (e.g., the first image 111). For example, the processor 104 may determine which metrics between the first media item and the selected media items have similar values and which metrics have values that are far removed from one another. In a particular embodiment, the processor 104 may determine the metric corresponding to time of capture has values far removed from one another when comparing the selected media items (e.g., the sixth image 116 and the fifth image 115) to the first media item (e.g., the first image 111). In addition, the processor 104 may determine the metric corresponding to geographic location and the metric corresponding to facial recognition have similar values when comparing the selected media items to the first media item.

In response to determining which metrics are similar, the processor 104 may update weights corresponding to each metric. Weights for metrics having similar values may be increased while weights for metrics that have values far removed from one another may be decreased. For example, with respect to the algorithm for comparing feature vectors (i.e., $F_{12}=w_1*Norm_1[g(IMG_1)-g(IMG_2)]+w2*Norm_2[t(IMG_1)-t(IMG_2)]+w_3*Norm_3[f(IMG_1)-f(IMG_2)])$, the processor 104 may increase the value of the first weight ($w_1$) corresponding to geographic location, decrease the value of the second weight ($w_2$) corresponding to time, and increase the value of the third weight ($w_3$) corresponding to facial feature recognition. Thus, in the future, the system 100 may "aggressively" suggest media items (e.g., generate collections of media items) based on metrics that have historically been indicated (based on user selections) as having a higher priority. For example, in response to the image sensor capturing another image, the processor 104 may generate a collection of images that have similar geographic locations and similar facial features as the captured image.

Figure 15:
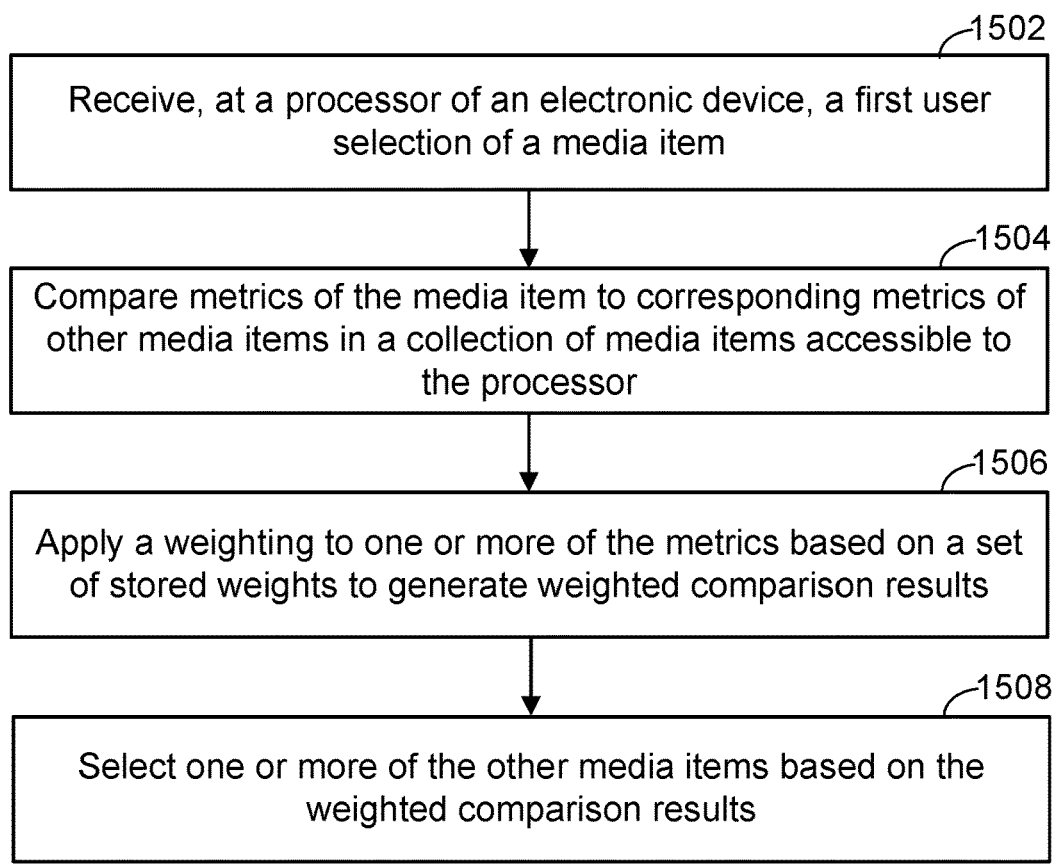
FIG. 15 is a flowchart of a particular embodiment of a method of selecting a media item based on weighted comparison results.

Referring to FIG. 15, a particular embodiment of a method 1500 of selecting a media item based on weighted comparison results is shown. In an illustrative embodiment, the method 1500 may be performed by the system 100 of FIG. 1, the system 200 of FIG. 2, the system 600 of FIG. 6, and/or in conjunction with the user interface device 300 of FIG. 3, the user interface device 400 of FIG. 4, the user interface device 500 of FIG. 5, the user interface device 1000 of FIGS. 10A and 10B, or any combination thereof.

The method 1500 includes receiving, at a processor of an electronic device, a first user selection of a media item, at 1502. For example, in FIG. 1, the processor 104 may receive a first user selection of the first image 111. Additionally, or in the alternative, in FIG. 2, the processor 204 may receive a first user selection of the first video 211.

Metrics of the media item may be compared to corresponding metrics of other media items in a collection of media items accessible to the processor, at 1504. For example, in FIG. 1, metrics of the first image 111 may be compared to metrics of the images 112-117 stored in the memory 106. The memory 106 may be accessible to the processor 104. Additionally, or in the alternative, in FIG. 2, metrics of the first video 211 may be compared to metrics of the videos 212-217 stored in the memory 206. The memory 206 may be accessible to the processor 204.

A weighting may be applied to one or more of the metrics based on a set of stored weights to generate weighted comparison results, at 1506. For example, in FIG. 1, the first weight ($w_1$) may be applied to the normalized difference between the GPS coordinates of the first image 111 and the GPS coordinates of the second image 112 (e.g., $g(IMG_1)-g(IMG_2)$) based on a set of stored weights to generate first weighted comparison results. Additionally, the second weight ($w_2$) may be applied to the normalized difference between the time the first image 111 was captured and the time the second image 112 was captured (e.g., $t(IMG_1)-t(IMG_2)$) based on the set of stored weights to generate second weighted comparison results. The third weight ($w_3$) may be applied to the normalized difference between the data corresponding to the facial features in the first image 111 and data corresponding to the facial features in the second image 112 (e.g., $f(IMG_1)-f(IMG_2)$) based on the set of stored weights to generate third weighted comparison results.

One or more of the other media items may be selected based on the weighted comparison results, at 1508. For example, the second image 112 may be selected based on the first, second, and third weighted comparison results. The processor 104 may determine that the second image 112 is similar to the first image 111 based on the comparison results. For example, the second image 112 and the first image 111 may have similar GPS coordinates, similar data corresponding to facial features (e.g., similar faces), and may have been captured at a similar time.

In a particular embodiment, the method 1500 includes generating a graphical representation that indicates the selected other media items. For example, in FIG. 1, the processor 104 may generate a graphical representation to indicate that the second image 112 is similar to the first image 111. The user interface device 108 may display the graphical representation.

In a particular embodiment, the method 1500 includes receiving a second user selection of one or more of the selected other media items. For example, in FIG. 1, the processor 104 may receive a second user selection of the sixth image 116. The processor 104 may modify the set of stored weights based on the second user selection. For example, the processor 104 may increase the value of the third weight ($w_3$) (e.g., the weight corresponding to detected facial features) because the sixth image 116 includes data corresponding to similar facial features in the first image 111. Additionally, the processor 104 may decrease the value of the first weight (w1) (e.g., the weight corresponding to geographic location) because the sixth image 116 and the first image 111 may be geographically remote.

Figure 16:
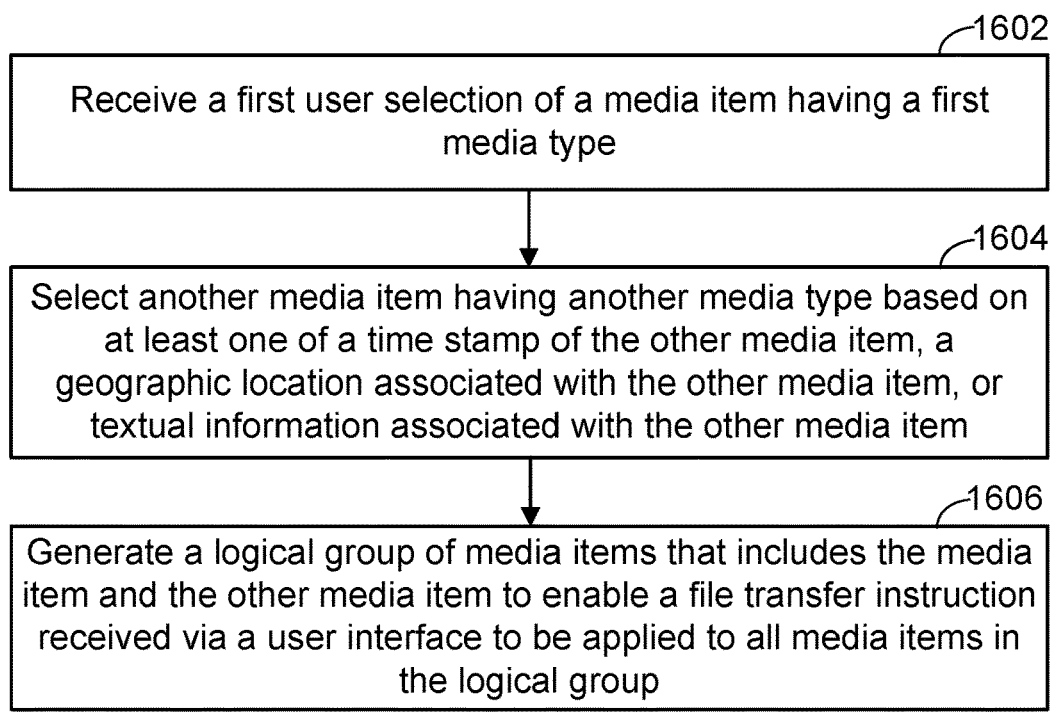
FIG. 16 is a flowchart of a particular embodiment of a method of selecting one or more other media items based on a similarity to a selected media item.

Referring to FIG. 16, a particular embodiment of a method 1600 of selecting one or more other media items based on a similarity to a selected media item is shown. In an illustrative embodiment, the method 1600 may be performed by the system 100 of FIG. 1, the system 200 of FIG. 2, the system 600 of FIG. 6, and/or in conjunction with the user interface device 300 of FIG. 3, the user interface device 400 of FIG. 4, the user interface device 500 of FIG. 5, the user interface device 1000 of FIGS. 10A and 10B, or any combination thereof.

The method 1600 may include receiving a first user selection of a media item having a first media type, at 1602. For example, in FIG. 6, the user may select the first image 111 via the user interface device 608 and the processor 604 may receive the selection of the first image 111.

Another media item having another media type may be selected based on at least one of a time stamp of the other media item, a geographic location associated with the other media item, or textual information associated with the other media item, at 1604. For example, in FIG. 6, the processor 604 may select the second video 212 based on a metric identifying the geographical location (e.g., New York City, N.Y.) of the second video 212 and based on a metric identifying the time (e.g., around 3:00 pm) the second video 212 was captured. The processor 604 may also select the fifth image 115 based on a metric identifying the geographical location (e.g., New York City, N.Y.) of the fifth image 115.

A logical group of media items may be generated that includes the media item and the other media item to enable a file transfer instruction received from a user interface to be applied to all media items in the logical group, at 1606. For example, in FIG. 6, the processor 604 may generate a logical group of media items that includes the first image 111, the second video 212, and the fifth image 115. If the user elects to transfer the first image 111, the processor 604 may enable file transfer instructions to the second video 212 and the fifth image 115 as well. In a particular embodiment, the logical group of media items may be included in a zipped file and transferred to a remote source.

In a particular embodiment, selecting the other media item may include accessing an archive of social media postings and selecting a social media posting that corresponds to at least one of the time stamp, the geographic location, or the textual information. For example, in FIG. 6, the processor 604 may select the first message 613, the third message 615, or any combination thereof based on the time stamp, geographic location, or textual information of the first and third messages 613, 615.

In a particular embodiment, selecting the other media item may include comparing a count of social media sharing events of the media item to a threshold. For example, in FIG. 6, the processor 604 may select the third message 615 in response to comparing a count of social media sharing events (e.g., likes, comments, shares, re-tweets, etc.) of the third message 615 to a threshold and determining that the count of social media sharing events satisfies the threshold.

In a particular embodiment, the method 1600 may include performing a web search for the textual information. For example, in FIG. 6, the processor 604 may search multiple web pages for textual information related to the first image 111. A web page corresponding to a top search result may be included in the logical group.

Figure 17:
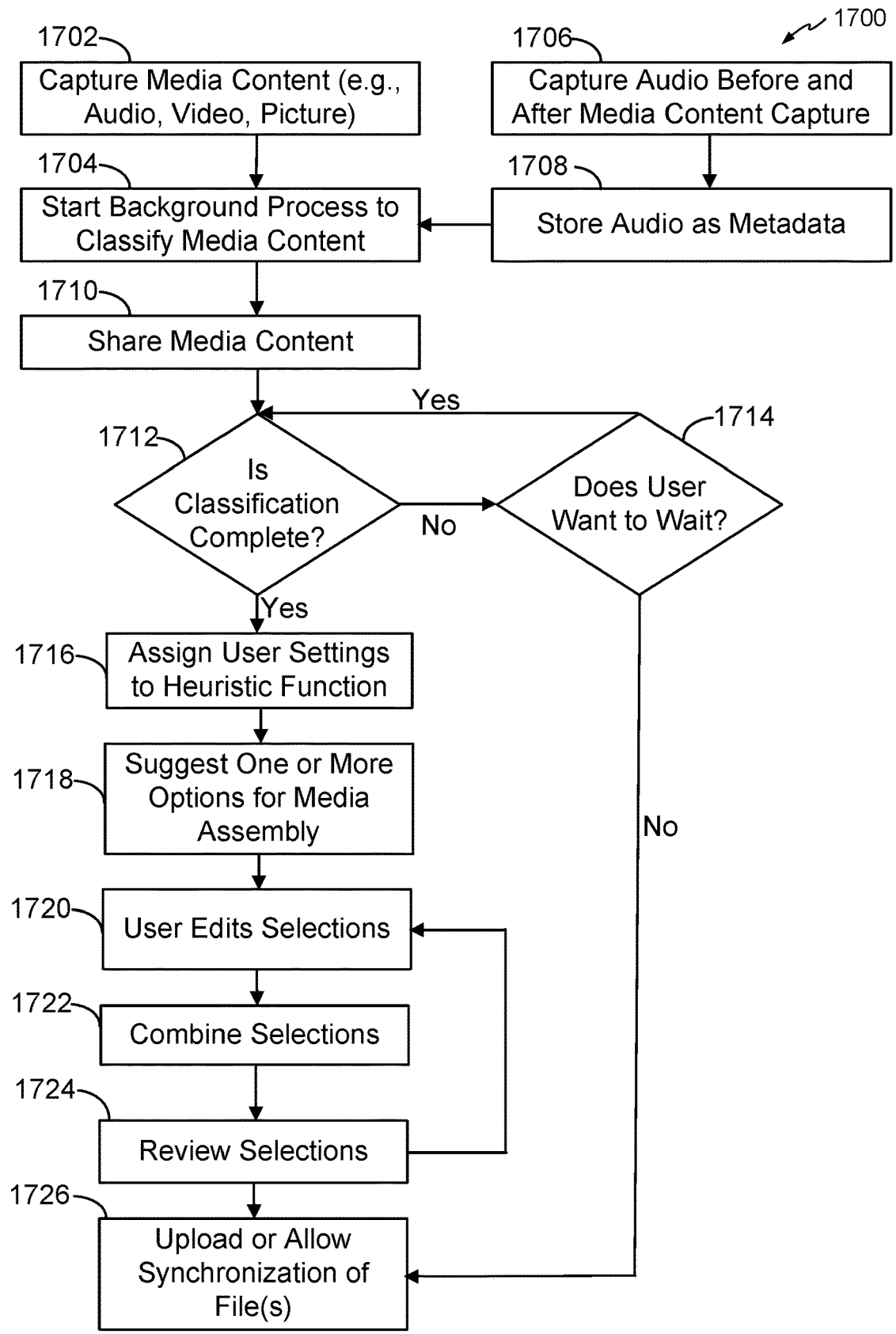
FIG. 17 is a flowchart of another particular embodiment of a method of selecting one or more other media items based on a similarity to a selected media item.

Referring to FIG. 17, a particular embodiment of a method 1700 of selecting one or more other media items based on a similarity to a selected media item is shown. In an illustrative embodiment, the method 1700 may be performed by the system 100 of FIG. 1, the system 200 of FIG. 2, the system 600 of FIG. 6, and/or in conjunction with the user interface device 300 of FIG. 3, the user interface device 400 of FIG. 4, the user interface device 500 of FIG. 5, the user interface device 1000 of FIGS. 10A and 10B, or any combination thereof.

The method 1700 may include capturing media content, at 1702. For example, the image sensor of the electronic device 102 of FIG. 1 may capture the first image 111 and/or the motion image sensor of the electronic device 202 of FIG. 2 may capture the first video 211. A background process may start to classify the media content after the media content is captured, at 1704, such as described in further detail with respect to FIG. 18. For example, in FIG. 1, the processor 104 may begin to generate the metrics of the first image 111 in response to the image sensor of the electronic device 102 capturing the first image 111. As another example, in FIG. 2, the processor 204 may begin to generate the metrics of the first video 211 in response to the motion image sensor of the electronic device 202 capturing the first video 211.

In a particular embodiment, the method 1700 may include capturing audio before and after the media content is captured, at 1706. For example, in FIG. 1, the electronic device 102 may capture first audio for a time period (e.g., five seconds) prior to capturing the first image 111, and the electronic device 102 may capture second audio for a time period (e.g., five seconds) after capturing the first image 111. As another example, when a camera application is launched at the electronic device 102, an audio recorder may also be launched. A buffer of a most recently recorded audio signal (e.g., a five second buffer) may be maintained and updated until an image capture operation is initiated. In response to an image capture, the buffered audio data corresponding to the five second period prior to the image capture may be processed (e.g., filtered, compressed, etc.) and stored. Also, an audio signal may be recorded, processed, and stored after the image capture. In a particular embodiment, the audio may be stored as metadata, at 1708. For example, in FIG. 1, at least one of the metrics in the first feature vector 121 may correspond to audio qualities of the first audio and at least one of the metrics in the first feature vector 121 may correspond to audio qualities of the second audio.

The method 1700 may also include receiving an instruction to share the captured media content, at 1710. For example, in FIG. 1, the electronic device 102 may detect a user selection to transfer the first image 111 (e.g., to transfer the first image 111 to a remote device). In a particular embodiment, the first image 111 may be transferred via electronic mail, shared on a social media website, transferred using a short message service (SMS) message, transferred according to one or more other transfer mechanisms, or any combination thereof. In a particular embodiment, the first image 111 may be transferred (e.g., synched) to a computer, as described in further detail with respect to FIG. 21. In response to detecting the user selection to transfer (e.g., share) the captured media content, a determination is made as to whether the background process that was initiated at 1704 is complete, at 1712. For example, a determination may be made whether the processor 104 of FIG. 1 has completed generation of a set of metrics of the first image 111 and completed the first feature vector 121. As another example, a determination may be made whether the processor 204 of FIG. 2 has completed generation of a set of metrics of the first video 211 and completed the first feature vector 221.

If it is determined that the background process is incomplete, a prompt may be generated, at 1714, to determine whether the user wants to wait for a processor (e.g., the processor 104 of FIG. 1 or the processor 204 of FIG. 2) to complete the background process. In a particular embodiment, an estimated wait time may be provided via a user interface device (e.g., the user interface device 108 of FIG. 1 or the user interface device 208 of FIG. 2). If an indication is received that the user decides not to wait, the captured media content may be uploaded, at 1726. For example, in FIG. 1, the first image 111 may be uploaded to a social media site, transferred via electronic mail, synched to a computer, or any combination thereof, prior to completion of generating the first feature vector 121 and without suggesting similar images to upload. Alternatively, if an indication is received that the user decided to wait, the method 1700 returns to 1712.

If it is determined that the background process is complete, at 1712, a processor may assign user settings, at 1716. For example, in FIG. 1, the processor 104 may assign weights to a heuristic function (e.g., $F_{12}=w_1*Norm_1[g(IMG_1)-g(IMG_2)]+w2*Norm_2[t(IMG_1)-t(IMG_2)]+w_3*Norm_3[f(IMG_1)-f(IMG_2)]$) that compares the first feature vector 121 of the first image 111 to the second feature vector 122 of the second image 112. In a particular embodiment, the value of the first weight ($w_1$), the value of the second weight ($w_2$), and the value of the third weight ($w_3$) may be user-selected. For example, a user interface may include a slider that is responsive to finger contact to adjust the value of each weight. In another particular embodiment, the value of each weight may be based on historical user selection of media items to be grouped. For example, the processor may determine that the user has typically grouped media items that are similar according to geographic location, time, and/or facial features as compared to similarities according to other aspects (e.g., color content or environmental audio characteristics at the time of capture). The user setting, at 1716, may also define a limit on a number of media items to be shared. For example, the limit may be based on a data plan and/or cost associated with the data plan. The limit may alternatively, or in addition, be based on a file size of the media items or a data limit of the sharing medium (e.g., a data limit for an electronic mail account).

After the user settings are assigned, one or more options for media assembly may be suggested, at 1718. For example, the processor 104 of FIG. 1 may suggest similar images to the first image 111 based on the user settings and the heuristic function. In a particular embodiment, an indication of the suggested media items (e.g., thumbnail images) may be assembled and presented to the user via a user interface device, such as the user interface devices 108-208 of FIGS. 1-2, the user interface devices 300-500 of FIGS. 3-5, the user interface device 608 of FIG. 6, the user interface device 1000 of FIGS. 10A and 10B, or any combination thereof. In another embodiment, the suggested media items may be automatically combined and presented as a slide show with music via a user interface. For example, in FIG. 1, the processor 104 may select and combine the second image 112, the fifth image 115, and the sixth image 116 to generate a collection of images. The processor 104 may select a default audio file, generate a slide show with images 112, 115, 115, and play the default audio file while presenting the slide show via the user interface device 108.

An indication of a user edit of the selections may be received, at 1720. For example, as described with respect to the user interface devices 300-500 of FIGS. 3-5, the user may select or deselect displayed images 112-117 by activating or deactivating a check box associated with (e.g., located near) each image. The selections may be combined, at 1722, and presented via a user interface device to enable review by the user, at 1724. After receiving an indication to proceed with the presented selections, the media items may be shared, at 1726.

At 1726, the media items may be shared via electronic mail, shared on a social media website, transferred using a short message service (SMS) message, transferred according to one or more other transfer mechanisms, or any combination thereof. In a particular embodiment, the media items may be transferred (e.g., synched) to a computer, as described in further detail with respect to FIG. 16.

Figure 18:
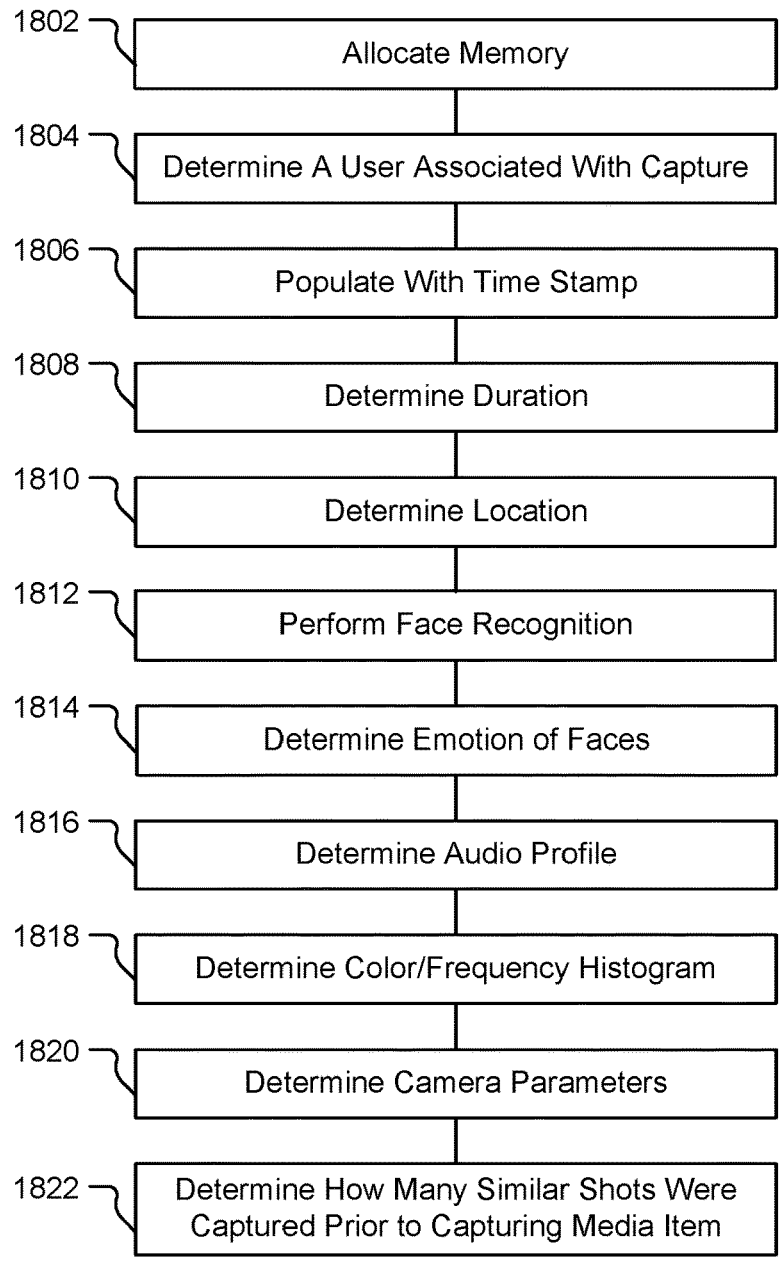
FIG. 18 is a flowchart of a particular embodiment of a method of generating a feature vector for a media item.

Referring to FIG. 18, a particular embodiment of a method 1800 of generating a feature vector for a media item is shown. In an illustrative embodiment, the method 1800 may be performed using the system 100 of FIG. 1, the system 200 of FIG. 2, the system 600 of FIG. 6, or any combination thereof. For example, the method 1800 may be performed by one or more of the processors 104, 204 of FIGS. 1-2, the processor 604 of FIG. 6, the user interface device 1000 of FIGS. 10A and 10B, or any combination thereof, to generate feature vectors of media items.

The method 1800 may include allocating memory for a media item, at 1802. For example, in response to the image sensor of the electronic device 102 of FIG. 1 capturing the first image 111, the processor 104 may allocate a portion of the memory 106 for the first image 111 and for the first feature vector 121 associated with the first image 111. As another example, in response to the motion image sensor of the electronic device 202 of FIG. 2 capturing the first video 211, the processor 204 may allocate a portion of the memory 206 for the first video 211 and for the first feature vector 221 associated with the first video 211.

The method 1800 may also include determining a user associated with the capture of the media content, at 1804. For example, in FIG. 1, the processor 104 may determine a user associated with the capture of the first image 111 by using a back facing image sensor of the electronic device 102 to obtain an image of the user's face. The processor 104 may compare the image of the user's face to stored facial detection data to determine whether the user can be identified or recognized. Alternatively, a user credential obtained at a login process may be used. The user credential may include voice recognition, a username and password, etc.

The method 1800 may also include populating the captured media content with a time stamp, at 1806. For example, in FIG. 1, the processor 104 may populate a first metric corresponding to the first image 111 with a time stamp corresponding to the time (e.g., 3:00 pm on Aug. 31, 2002) the first image 111 was captured. The processor 104 may access a clock internal to the electronic device 102 and determine the time and date from the clock. The processor 104 may populate the first metric based on the time and date. The method 1800 may also include determining a duration of the media content, at 1808. For example, in FIG. 2, the processor 204 may determine that the first video 211 has a duration of two minutes and eleven seconds (e.g., 2:11) by initiating a start to a timer of the electronic device 202 in response to an indication to start recording the first video 211 and initiating a stop to the timer in response to an indication to stop recording the first video 211. The duration of the first video 211 may be included as a metric of the first feature vector 221.

The method 1800 may also include determining a location of the media content, at 1810. For example, in FIG. 1, the processor 104 may determine the GPS coordinates of the first image 111 by querying a GPS sensor of the electronic device 102 and receiving data from the GPS sensor that indicates a location (e.g., latitude and longitude) of the electronic device 102. The location of the electronic device 102 may correspond to the location that the first image 111 was captured. In a particular embodiment, the processor 104 may determine an identifier and signal strength of one or more wireless networks (e.g., Wifi) detected at the electronic device 102 when the first image 111 was captured. For example, a low strength may correlate to the first image 111 being captured outdoors, while a high strength may correlate to the first image 111 being captured indoors. In another particular embodiment, the processor 104 may determine a signal strength of wireless signals received via an antenna of the electronic device 102 to determine a distance relative to an access point. Strong signals may indicate that the electronic device 102 is relatively close to the access point and weaker signals may indicate that the electronic device 102 is relatively far from the access point. The location that the first image 111 was captured may be included as a metric of the first feature vector 121.

The method 1800 may also include performing a facial recognition process, at 1812. For example, in FIG. 1, the processor 104 may detect faces in the first image 111 by using a Viola-Jones-type object detection framework. In a particular embodiment, the processor may detect faces based on a size of the face in relation to the media item. For example, in FIG. 1, the processor 104 may detect the first face (e.g., Male Player) and the second face (e.g., Female Player) because the first face and the second face are relatively large with respect to the size of the first image 111. However, the processor 104 may forego facial detection on smaller faces in the first image 111 (e.g., faces in the crowd) to reduce power consumption, to reduce spurious results due to reduced resolution, and to reduce an amount of data associated with non-foreground faces which may not be of particular interest to the user. Data corresponding to detected and/or recognized faces in the first image 111 may be included as a metric of the first feature vector 121.

The method 1800 may also include performing an emotion determination operation on one or more faces detected in the media item, at 1814. For example, in FIG. 1, the processor 104 may apply one or more filters or processes to determine whether the detected faces in the first image 111 are evaluated as expressing happiness, laughter, sadness, anger, etc. In a particular embodiment, the processor 104 may examine facial features (e.g., teeth, facial complexion, etc.), sound (e.g., laughter, yelling, etc.), or any combination thereof to determine an emotional context associated with the first image 111. Data corresponding to the emotional context may be included as a metric of the first feature vector 121.

The method 1800 may also include determining an audio profile of the media item, at 1816. For example, in FIG. 2, the processor 204 may determine an average standard deviation of the sound in the first video 211, generate a sound histogram of the first video 211, classify a specific sound (e.g., laughter, crying, etc.) in the first video 211, or any combination thereof. Data corresponding to the audio profile may be included as a metric of the first feature vector 121.

The method 1800 may also include generating a color histogram of the media item, at 1818. For example, in FIG. 1, the processor 104 may generate a color histogram of the first image 111 by determining a number of pixels in the first image 111 that have a particular color component in a list of color ranges that span the first image 111. The histogram may be based on how frequent the color component is presented within the first image 111 (e.g., how many pixels include the color component). A count may be generated for each different color component in the first image 111. Data corresponding to the color histogram may be included as a metric of the first feature vector 121.

The method 1800 may also include determining one or more camera parameters, at 1820. For example, in FIG. 1, the processor 104 may determine a value corresponding to an auto focus setting of the image sensor of the electronic device 102, a value corresponding to an auto white balance setting of the image sensor, a value corresponding to an auto exposure setting of the image sensor, or any combination thereof. Data corresponding to the camera parameters may be included as a metric of the first feature vector 121.

Although the method 1800 illustrates ten metrics, in other embodiments, fewer than ten metrics or more than ten metrics may be determined. Also, although the method 1800 illustrates a particular order of metric determination, in other embodiments, a different order may be used and/or two or more metrics may be generated in parallel.

The method 1800 may also include determining how many shots having similar characteristics were captured prior to capturing the media item, at 1822. For example, in FIG. 1, the processor 104 may determine how many images (having similar metric values to the first image 111) were taken prior to the image sensor of the electronic device 102 capturing the first image 111. In a particular embodiment, if the number of images satisfies a threshold, the processor 104 may determine that the first image 111 is of a particular importance.

Figure 19:
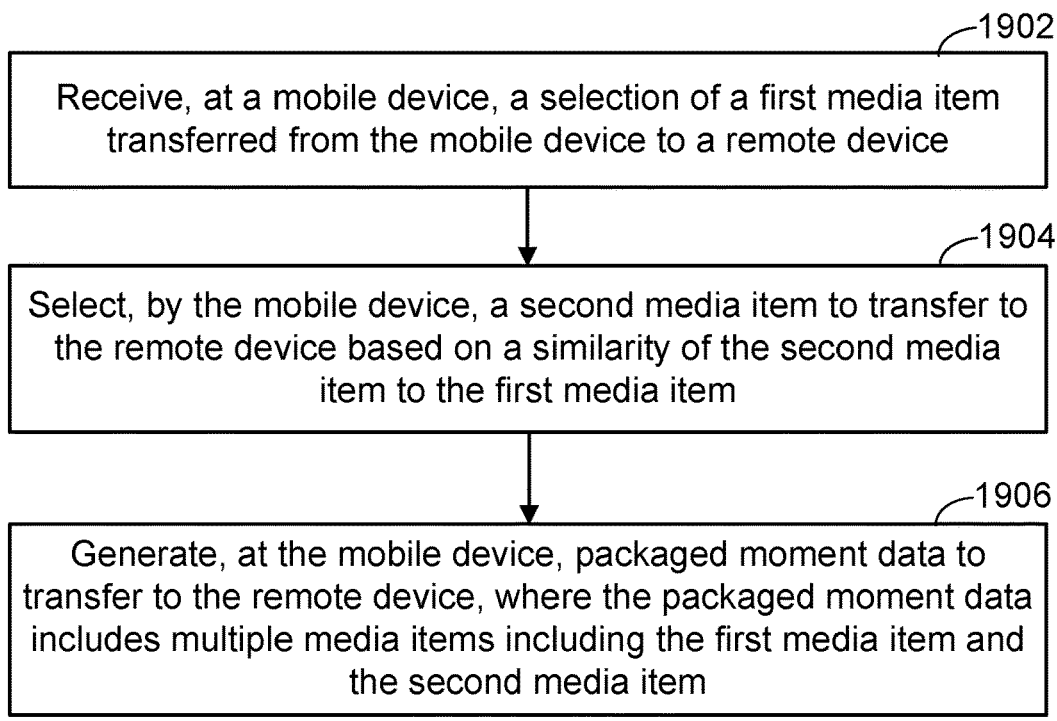
FIG. 19 is a flowchart of a particular embodiment of a method of selecting media items corresponding to media data of packaged moment data.

Referring to FIG. 19, a particular embodiment of a method 1900 of selecting media items corresponding to media data of packaged moment data is shown. In an illustrative embodiment, the method 1900 may be performed by the system 100 of FIG. 1, the system 200 of FIG. 2, the system 600 of FIG. 6, and/or in conjunction with the user interface device 300 of FIG. 3, the user interface device 400 of FIG. 4, the user interface device 500 of FIG. 5, the user interface device 700 of FIG. 7, the user interface device 800 of FIG. 8, the user interface device 900 of FIG. 9, the user interface device 1000 of FIGS. 10A and 10B, or any combination thereof.

The method 1900 includes receiving, at a mobile device, a selection of a first media item transferred from the mobile device to a remote device, at 1902. For example, in FIG. 6, the processor 604 may receive a first user selection of the first image 111. In a particular embodiment, the remote device may include a second mobile device, a computer, or a server.

The method 1900 includes selecting, by the mobile device, a second media item to transfer to the remote device based on a similarity of the second media item to the first media item, at 1904. For example, in FIG. 6, the processor 604 may select the second video 212 based on a similarity between the first image 111 and the second video 212.

The method 1900 further includes generating, by the mobile device, packaged moment data to transfer to the remote device. The packaged moment data may include media data associated with multiple media items including the first media item and the second media item. For example, in FIG. 6, the processor 604 may be configured to generate packaged moment data including media data associated with a logical group of media items including the first image 111 and the second video 212. In a particular embodiment, the multiple media items may include at least one of an audio recording of a voice call at the mobile device, an electronic mail message, an SMS message, or an image of a social media post.

In a particular embodiment, the similarity of the second media item to the first media item may be determined based on user configurable packaged moment settings. For example, the similarity of the second media item to the first media item may be determined based on the similarity settings of FIG. 7. The user configurable packaged moment settings may indicate selection of a particular characteristic. The similarity of the second media item to the first media item may be based at least in part on a similarity of the particular characteristic of the second media item to the particular characteristic of the first media item. For example, in FIG. 7, the similarity of the second media item to the first media item may be determined based at least in part on one or more characteristics indicated by selection of the similar faces selector 702, the similar audio selector 704, the similar location selector 706, the similar time selector 712, or a combination thereof.

In a particular embodiment, the method 1900 further includes retrieving, by the mobile device, the second media item from another mobile device within a threshold proximity of the mobile device. The second media item may be retrieved responsive to sending a query to the other mobile device. The query may indicate packaged moment criteria and may request media items that satisfy the packaged moment criteria. For example, in FIG. 8, a query may be sent to a mobile device of a network selected via the network selector 804.

In a particular embodiment, the method 1900 further includes presenting a recipient display window at the mobile device after generating the packaged moment data. For example, the user interface device 900 may present the recipient list window 910. The recipient display window may indicate media items corresponding to the media data of the packaged moment data that are designated to be sent to particular users. The method 1900 may further include sending a subset of media items corresponding to the media data of the packaged moment data to a particular user based on designations of media items in the recipient display window. For example, in FIG. 9, media data associated with a subset of media items may be sent to a particular user based on the first designation 912 of media items and/or the second designation 914 of media items. The designations in the recipient display window may be adjustable via a graphical user interface (GUI). For example, the first designation 912 of media items and the second designation 914 of media items may be adjustable by the GUI displayed via the user interface device 900 of FIG. 9.

In a particular embodiment, the method 1900 further includes presenting a summary window at the mobile device after generating the packaged moment data. For example, the user interface device 900 may present the summary window 902. The summary window indicates types of the media items corresponding to the media data of the packaged moment data. For example, the packaged moment data indicator 904 of the summary window 902 may indicate types of media items corresponding to the media data of the packaged moment data.

Figure 20:
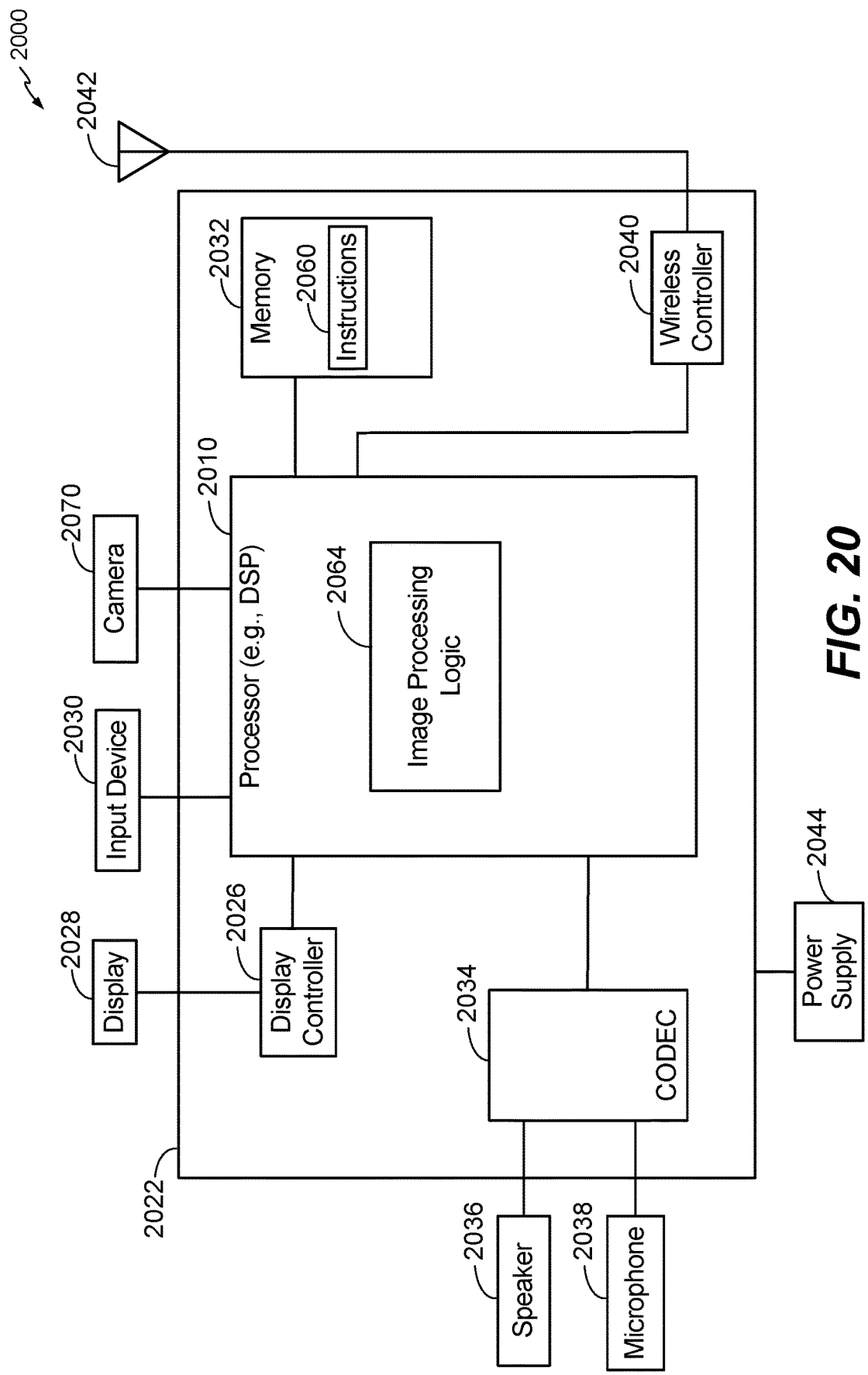
FIG. 20 is a block diagram of a mobile device that is operable to support the embodiments illustrated in FIGS. 1-19.

Referring to FIG. 20, a block diagram of a particular illustrative embodiment of a mobile device is depicted and generally designated 2000. The device 2000 includes a processor 2010, such as a digital signal processor (DSP), coupled to a memory 2032. In an illustrative example, the processor 2010 includes image processing logic 2064 configured to identify image features of captured images. For example, the processor 2010 may correspond to the processor 104 of FIG. 1 or the processor 204 of FIG. 2. The processor 2010 may be operable to perform the methods 1100-1900 of FIGS. 11-19. In a particular embodiment, the memory 2032 is a non-transitory computer readable medium that includes instructions 2060. The processor 2010 may be configured to execute the instructions 2060 stored in the memory 2032 to perform one or more of the methods 1100-1900 of FIGS. 11-19.

In a particular embodiment, the processor 2010 may be configured to execute computer executable instructions 2060 stored at a non-transitory computer-readable medium, such as the memory 2032, that are executable to cause the processor 2010 to receive a selection of a first media item transferred from a mobile device (e.g., the mobile device 2000) to a remote device. For example, the processor 2010 may receive selection of the first image 111. The instructions 2060 may be executable to cause the processor 2010 to select a second media item to transfer to the remote device based on a similarity of the second media item to the first media item. For example, the processor 2010 may select the second video 212 based on a similarity of the second video 212 to the first image 111. The instructions 2060 may executable to further cause the processor 2010 to generate packaged moment data to transfer to the remote device. The packaged moment data may include media data associated with multiple media items including the first media item and the second media item.

In a particular embodiment, the instruction 2060 may be executable to further cause the processor 2010 to concatenate first video and second video to generate a concatenated video. The concatenated video may correspond to the media data of the packaged moment data. For example, the media data may be associated with a concatenated video file generated by concatenating the first video 211 and the second video 212, as described with reference to FIG. 2.

In another embodiment, the instructions 2060 may be executable to further cause the processor 2010 to generate a graphical user interface (GUI) at a display, to select media items of a first media type based on user input received via a first window of the GUI, and to select media items of a second media type based on user input received via a second window of the GUI. The media data of the packaged moment data may be associated with media items of the first media type and the second media type. For example, in FIGS. 10A and 10B, media items of the first media type may be selected based on user input received via a first window associated with a first tab 1002 (e.g., a pictures tab), and media items of the second media type may be selected based on user input received via a second window associated with a second tab 1004 (e.g., a video tab). The first window of the GUI may include images similar to the first media item, and the second window of the GUI may include videos similar to the first media item. For example, in FIGS. 10A and 10B, the first window may include the second image icon 1018 and the third image icon 1022 corresponding to the second image and the third image, respectively, that are similar to the first image 111 (corresponding to the first image icon 1010), and the second window may include the first video icon 1058 and the second video icon 1068 corresponding to the first video and the second video, respectively, that are similar to the first image 111.

In another illustrative example, the memory 2032 may store images captured by a camera 2070. The camera 2070 may correspond to the image sensor described with respect to FIG. 1, the motion image sensor described with respect to FIG. 2, or a combination thereof. For example, the camera 2070 may capture media items (e.g., the images 121-117 of FIG. 1, the videos 211-217 of FIG. 2, or any combination thereof), and the memory 2032 may store one or more of the media items. The memory 2032 may also store the feature vectors 121-127 of FIG. 1, the feature vectors 221-227 of FIG. 2, or any combination thereof.

FIG. 20 also shows a display controller 2026 that is coupled to the processor 2010 and to a display 2028. The display 2028 may correspond to the user interface device 108 of FIG. 1, the user interface device 208 of FIG. 2, the user interface device 300 of FIG. 3, the user interface device 400 of FIG. 4, the user interface device 700 of FIG. 7, the user interface device 800 of FIG. 8, the user interface device 900 of FIG. 9, the user interface device 1000 of FIGS. 10A and 10B, or any combination thereof. A coder/decoder (CODEC) 2034 can also be coupled to the processor 2010. A speaker 2036 and a microphone 2038 can be coupled to the CODEC 2034. In a particular embodiment, the microphone 2038 may be configured to capture audio prior to the camera 2070 capturing an image, such as the first image 111 of FIG. 1, and after capturing the image. The microphone 2038 may also be configured to capture audio while the camera 2070 captures video, such as the first video 211 of FIG. 2. A wireless controller 2040 can be coupled to the processor 2010 and to an antenna 2042 such that wireless data received via the antenna 2042 and the wireless controller 2040 can be provided to the processor 2010.

In a particular embodiment, the processor 2010, the display controller 2026, the memory 2032, the CODEC 2034, and the wireless controller 2040 are included in a system-in-package or system-on-chip device 2022. In a particular embodiment, an input device 2030 and a power supply 2044 are coupled to the system-on-chip device 2022. In an illustrative example in which the device 2022 includes a touch-screen, the display 2028 and the input device 2030 may be at least partially integrated. In a particular embodiment, as illustrated in FIG. 20, the display 2028, the input device 2030, the speaker 2036, the microphone 2038, the antenna 2042, the power supply 2044, and the camera 2070 are external to the system-on-chip device 2022. However, each of the display 2028, the input device 2030, the speaker 2036, the microphone 2038, the antenna 2042, the power supply 2044, and the camera 2070 can be coupled to a component of the system-on-chip device 2022, such as an interface or a controller.

In conjunction with the described embodiments, an apparatus is disclosed that includes means for receiving a user selection of a media item to be transferred. For example, the means for receiving the user selection of the media item may include the processor 104 of FIG. 1, the user interface device 108 of FIG. 1, the processor 204 of FIG. 2, the user interface device 208 of FIG. 2, the user interface device 300 of FIG. 3, the user interface device 400 of FIG. 4, the user interface device 500 of FIG. 5, the processor 604 of FIG. 6, the user interface device 608 of FIG. 6, the user interface device 1000 of FIGS. 10A and 10B, the processor 2010 programmed to execute the instructions 2060 of FIG. 20, one or more other devices, circuits, modules, or instructions to receive the user selection, or any combination thereof, where each processor 104, 204, 604, 2010 included in the means may receive a signal indicating the user selection generated in response to a user action (e.g., selection) at a user interface.

The apparatus may also include means for selecting another media item based on a similarity of the other media item to the selected media item. For example, the means for selecting the other media item may include the processor 104 of FIG. 1, the memory 106 of FIG. 1, the user interface device 108 of FIG. 1, the processor 204 of FIG. 2, the memory 206 of FIG. 2, the user interface device 208 of FIG. 2, the user interface device 300 of FIG. 3, the user interface device 400 of FIG. 4, the user interface device 500 of FIG. 5, the processor 604 of FIG. 6, the user interface device 608 of FIG. 6, the user interface device 1000 of FIGS. 10A and 10B, the processor 2010 programmed to execute the instructions 2060 of FIG. 20, one or more other devices, circuits, modules, or instructions to select the other media item, or any combination thereof, where each processor 104, 204, 604, 2010 included in the means may calculate a similarity (e.g., $F_{12}$) by comparing values of the metrics of the media item to values of the metrics of the other media item and determining whether a similarity threshold is satisfied by the comparison.

The apparatus may also include means for generating a first feature vector of a first image. For example, the means for generating the first feature vector may include the processor 104 of FIG. 1, the processor 604 of FIG. 6, the processor 2010 programmed to execute the instructions 2060 of FIG. 20, one or more other devices, circuits, modules, or instructions to generate the first feature vector, or any combination thereof, where each processor 104, 604, 2010 included in the means may determine values of metrics of the first image as described with respect to the method 1800 of FIG. 18.

The apparatus may also include means for determining at least one other image that is similar to the first image based on the first feature vector. For example, the means for determining may include the processor 104 of FIG. 1, the memory 106 of FIG. 1, the processor 604 of FIG. 6, the memory 606 of FIG. 6, the processor 2010 programmed to execute the instructions 2060 of FIG. 20, one or more other devices, circuits, modules, or instructions to generate the first feature vector, or any combination thereof, where each processor 104, 604, 2010 included in the means may calculate a similarity (e.g., $F_{12}$) by comparing values of the metrics of the first image to values of the metrics of the other image and determining whether a similarity threshold is satisfied by the comparison.

The apparatus may also include means for generating a first feature vector of a first video. For example, the means for generating the first feature vector may include the processor 204 of FIG. 2, the processor 604 of FIG. 6, the processor 2010 programmed to execute the instructions 2060 of FIG. 20, one or more other devices, circuits, modules, or instructions to generate the first feature vector, or any combination thereof, where each processor 204, 604, 2010 included in the means may determine values of metrics of the first video as described with respect to the method 1800 of FIG. 18.

The apparatus may also include means for determining at least one other video that is similar to the first video based on the first feature vector. For example, the means for determining may include the processor 204 of FIG. 2, the memory 206 of FIG. 2, the processor 604 of FIG. 6, the memory 606 of FIG. 6, the processor 2010 programmed to execute the instructions 2060 of FIG. 20, one or more other devices, circuits, modules, or instructions to generate the first feature vector, or any combination thereof, where each processor 204, 604, 2010 included in the means may calculate a similarity (e.g., $F_{12}$) by comparing values of the metrics of the first video to values of the metrics of the other video and determining whether a similarity threshold is satisfied by the comparison.

The apparatus may also include means for generating metrics of a first image, where each metric of the first image corresponds to a particular characteristic of the first image. For example, the means for generating may include the processor 104 of FIG. 1, the processor 604 of FIG. 6, the processor 2010 programmed to execute the instructions 2060 of FIG. 20, one or more other devices, circuits, modules, or instructions to generate metrics of the first image, or any combination thereof, where each processor 104, 604, 2010 included in the means may determine values of metrics of the first image as described with respect to the method 1800 of FIG. 18.

The apparatus may also include means for determining a weight of a particular metric. For example, the means for the determining the weight of the particular metric may include the processor 104 of FIG. 1, the processor 604 of FIG. 6, the processor 2010 programmed to execute the instructions 2060 of FIG. 20, one or more other devices, circuits, modules, or instructions to determine the particular weight, or any combination thereof, where each processor 104, 604, 2010 included in the means may determine the weight based on a historical frequency of categorizing images having similar values of the particular metric as similar images.

The apparatus may also include means for determining at least one other image that is similar to the first image based on the particular metric in response to a determination that the weight satisfies a threshold. For example, the means for determining may include the processor 104 of FIG. 1, the processor 604 of FIG. 6, the processor 2010 programmed to execute the instructions 2060 of FIG. 20, one or more other devices, circuits, modules, or instructions to determine the at least one other image, or any combination thereof, where each processor 104, 604, 2010 included in the means may calculate a similarity (e.g., $F_{12}$) by comparing values of the metrics of the first image to values of the metrics of the other image and determining whether a similarity threshold is satisfied by the comparison.

The apparatus may also include means for receiving a first user selection of a media item. For example, the means for receiving may include the processor 104 of FIG. 1, the user interface device 108 of FIG. 1, the processor 204 of FIG. 2, the user interface device 208 of FIG. 2, the user interface device 300 of FIG. 3, the user interface device 400 of FIG. 4, the user interface device 500 of FIG. 5, the processor 604 of FIG. 6, the user interface device 608 of FIG. 6, the user interface device 1000 of FIGS. 10A and 10B, the processor 2010 programmed to execute the instructions 2060 of FIG. 20, one or more other devices, circuits, modules, or instructions to receive the first user selection, or any combination thereof, where each processor 104, 204, 604, 2010 included in the means may receive a signal indicating the user selection generated in response to a user action (e.g., selection) at a user interface.

The apparatus may also include means for comparing metrics of the media item to corresponding metrics of other media items in a collection of media items. For example, the means for comparing may include the processor 104 of FIG. 1, the memory 106 of FIG. 1, the processor 204 of FIG. 2, the memory 206 of FIG. 2, the processor 604 of FIG. 6, the processor 2010 programmed to execute the instructions 2060 of FIG. 20, one or more other devices, circuits, modules, or instructions to compare metrics, or any combination thereof, where each processor 104, 204, 604, 2010 included in the means may calculate a similarity (e.g., $F_{12}$) by comparing values of the metrics of the media items to values of the metrics of the other media items and determining whether a similarity threshold is satisfied by the comparison.

The apparatus may also include means for applying a weighting to one or more of the metrics. For example, the means for applying the weighting may include the processor 104 of FIG. 1, the processor 204 of FIG. 2, the processor 604 of FIG. 6, the processor 2010 programmed to execute the instructions 2060 of FIG. 20, one or more other devices, circuits, modules, or instructions to apply the weighting, or any combination thereof, where each processor 104, 204,

604, 2010 included in the means may apply the weighting based on a set of stored weighted to generate weighted comparison results.

The apparatus may also include means for selecting one or more of the other media items based on the weighted comparison results. For example, the means for selecting may include the processor 104 of FIG. 1, the memory 106 of FIG. 1, the user interface device 108 of FIG. 1, the processor 204 of FIG. 2, the memory 206 of FIG. 2, the user interface device 208 of FIG. 2, the user interface device 300 of FIG. 3, the user interface device 400 of FIG. 4, the user interface device 500 of FIG. 5, the processor 604 of FIG. 6, the user interface device 608 of FIG. 6, the user interface device 1000 of FIGS. 10A and 10B, the processor 2010 programmed to execute the instructions 2060 of FIG. 20, one or more other devices, circuits, modules, or instructions to select the one or more other media items, or any combination thereof, where each processor 104, 204, 604, 2010 may calculate a similarity (e.g., $F_{12}$) by comparing values of the metrics of the media items to values of the metrics of the other media items, determining whether a similarity threshold is satisfied by the comparison, and selecting the other media items that satisfy the threshold.

The apparatus may also include means for receiving a first user selection of a media item having a first media type. For example, the means for receiving the first user selection may include the processor 104 of FIG. 1, the user interface device 108 of FIG. 1, the processor 204 of FIG. 2, the user interface device 208 of FIG. 2, the user interface device 300 of FIG. 3, the user interface device 400 of FIG. 4, the user interface device 500 of FIG. 5, the processor 604 of FIG. 6, the user interface device 608 of FIG. 6, the user interface device 1000 of FIGS. 10A and 10B, the processor 2010 programmed to execute the instructions 2060 of FIG. 20, one or more other devices, circuits, modules, or instructions to receive the first user selection, or any combination thereof, where each processor 104, 204, 604, 2010 included in the means may receive a signal indicating the user selection generated in response to a user action (e.g., selection) at a user interface.

The apparatus may also include means for selecting another media item. For example, the means for selecting may include the processor 104 of FIG. 1, the memory 106 of FIG. 1, the user interface device 108 of FIG. 1, the processor 204 of FIG. 2, the memory 206 of FIG. 2, the user interface device 208 of FIG. 2, the user interface device 300 of FIG. 3, the user interface device 400 of FIG. 4, the user interface device 500 of FIG. 5, the processor 604 of FIG. 6, the user interface device 608 of FIG. 6, the user interface device 1000 of FIGS. 10A and 10B, the processor 2010 programmed to execute the instructions 2060 of FIG. 20, one or more other devices, circuits, modules, or instructions to select the other media item, or any combination thereof, where each processor 104, 204, 604, 2010 included in the means may calculate a similarity (e.g., $F_{12}$) by comparing values (e.g., values corresponding to a time stamp, a geographic location, or textual information) of the media item and the other media item, and selecting the other media item if the similarity satisfies a similarity threshold.

The apparatus may also include means for generating a logical group of media items that includes the media item and the other media item to enable file transfer instructions received from a user interface to be applied to all media items in the logical group. For example, the means for generating the logical group may include the processor 104 of FIG. 1, the memory 106 of FIG. 1, the user interface device 108 of FIG. 1, the processor 204 of FIG. 2, the memory 206 of FIG. 2, the user interface device 208 of FIG. 2, the user interface device 300 of FIG. 3, the user interface device 400 of FIG. 4, the user interface device 500 of FIG. 5, the processor 604 of FIG. 6, the user interface device 608 of FIG. 6, the user interface device 1000 of FIGS. 10A and 10B, the processor 2010 programmed to execute the instructions 2060 of FIG. 20, one or more other devices, circuits, modules, or instructions to generate the logical group, or any combination thereof, where each processor 104, 204, 604, 2010 included in the means combine the files correspond to the media item and the other media item into a compressed file and initiate a transfer of the compressed file in response to a signal received from a user interface indicating a file transfer.

The apparatus may also include means for receiving data from a mobile device in response to a communication link connecting the means for receiving to the mobile device. For example, the means for receiving may include the computer 2102 of FIG. 21, one or more other devices, circuits, modules, or instructions to receive data from the mobile device, or any combination thereof.

The apparatus may also include means for receiving another media item based on a similarity of the other media item to the selected media item. For example, the means for receiving the other media item may include the computer 2102 of FIG. 21, one or more other devices, circuits, modules, or instructions to receive the other media item, or any combination thereof.

In another embodiment, the apparatus includes means for receiving a selection of a first media item transferred from a mobile device to a remote device. For example, the means for receiving the selection of the first media item may include the processor 104 of FIG. 1, the user interface device 108 of FIG. 1, the processor 204 of FIG. 2, the user interface device 208 of FIG. 2, the user interface device 300 of FIG. 3, the user interface device 400 of FIG. 4, the user interface device 500 of FIG. 5, the processor 604 of FIG. 6, the user interface device 608 of FIG. 6, the user interface device 1000 of FIGS. 10A and 10B, the processor 2010 programmed to execute the instructions 2060 of FIG. 20, one or more other devices, circuits, modules, or instructions to receive the first user selection, or any combination thereof, where each processor 104, 204, 604, 2010 included in the means may receive a signal indicating the selection of the first media item generated in response to a user action (e.g., selection) at a user interface.

In this embodiment, the apparatus also includes means for selecting a second media item to transfer to the remote device based on a similarity of the second media item to the first media item. For example, the means for selecting the second media item may include the processor 104 of FIG. 1, the processor 204 of FIG. 2, the processor 604 of FIG. 6, the processor 2010 programmed to execute the instructions 2060 of FIG. 20, one or more other devices, circuits, modules, or instructions to select the second media item, or any combination thereof, where each processor 104, 204, 604, 2010 included in the means may select the second media time based on the similarity of the second media item to the first media item. Packaged moment data may include media data associated with the multiple media items including the first media item and the second media item.

In a particular embodiment, the second media item may be selected for transmission to the remote device based on a particular metric if a weight of the particular metric satisfies a threshold. The particular metric may correspond to a particular characteristic of the first media item, and the weight may be based on a historical frequency of categorizing media items having similar values of the particular metric as a group. For example, the particular metric may correspond to one of the metrics of FIGS. 1-2, and the weight may be determined as described with reference to FIGS. 1-2. In another particular embodiment, the apparatus may further include means for sending the packaged moment data to the remote device. For example, the means for sending the packaged moment data may include the processor 104 of FIG. 1, the processor 204 of FIG. 2, the processor 604 of FIG. 6, the processor 2010 programmed to execute the instructions 2060 of FIG. 20, the wireless controller 2040, one or more other devices, circuits, modules, or instructions to apply the weighting, or any combination thereof.

Figure 21:
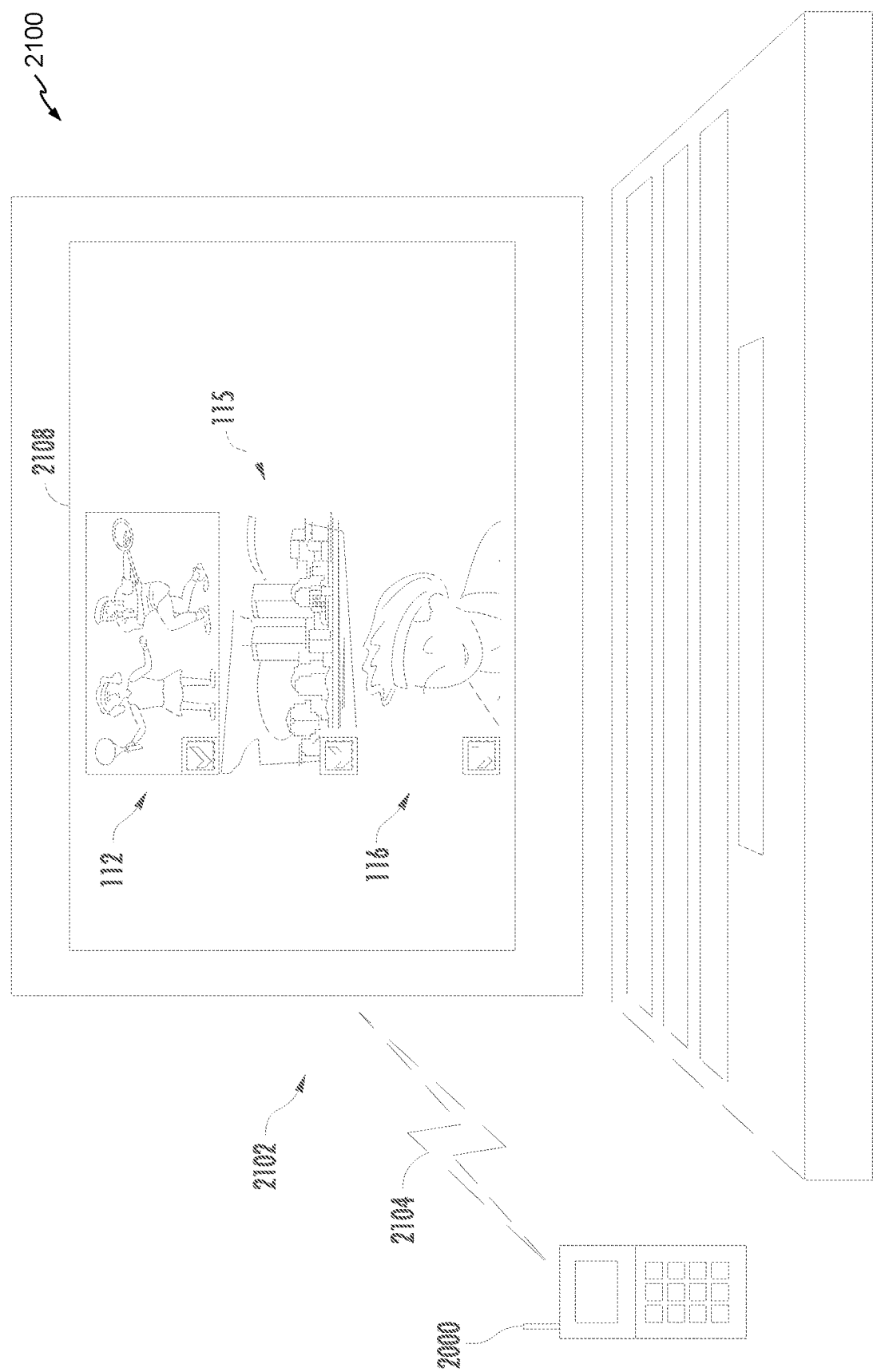
FIG. 21 is a block diagram of a particular embodiment of a system that includes a computer operable to connect to a mobile device.

Referring to FIG. 21, a particular embodiment of a system 2100 that is operable to connect a computer to a mobile device is shown. The system 2100 includes a computer 2102 and the mobile device 2000. The computer 2102 may be connected to the mobile device 2000 via a communication link 2104. The communication link 2104 may be a wireless communication link or a wired communication link. For example, the communication link 2104 may correspond to a Wifi connection (e.g., wireless) between the mobile device 2000 and the computer 2102. Alternatively, the communication link 2104 may be a universal serial bus (USB), high-definition multimedia interface (HDMI), Ethernet, or other wired or wireless connection between the mobile device 2000 and the computer 2102.

In response to connecting the mobile device 2000 to the computer 2102 via the communication link 2104, data may be transferred from the mobile device 2000 to the computer 2102. The data may include a user selected media item to be transferred from the mobile device 2000 to the computer 2102. For example, the data may include the first image 111, and the data including the first image 111 may be transferred to the computer 2102.

The computer 2102 may also receive other media items that are similar to the selected media item (e.g., as packaged moment data). For example, the computer may receive other images determined by the mobile device 2000 to be similar to the first image 111. Alternatively, the computer 2102 may process stored media content on the mobile device 2000, generate feature vectors, and generate suggestions for transfer from the mobile device 2000 to the computer 2102. The computer 2102 may provide a representation of the other media items via a user interface device 2108 of the computer 2102 to enable user selection of the other media items to be transferred. For example, the user interface device 2108 may display the second image 112, the fifth image 115, and the sixth image 116 (e.g., display the images that are determined to be similar to the first image 111). In a particular embodiment, the user interface device 2108 may display an emulated three-dimensional representation of at least a subset of the media items. For example, the user interface device 2108 may correspond to the user interface device 300 of FIG. 3. In another particular embodiment, the user interface device 2108 may display a two-dimensional representation of at least a subset of the media items. For example, the user interface device 2108 may correspond to the user interface device 400 of FIG. 4. In another particular embodiment, the user interface device 2108 may correspond to the user interface device 500 of FIG. 5.

A user may select the images to be transferred to the computer 2102 by clicking on (or otherwise selecting) the selected images displayed via the user interface device 2108. For example, the user may select the second image 112, the fifth image 115, and the sixth image 116 to be transferred to the computer 2102 along with the first image 111.

Thus, other media items may be transferred to the computer 2102 along with the selected media item (e.g., as packaged moment data) based on a determination by the mobile device 2000 that the other media items are similar to the selected media item. It will be appreciated that the system 2100 may reduce an amount of time for a user to transfer multiple media items having similar characteristics from the mobile device 2000 to the computer 2102. For example, providing a representation of the other media items via the user interface device 2108 of the computer 2102 to enable user selection of the other media items to be transferred may prevent the user from locating each of the other media items from a database.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A mobile device comprising:
    an image capture device configured to capture a first video;
    a memory configured to store one or more videos;

a processor coupled to the memory, the processor configured to:
automatically obtain a second video, wherein the second video is accessible via a network, wherein the second video is selected by the processor based on a similarity of a first set of characteristics with a second set of characteristics, wherein the first set of characteristics corresponds to the first video, and wherein the second set of characteristics corresponds to the second video; and
concatenate the first video and the second video to generate a combined video; and
a display device coupled to the processor and configured to display the combined video to a user, wherein the image capture device, the memory, the processor, and the display device are included in a single form factor.

2. The mobile device of claim 1, wherein the processor is configured to generate the combined video by storing data representative of the concatenated first video and the second video in the memory.

3. The mobile device of claim 1, wherein the processor is configured to generate the combined video by storing information in the memory, the information indicating a logical grouping of the first video and the second video.

4. The mobile device of claim 1, wherein the processor is further configured to perform facial recognition on the first video and the second video to detect a first face in the first video and a second face in the second video, wherein the first set of characteristics includes the first face, and wherein the second set of characteristics includes the second face.

5. The mobile device of claim 1, wherein the processor is further configured to determine a first time associated with the first video and a second time associated with the second video, wherein the first set of characteristics includes the first time, and wherein the second set of characteristics includes the second time.

6. The mobile device of claim 1, wherein the processor is further configured to generate the combined video by concatenating a third video with the first video and the second video, wherein the third video is selected based on a similarity of a third set of characteristics associated with the third video and the first set of characteristics or based on a similarity of the third set of characteristics and the second set of characteristics.

7. The mobile device of claim 6, wherein the third video is retrieved from another device via the network.

8. The mobile device of claim 1, further comprising a network interface configured to send the combined video to another device.

9. The mobile device of claim 1, further comprising a user interface device configured to receive a user input indicating selection of the first video.

10. A method of managing media content using a mobile device, the method comprising:
initiating capture of a first video at an image capture device of the mobile device;
automatically selecting, by the mobile device, a second video from one or more videos accessible via a network, wherein the second video is selected based on a similarity of a first set of characteristics with a second set of characteristics, wherein the first set of characteristics corresponds to the first video, and wherein the second set of characteristics corresponds to the second video;
concatenating the first video and the second video to generate a combined video; and
displaying the combined video to a user, wherein the capture, the automatically selecting, the concatenating, and the displaying are performed on a single device.

11. The method of claim 10, further comprising uploading the combined video to a social media website.

12. The method of claim 10, further comprising sending the combined video to a second device via a short message service (SMS) message.

13. The method of claim 10, further comprising storing the combined video in the memory.

14. The method of claim 10, wherein displaying the combined video to the user comprises initiating display of the combined video at a display device of the mobile device.

15. The method of claim 10, wherein the first set of characteristics includes a first face, a first location, a first time, or a combination thereof, wherein the second set of characteristics includes a second face, a second location, a second time, or a combination thereof, and wherein the second video is automatically selected based on a similarity of the first face and the second face, a similarity of the first location and the second location, a similarity of the first time and the second time, or a combination thereof.

16. A mobile device comprising:
an image capture device configured to capture a first set of media items;
a memory configured to store the first set of media items;
a processor coupled to the memory, the processor configured to:
select a group of media items from the first set of media items based on a similarity of one or more characteristics associated with each media item in the group of media items, wherein the one or more characteristics include facial features; and
concatenate one or more media items in the selected group of media items to
generate a combined media item; and
a display device coupled to the processor and configured to display at least one of the group of media items and the combined media item, wherein the image capture device, the memory, the processor, and the display device are included in a single form factor.

17. The mobile device of claim 16, wherein the group of media items comprises one or more images, one or more videos, or a combination thereof, and wherein the group of media items is selected from the first set of media items and a second set of media items, the second set of media items available via a network.

18. The mobile device of claim 16, further comprising a network interface configured to send the group of media items or information indicative of the group of media items to a second device via a network.

19. The mobile device of claim 16, further comprising a user interface configured to receive an input selecting a first media item for inclusion in the group of media items.

20. The mobile device of claim 19, wherein the user interface comprises a touch screen.

21. The mobile device of claim 16, wherein the group of media items includes at least one media item of the first set of media items and at least one media item of a second set of media items that is accessible via a network.

22. The mobile device of claim 16, further comprising a positioning sensor configured to generate location data, wherein the one or more characteristics include location.

23. A method of managing media content using a mobile device, the method comprising:
initiating capture of a first set of media items at an image capture device of the mobile device;

storing the first set of media items at a memory of the mobile device;

automatically selecting, by the mobile device, a group of media items from the first set of media items based on a similarity of one or more characteristics associated with each media item in the group of media items, wherein the one or more characteristics include a facial feature;

concatenating one or more media items in the selected group of media items to generate a combined media item; and initiating display of at least one of the group of media items and the combined media item at a display device of the mobile device, wherein the capture, the storing, the automatically selecting, the concatenating, and the display are performed on a single device.

24. The method of claim 23, wherein the group of media items is accessible via a network.

25. The method of claim 23, wherein the group of media items are displayed as a concatenated media item.

26. The method of claim 23, further comprising receiving, at a user interface of the mobile device, an input selecting one or more media items for inclusion in the group of media items.

27. The method of claim 23, wherein selecting the group of media item comprises:
performing facial recognition on a first media item to detect a first set of facial features; and
performing facial recognition on a second media item to detect a second set of facial features, wherein the first media item and the second media item are selected for inclusion in the group of media items based on a similarity of the first set of facial features to the second set of facial features.

28. The method of claim 23, wherein selecting the group of media items comprises:
determining a first location associated with a first media item; and
determining a second location associated with a second media item, wherein the first media item and the second media item are selected for inclusion in the group of media items based on a similarity of the first location to the second location.

29. The mobile device of claim 1, wherein the first set of characteristics and the second set of characteristics further include a location or a time.

30. The mobile device of claim 16, wherein the one or more characteristics further include a location and a time.

31. The method of claim 10, wherein the first set of characteristics and the second set of characteristics further include a location or a time.

32. The method of claim 23, wherein the one or more characteristics further include a location and a time.

33. The mobile device of claim 1, wherein the processor is further configured to determine a first geographic location associated with the first video and a second geographic location associated with the second video, wherein the first set of characteristics includes the first geographic location, and wherein the second set of characteristics includes the second geographic location.

34. The mobile device of claim 33, wherein the processor is further configured to determine if a level of similarity between the first geographic location and the second geographic location satisfies a threshold.

35. The method of claim 10, further comprising determining a first geographic location associated with the first video and determining a second geographic location associated with the second video, wherein the first set of characteristics includes the first geographic location, and wherein the second set of characteristics includes the second geographic location.

36. The method of claim 35, wherein the second video is selected if a level of similarity between the first geographic location and the second geographic location satisfies a threshold.

37. The mobile device of claim 1, wherein the processor is configured to generate the combined video according to a video length such that the combined video comprises only a portion of the first video or only a portion of the second video.

38. The mobile device of claim 37, wherein the video length is a user designated video length.

39. The mobile device of claim 37, wherein the processor is configured to select the portion of the first video or the portion of the second video from one or more videos of a longer video length.

40. The mobile device of claim 39, wherein the portion of the first video or the portion of the second video are selected from the one or more videos of a longer video length based on detecting a face in the portion of the first video or the portion of the second video.

41. The mobile device of claim 1, wherein the first set of characteristics is associated with at least one of non-similar times, different events, or non-similar locations compared to the second set of characteristics.

42. The method of claim 10, wherein the first set of characteristics is associated with at least one of non-similar times, different events, or non-similar locations compared to the second set of characteristics.

* * * * *